Sept. 19, 1967 E. J. TOSCANO ETAL 3,343,053

SELECTIVE ZERO ELECTRICAL CONTROL SYSTEM

Filed Dec. 23, 1963 20 Sheets-Sheet 1

INVENTORS.
ESTEBAN J. TOSCANO,
JOSEF K. HOLY,
BY E. F. Oberheim
AGENT.

Sept. 19, 1967 E. J. TOSCANO ETAL 3,343,053

SELECTIVE ZERO ELECTRICAL CONTROL SYSTEM

Filed Dec. 23, 1963 20 Sheets-Sheet 3

SELECTIVE ZERO ELECTRICAL CONTROL SYSTEM

Filed Dec. 23, 1963

20 Sheets-Sheet 4

SELECTIVE ZERO ELECTRICAL CONTROL SYSTEM

Filed Dec. 23, 1963 20 Sheets-Sheet 5

Sept. 19, 1967 E. J. TOSCANO ETAL 3,343,053

SELECTIVE ZERO ELECTRICAL CONTROL SYSTEM

Filed Dec. 23, 1963 20 Sheets-Sheet 6

SELECTIVE ZERO ELECTRICAL CONTROL SYSTEM

Filed Dec. 23, 1963 20 Sheets-Sheet 7

SELECTIVE ZERO ELECTRICAL CONTROL SYSTEM

SELECTIVE ZERO ELECTRICAL CONTROL SYSTEM

Filed Dec. 23, 1963

20 Sheets-Sheet 13

SELECTIVE ZERO ELECTRICAL CONTROL SYSTEM

Sept. 19, 1967 E. J. TOSCANO ETAL 3,343,053

SELECTIVE ZERO ELECTRICAL CONTROL SYSTEM

Filed Dec. 23, 1963 20 Sheets-Sheet 17

UNITS DECADE
BI-DIRECTIONAL ABSOLUTE POSITION COUNTER

Sept. 19, 1967 E. J. TOSCANO ETAL 3,343,053

SELECTIVE ZERO ELECTRICAL CONTROL SYSTEM

Filed Dec. 23, 1963 20 Sheets-Sheet 20

United States Patent Office 3,343,053
Patented Sept. 19, 1967

3,343,053

SELECTIVE ZERO ELECTRICAL CONTROL SYSTEM

Esteban J. Toscano, Los Angeles, and Josef K. Holy, Torrance, Calif., assignors to Hughes Aircraft Company, Culver City, Calif., a corporation of Delaware Filed Dec. 23, 1963, Ser. No. 332,398
11 Claims. (Cl. 318—18)

ABSTRACT OF THE DISCLOSURE

A selective zero control for a machine having an incremental positioning system and controlled by a discrete signal program, in which a selected zero position may be programmed anywhere in an axis of movement and counting of increments of movement toward a programmed position is inhibited until the selected zero position is sensed.

This invention relates generally to electrical control systems and more particularly to numerically programmed systems for controlling power operated devices.

In this connection illustrative reference is made to positioning systems such as found in machine tool controls, for instance, wherein movable platens or tables, spindles, etc., are positioned in one or several axes in accordance with programs defined in some suitable type of numerical code.

In certain of its aspects this application is related to a copending application of Josef K. Holy, Ser. No. 225,725, filed Sept. 24, 1962, entitled Discrete Signal Electrical Positioning Control System, and assigned to the assignee of this invention, now Patent No. 3,209,222, issued Sept. 28, 1965.

With reference to positioning systems such as found in conventional machine tools, having three orthogonally related axes of freedom for workpiece and tool positioning movements, it has been found that where fixed mechanical zero references are involved in positioning movements in any one or more of the several axes of freedom, excesses of positioning movement may occur in situations where repetitive positioning movements are required. In the case of a turret drill, for instance, the machine spindle assembly is usually moved between a fixed mechanical zero or retracted position to a position in which the selected tool is disposed adjacent a surface of a workpiece, at which point further movement usually takes place at some prescribed feed rate for performing the selected machine operation. If holes are to be drilled in a flat plate, for instance, in selected places, the machine table may be positioned in one or both of its horizontal degrees of freedom to locate a spot on the plate beneath the drill. At this point the drill is moved from its fully retracted (zero) position at some selected traverse speed and adjacent the surface of the workpiece is switched to feed rate and the drilling operation performed. If another hole is to be drilled the tool is usually retracted to its fully retracted, or zero, position, the machine table repositioned, and thereafter the drill spindle assembly is moved from its fully retracted, or zero, position to perform the second drilling operation at the newly selected point.

The movement of the tool spindle assembly from tool clearance position to its fully retracted, or zero, position may represent, in this situation, a substantial portion of the total freedom of movement of the spindle axis, and where multiple drilling operations of this character are to be performed, the bulk of the time involved in the entire machining operation is represented in time spent moving the spindle assembly between its fully retracted and tool clearance positions with respect to the workpiece.

Efforts to minimize this problem have resulted in the provision of counters in machine tool controls in which a specified zero is programmed. However, conventional counter arrangements ordinarily lack adequate counter controls and such controls, if overshoot in retracting takes place, for instance, permit counting from other than the indicated zero and positioning errors frequently occur, even though the rate of axis movement is reduced as the selected zero position is approached.

Accordingly, one object of this invention is to provide an improved selective zero numerically controlled electrical system for selectively positioning a movable member in accordance with a predetermined discrete signal program in which errors due to overshoot or undershoot are minimized.

Another object of this invention is to provide an improved electrical system of control having provisions for minimizing movements of a member being positioned when repetitive positioning operations are programmed in which an absolute count of increments of positioning movement is maintained.

A further object of this invention is to provide an improved positioning control system having a variable zero reference in the electrical controls for at least one axis of freedom.

More particularly, it is an object of this invention to provide an improved positioning control system in which a selected one of a plurality of predetermined zero reference points may be programmed in a particular axis of freedom.

It is also an object of this invention to provide a control of the character referred to in the preceding object in which programming is simplified.

Further separate and combined objects of this invention are to provide a selective zero positioning control which requires only one transducer system per axis of control, which requires no machine installation or alignment, which permits high operating speeds in and about the selected point, which permits changing of selective zero levels without intermediate full retraction, and which substantially obviates counting errors about the zero point.

The aforesaid and other objects and advantages may be accomplished in a numerically programmed type of machine tool control according to a presently preferred embodiment of this invention, in the provision of a selective zero control for at least one axis of freedom. While such an arrangement may be applied in any axis of freedom of a machine such as machine tool, or other machine having a movable machine element or member to be positioned, particular advantages are found in the application of the selective zero control in moving and positioning a cutting tool along its feed axis.

For the purposes of this discussion a numerically programmed type of machine tool control is assumed. Such a machine tool control includes suitable information input equipment defining a program of operation for the tool. The information input equipment may be any standard type of discrete signal equipment such as a tape reader, for instance, which presents a discrete signal program, which may be in binary coded decimal form, in a serial-parallel type of information system. The output of such a tape reader is usually applied to a suitable type of electrical control which includes a distributor for distributing serially presented groups of discrete signals to different storage or utilization points in the system for the purpose of controlling the machine tool. Such storage or utilization points may include position counters or counting registers which store discrete signals defining desired positions of the several movable machine tool members in their respective axes of freedom.

The system also includes suitable incremental position transducers operated by the movable members in the several axes of freedom for the purpose of producing signals representing increments of displacement as the members are moved in their respective axis, to thereby provide a count of actual positioning movement which is compared in any suitable manner with the contents of the position counters, which latter indicate desired positions in the respective axis.

The incremental position transducers, whether of the rotary type or the linear type, usually have a fixed zero or reference position representing the point in a particular axis at which the count of increments of positioning movement takes place. Where a position counter or counting register is employed to indicate a desired position of a member in its axis of freedom, the signals generated with each increment of displacement by the incremental position transducers as positioning movement takes place, may be applied to the position counter or counting register in such sense as to provide count down operation. At the time the position counter is counted down to zero or some other predetermined minimum count which in a particular system represents the desired position, the movable member is stopped and positioning is completed.

To obviate the need for counting from a fixed zero reference of the incremental position transducers with each positioning movement, provision is made herein in the use of a bi-directional, absolute position counter operated by the incremental position transducers, a transfer memory and an active memory having the selective zero reference, together with a comparison gate, for selectively establishing a zero reference point from which scale counting takes place and which, as part of the selective zero function, provides suitable controls in the system to inhibit counting by the position counter or counting register of the discrete signals of the incremental transducer until such time as the zero reference point which has been selected is sensed. Thereafter, counting may take place in the manner described hereinabove, or in some other suitable manner, under the control of the discrete signals generated by the incremental position transducers.

The selective zero reference is read from the tape and set into the buffer memory. When the movable machine member moves out of its retracted position a signal transfers the contents of the buffer memory to the active memory. The count of the active memory is compared with the count of the bi-directional counter. Scale counting by the position counter (hereinafter referred to as the Z position counter ZPC) is inhibited until the count of the bi-directional counter equals the zero reference in the active memory.

The distance the movable member is to move is programmed from the selected zero reference and is set into the position counter. The distance the movable member is to move at feed rate is programmed and set into a feed position counter (hereinafter referred to as the F position counter FPC) the distance over which the movable machine member will move at feed rate is less than the distance established by the selective zero reference.

With this arrangement, the positioning program which is written on the tape, or other discrete signal program carrier, defines a desired position of the movable machine member with respect to a particular scale zero point which has been selected and identified by the zero reference and the system provides controls whereby the movable machine element moves out of its fully retracted position at rapid traverse rate but scale counting will take place only from that selected zero point after sensing of the selected zero reference has taken place.

When the selective zero reference is sensed movement of the movable member continues at rapid traverse rate and the Z position counter is counted down. When the count in the Z position counter equals the count in the feed or F position counter, the movable machine member is switched from rapid traverse to feed rate and the Z position counter is counted down to zero count. At a predetermined count from zero the movable machine member is switched to creep rate. At zero count the movable member stops and then begins to retract and counts down the F counter. Once the positioning operation has been performed and the movable member is being retracted, the selected zero reference in the active memory defines the limit of retraction of the movable machine member from which another positioning movement in the associated axis of freedom may take place, after the occurrence of coincidence between the bi-directional counter and the active memory.

The aforesaid and other objects and advantages, together with other embodiments of this invention, will become apparent from a study of the following specification when considered in conjunction with the accompanying drawings in which:

FIG. 1 graphically denotes certain positioning movements in the feed axis of a machine tool system in relation to a schematically represented feed axis;

FIG. 2 illustrates a typical tape format usable in practicing this invention;

FIG. 3 graphically depicts idealized pulses in respective pulse trains denoting increments of positioning movement in both positioning and retracting directions, that is, positive or negative directions;

Figure 4:
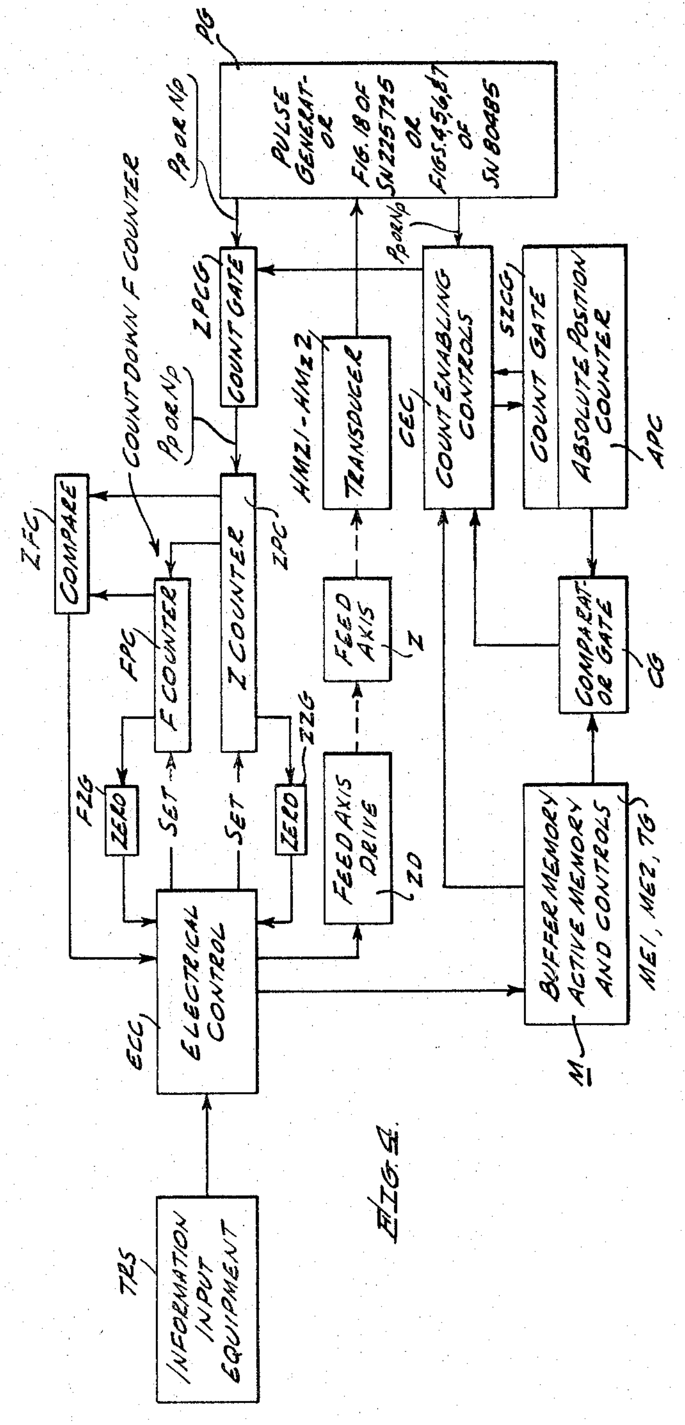
FIG. 4 is a block diagram of an improved electrical control system affording selective zero positioning operation and embodying the principles of this invention.
Figure 5:
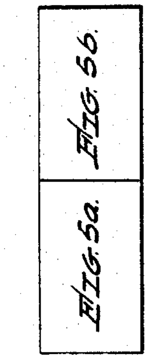
FIG. 5 illustrates the physical arrangement of the sheets of drawings containing FIGS. 5*a* and 5*b*.
Figure 5A:
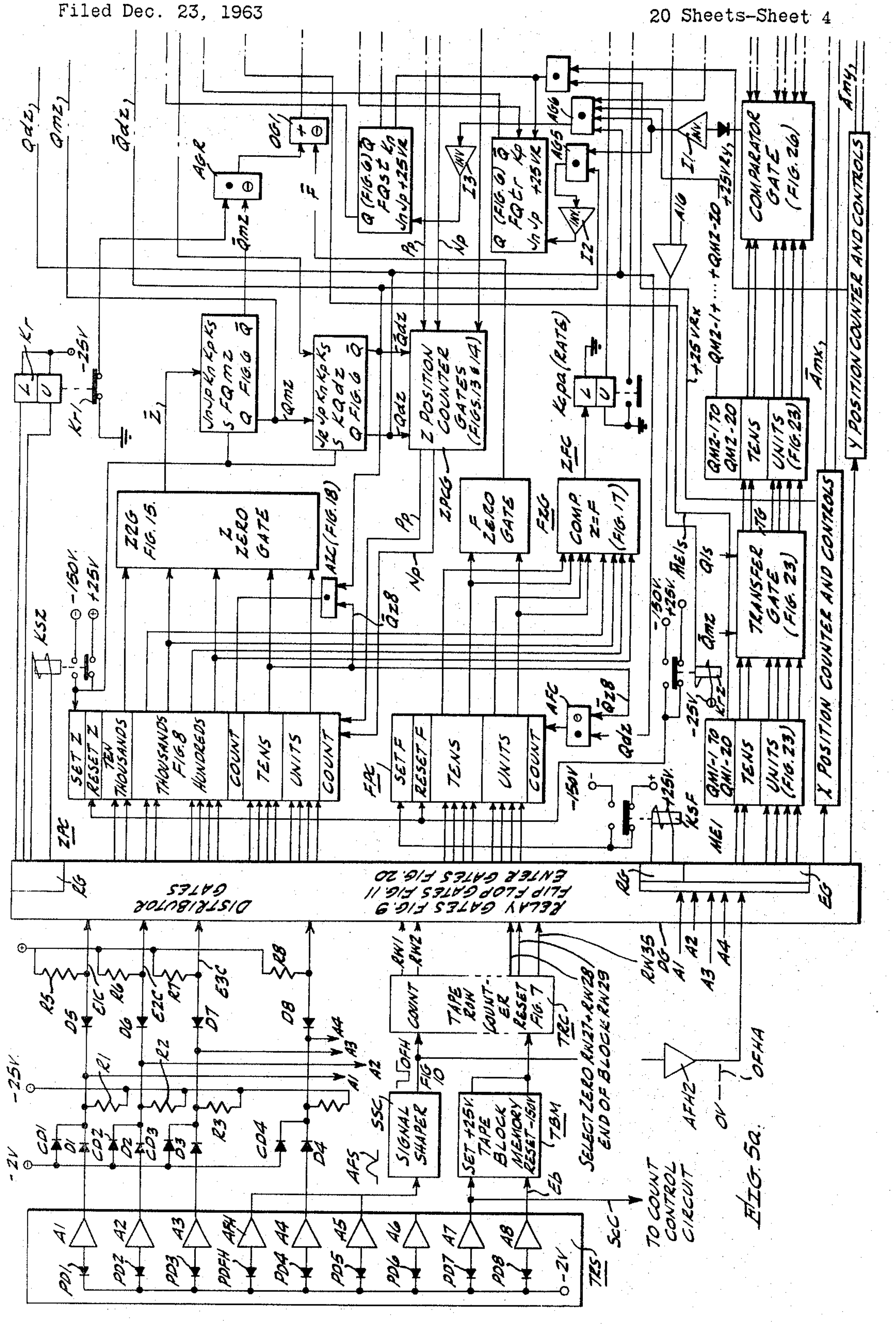
Figure 5B:
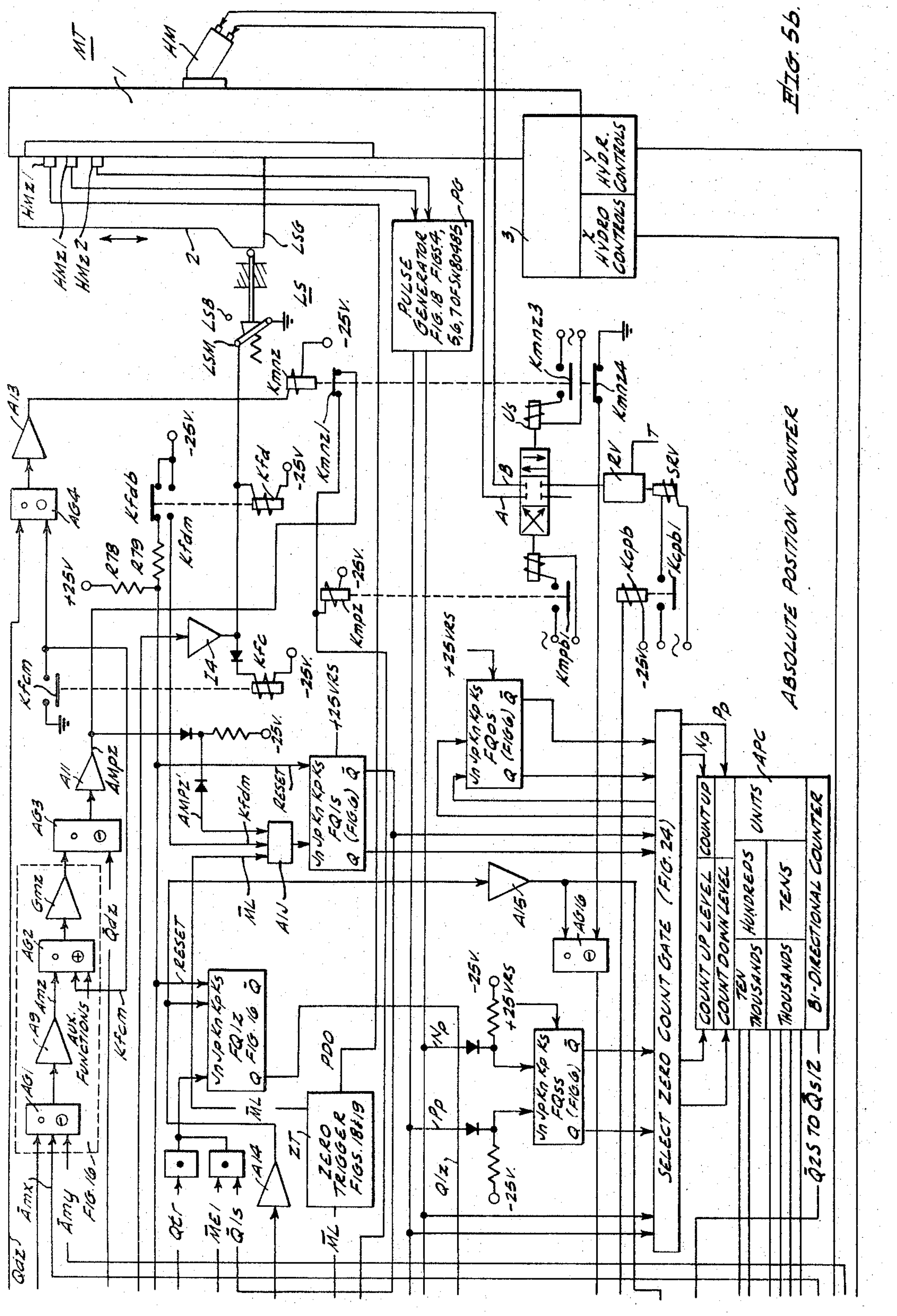
Figure 6:
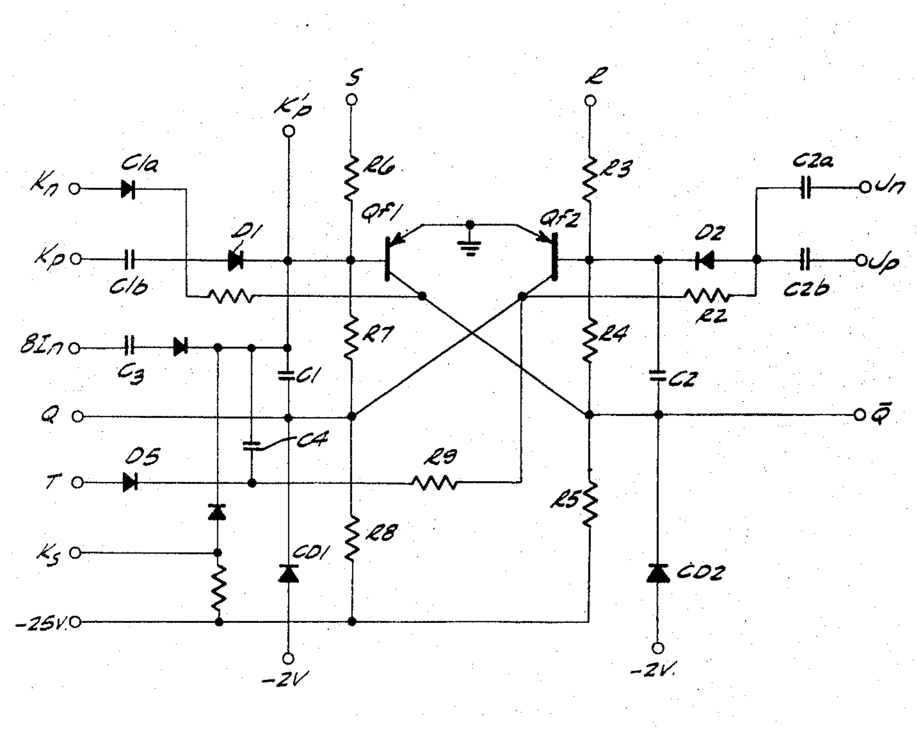
Figure 7:
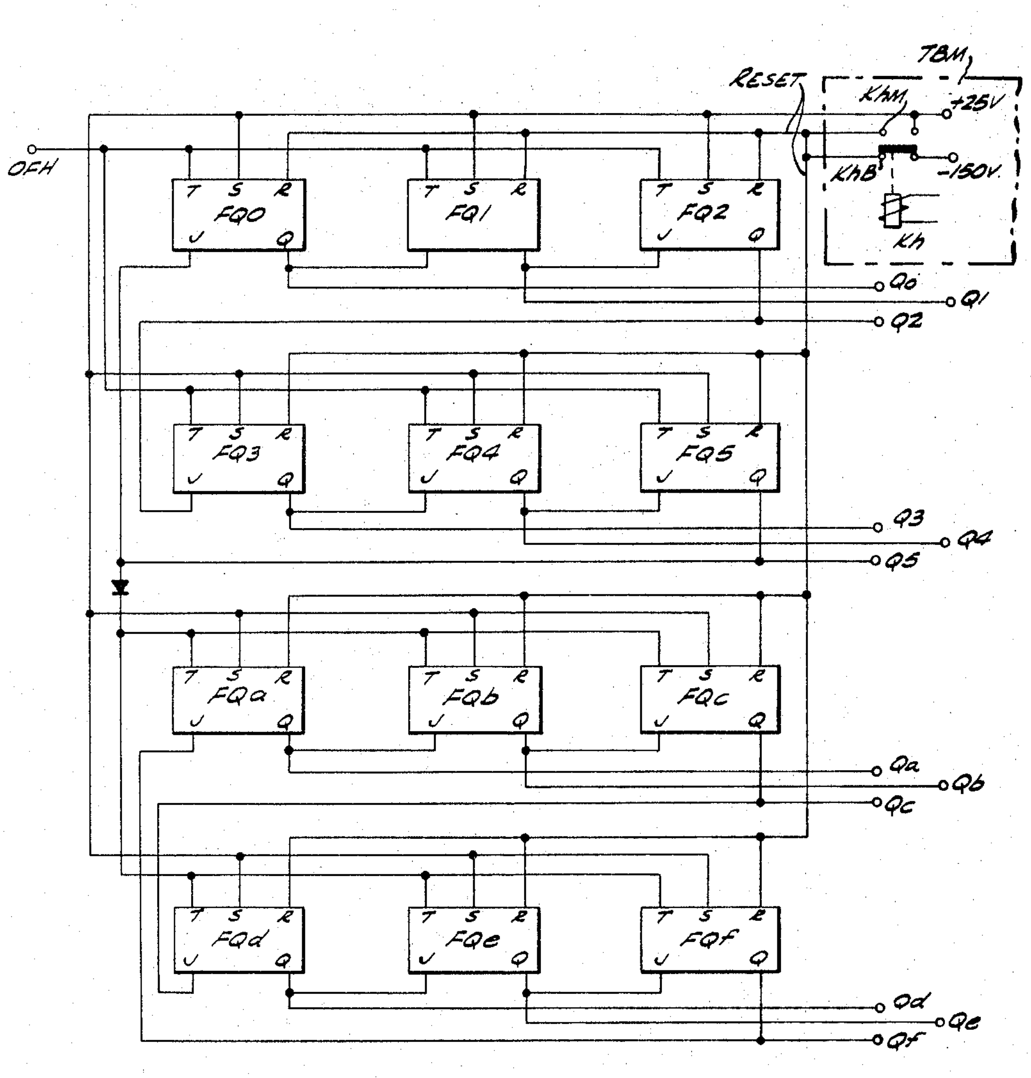
Figure 8:
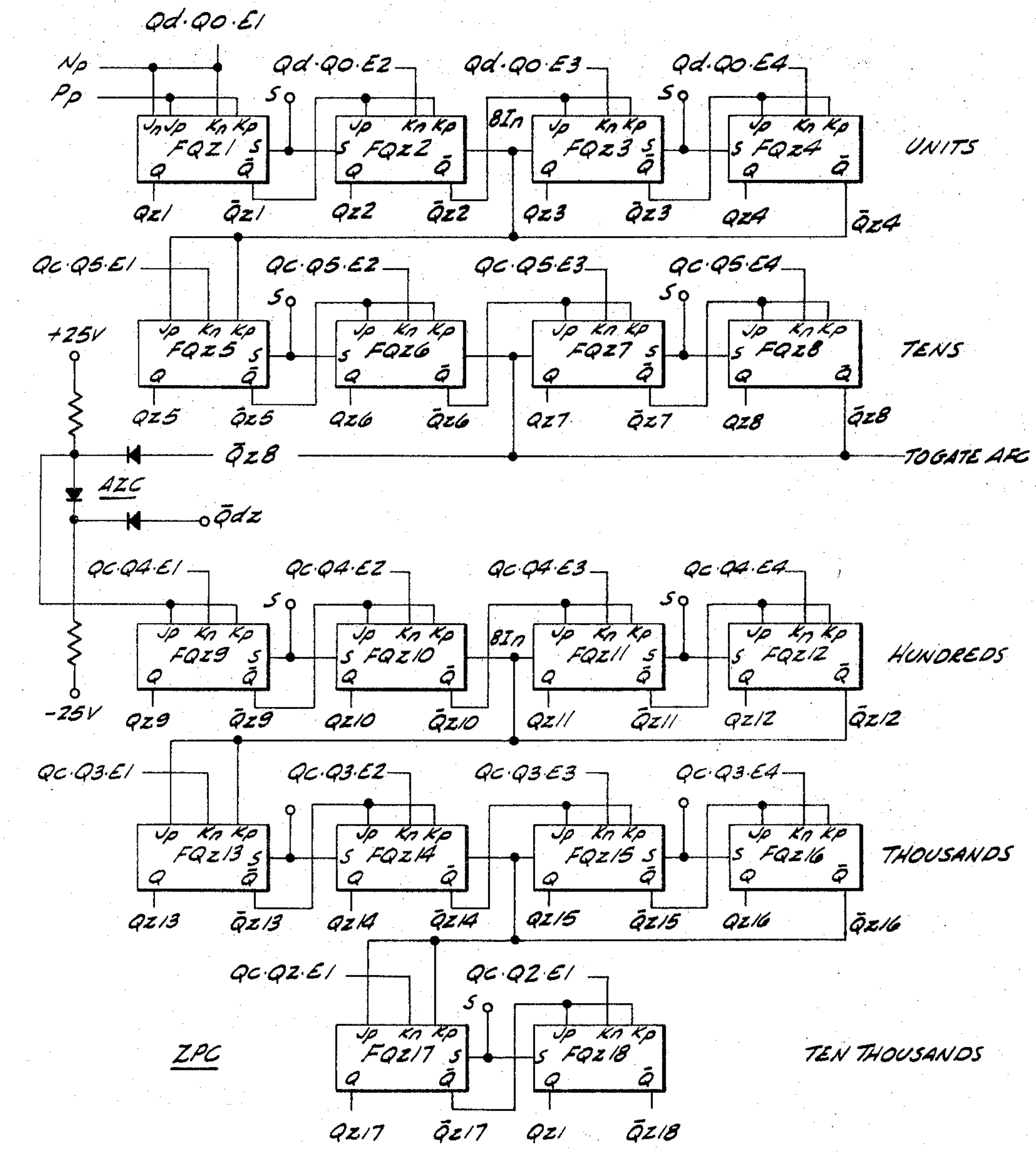
Figure 9:
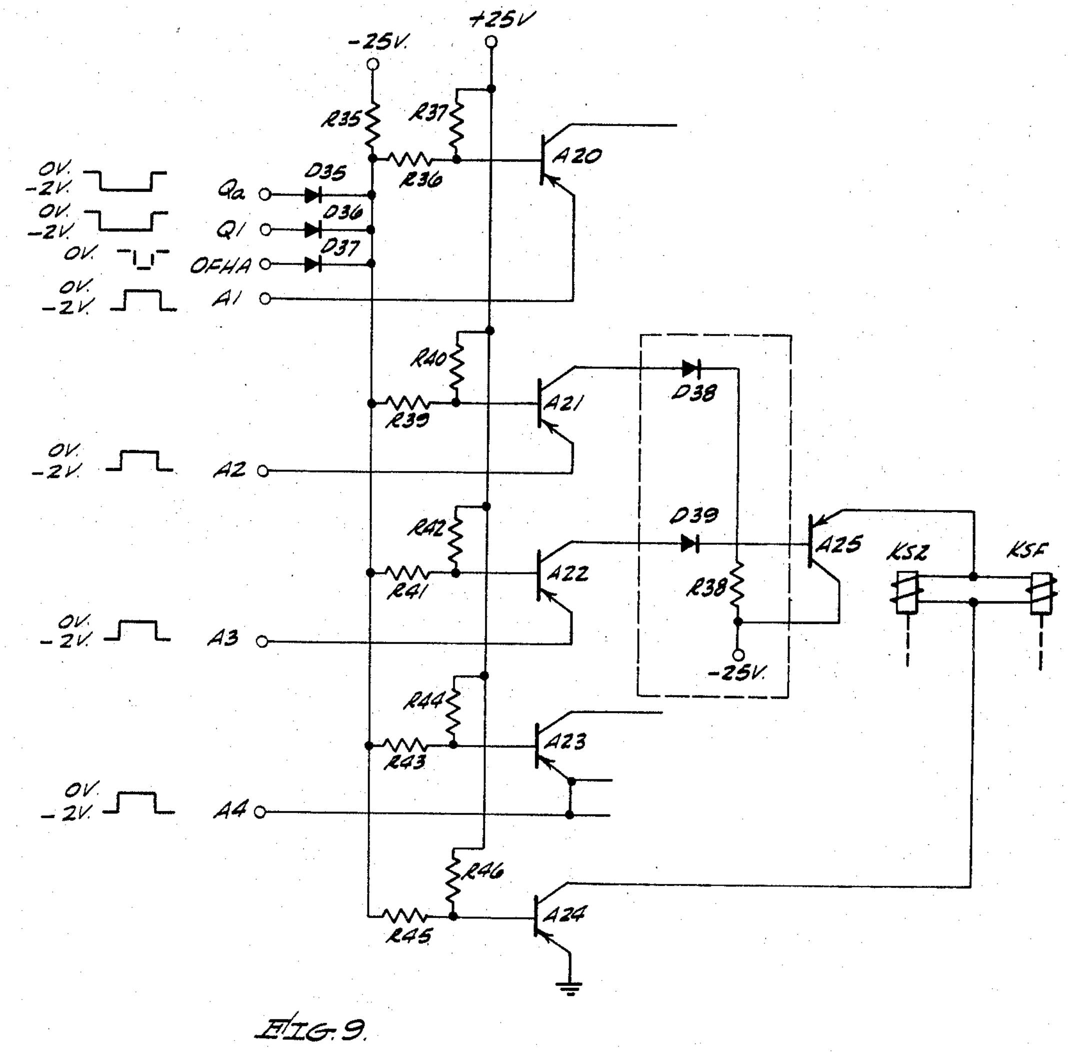
Figure 10:
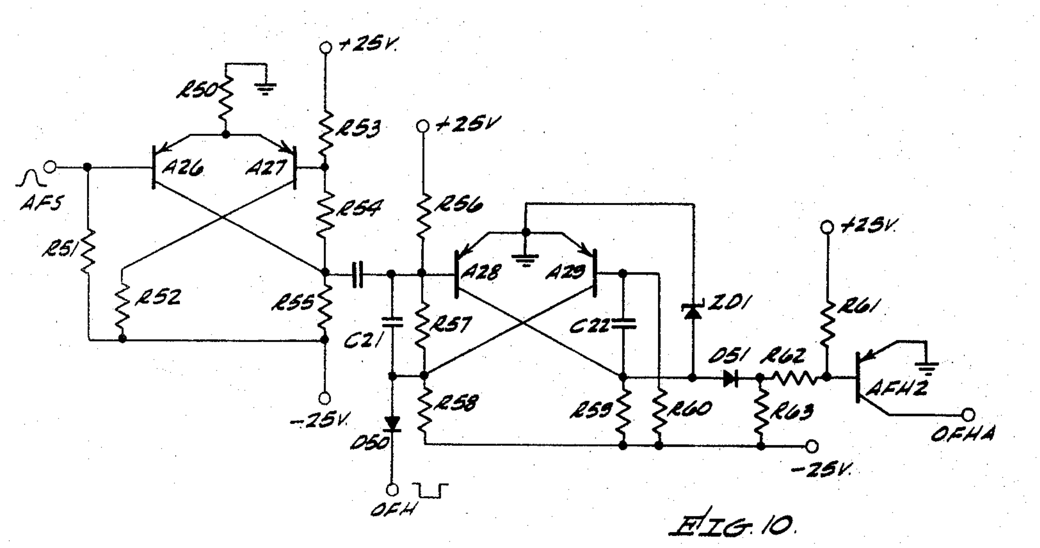
Figure 11:
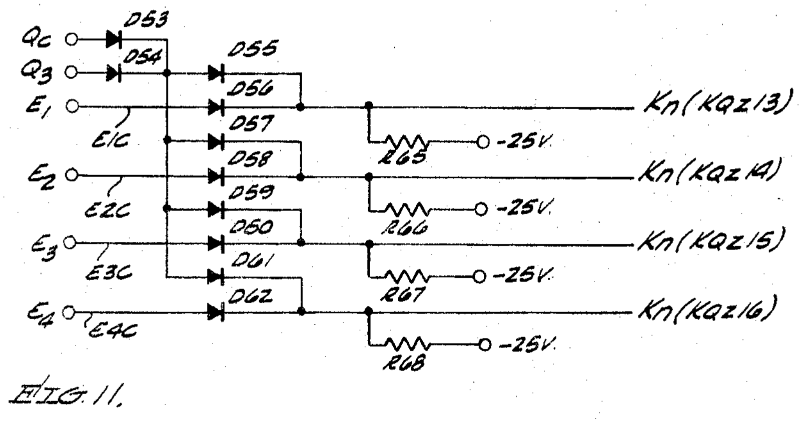
Figure 12:
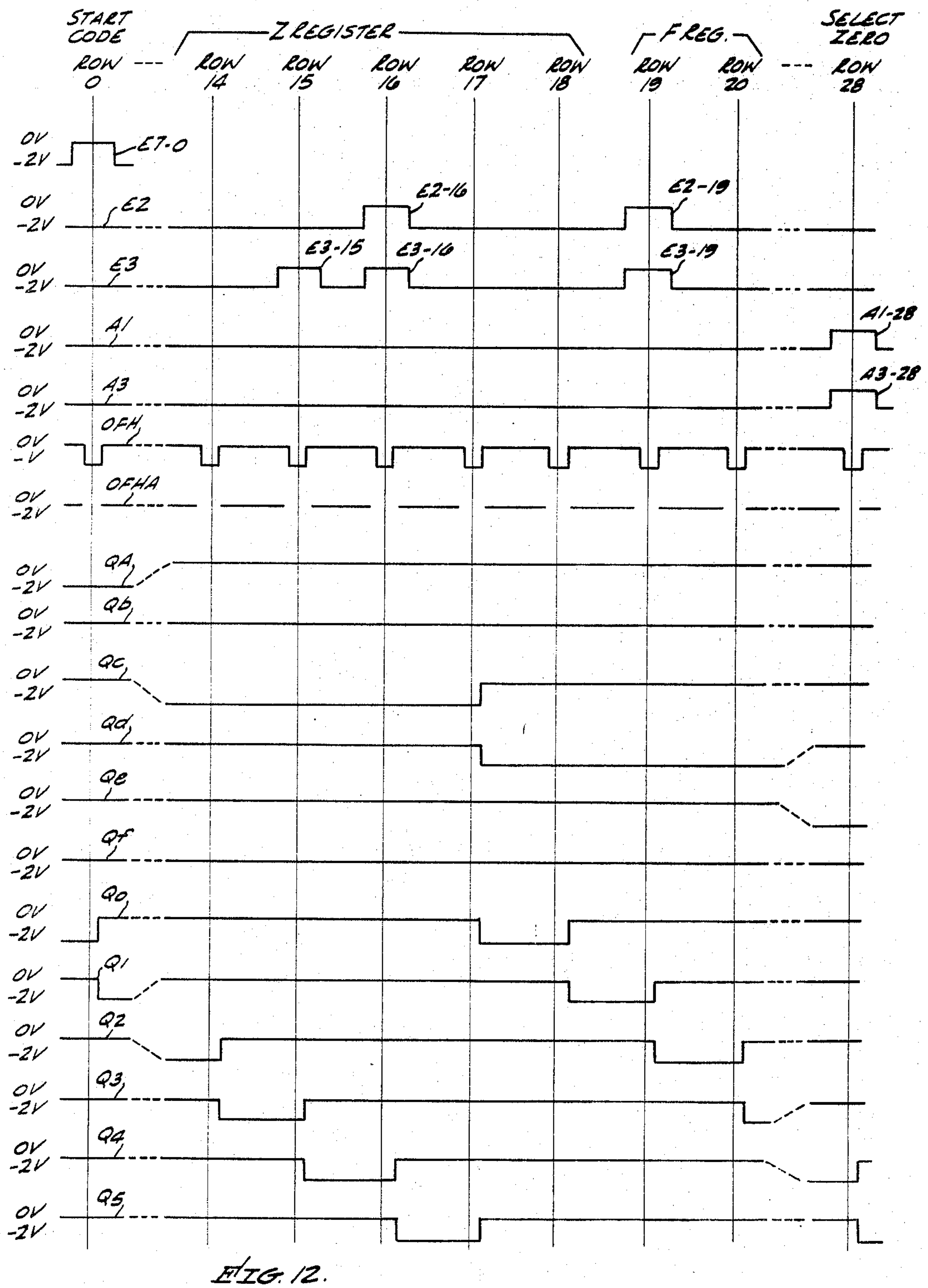
Figure 13:
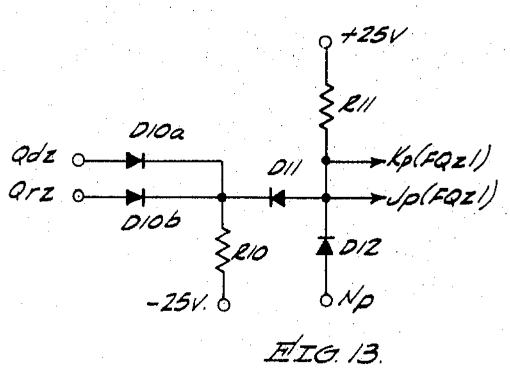
Figure 14:
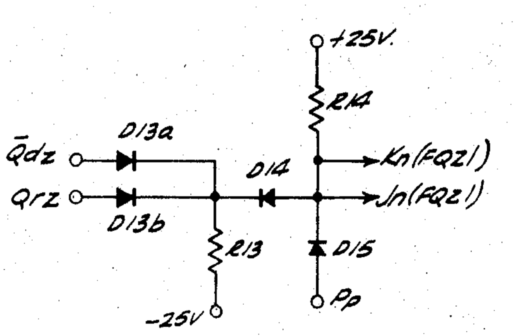
Figure 15:
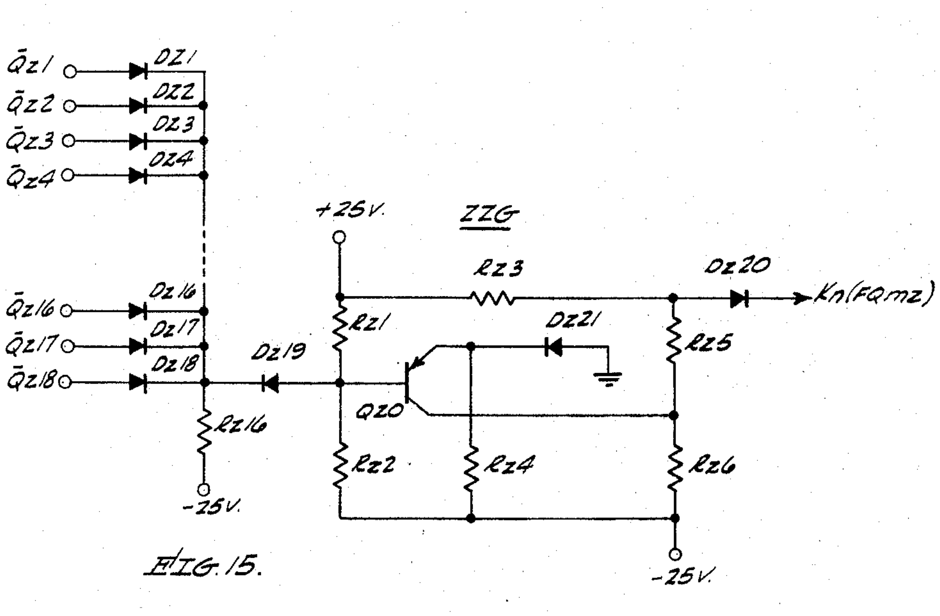
Figure 16:
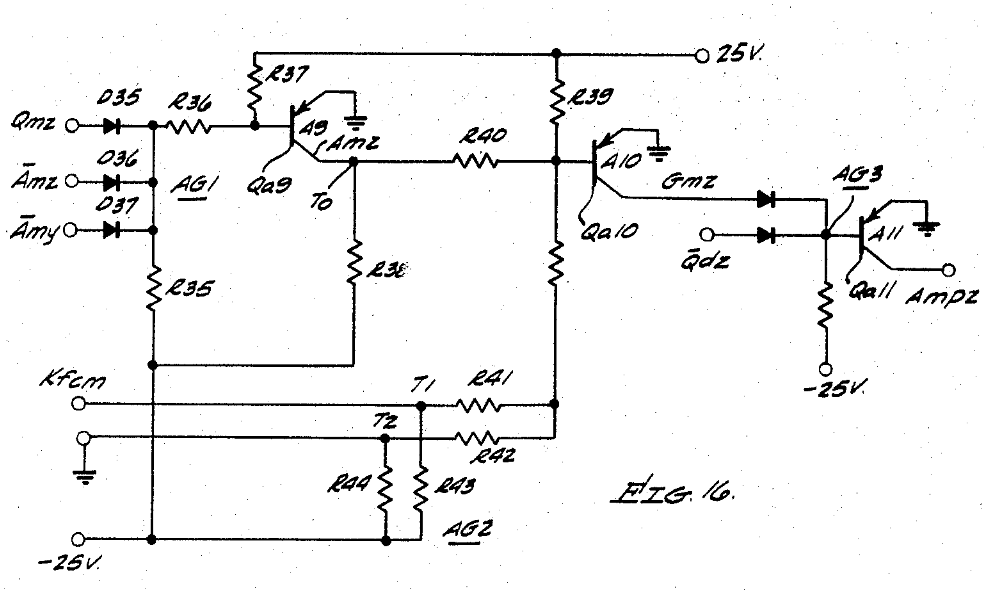
Figure 17:
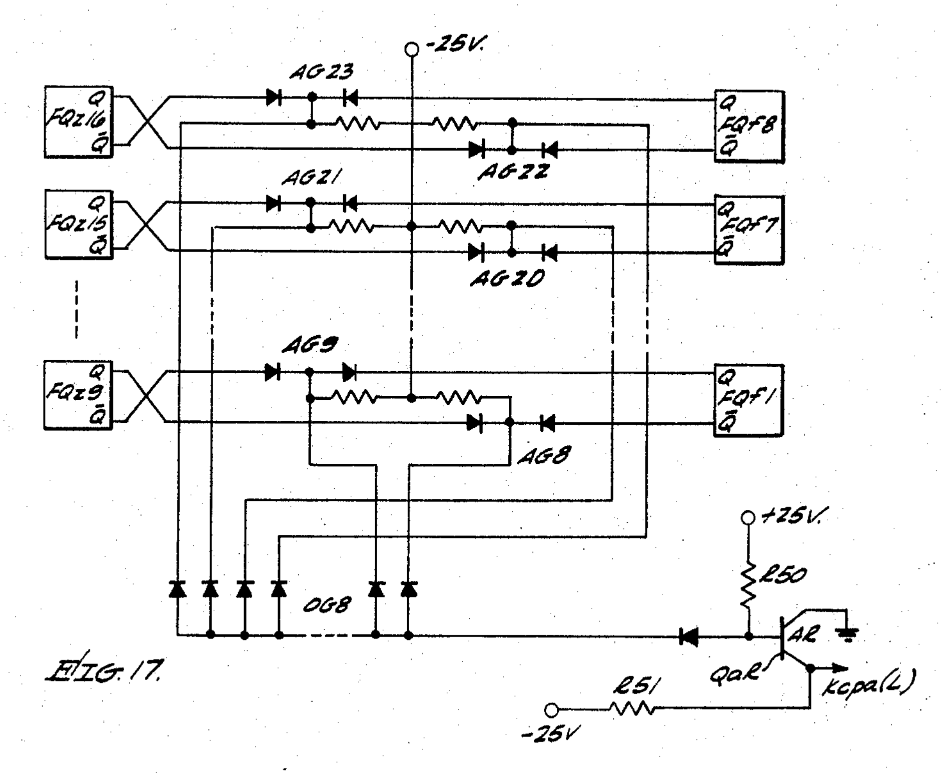
Figures 18, 19, 19A:
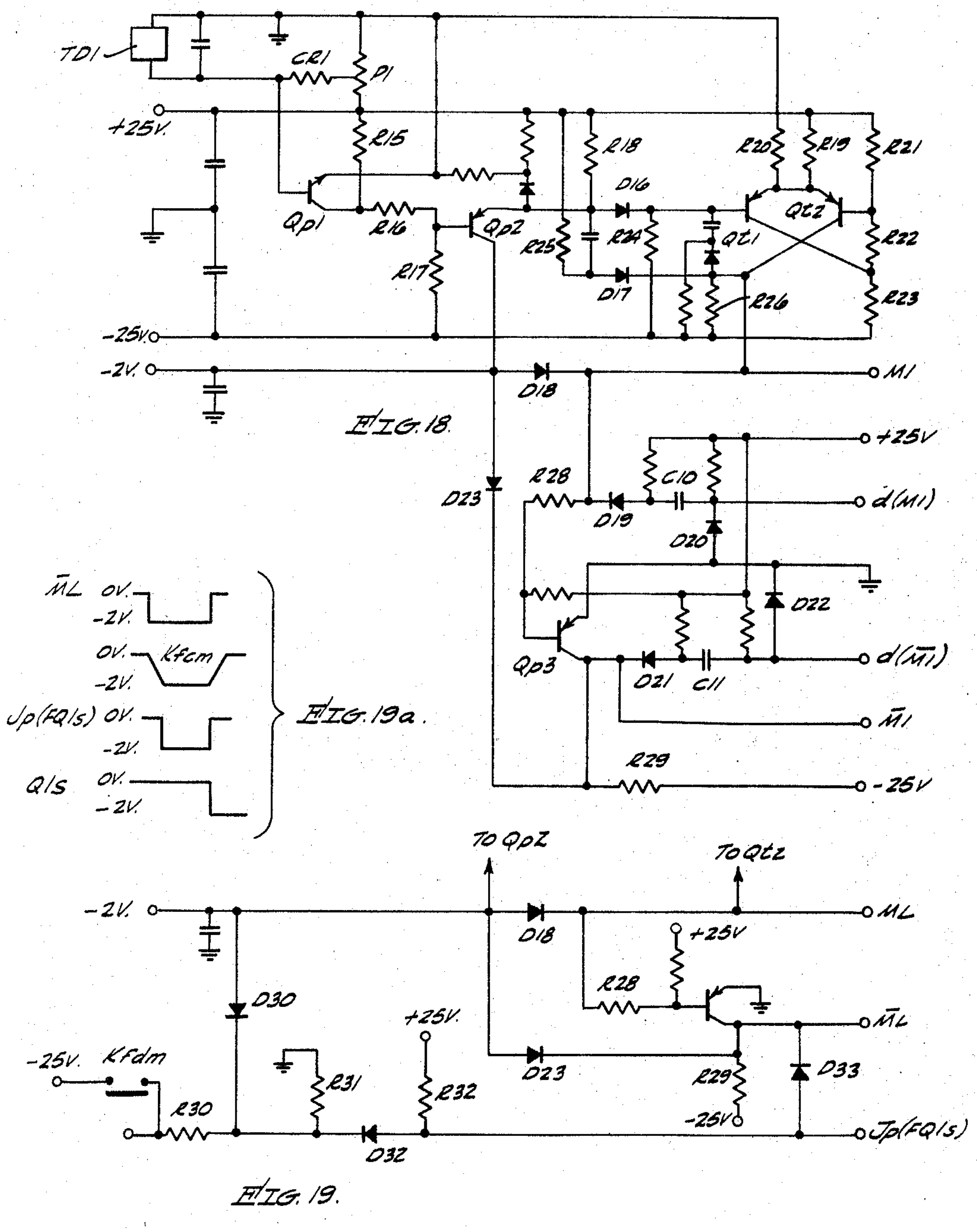
Figure 20:
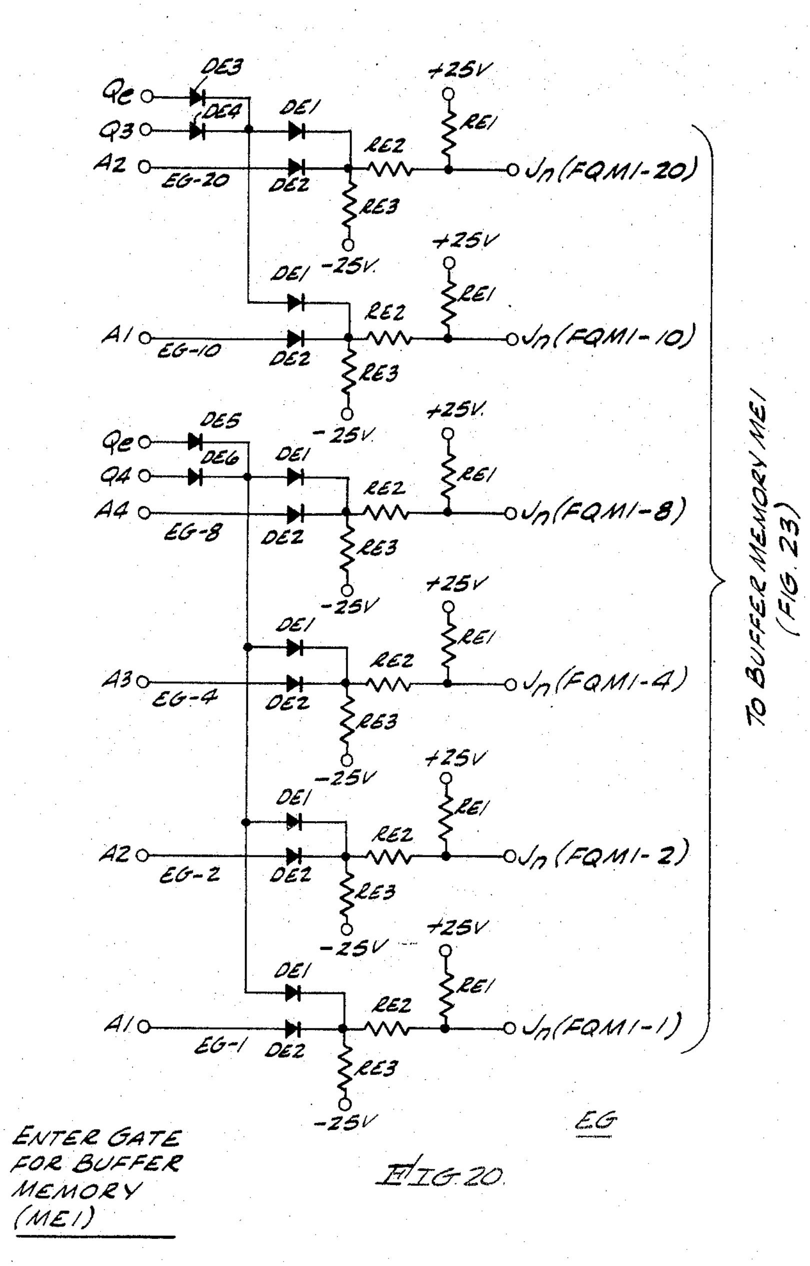
Figure 21:
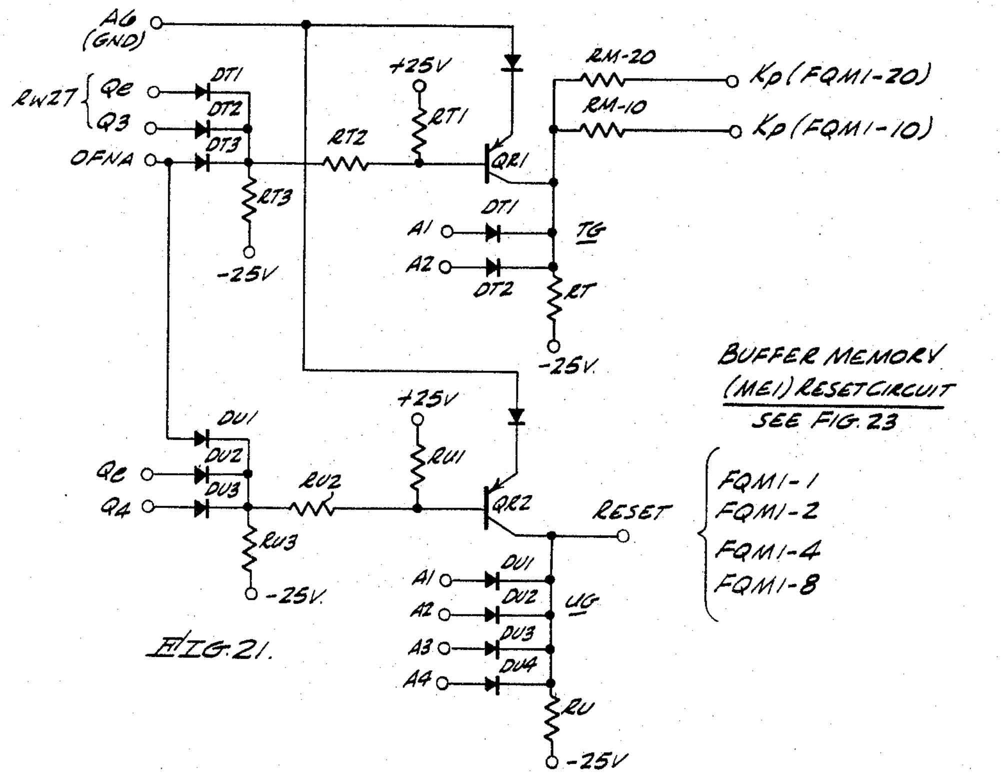
Figure 22:
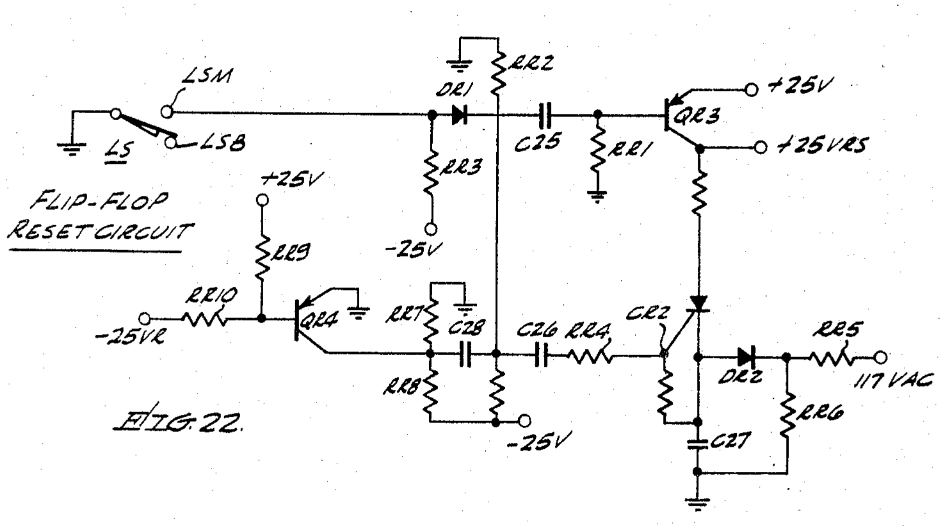
Figure 23:
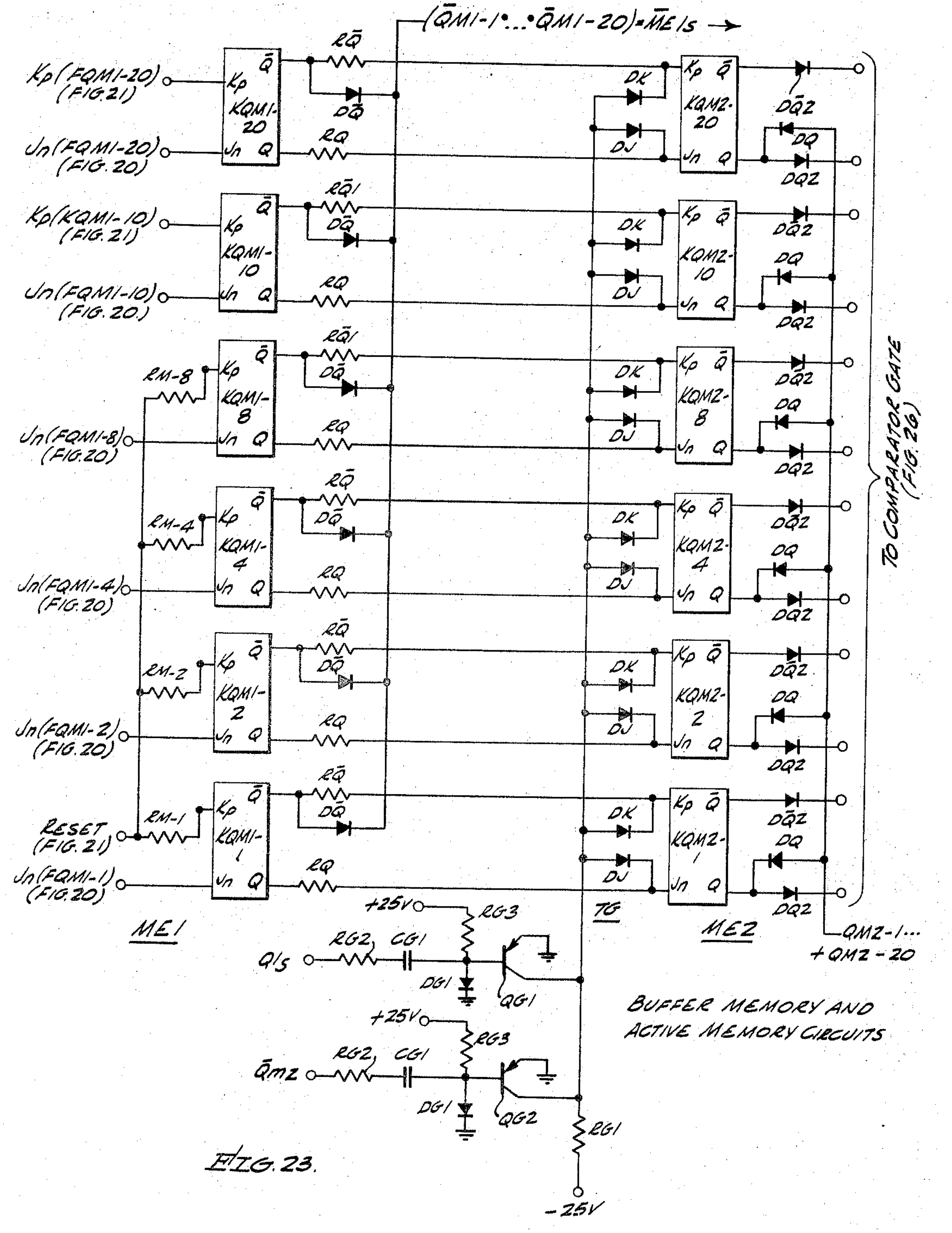
Figure 24:
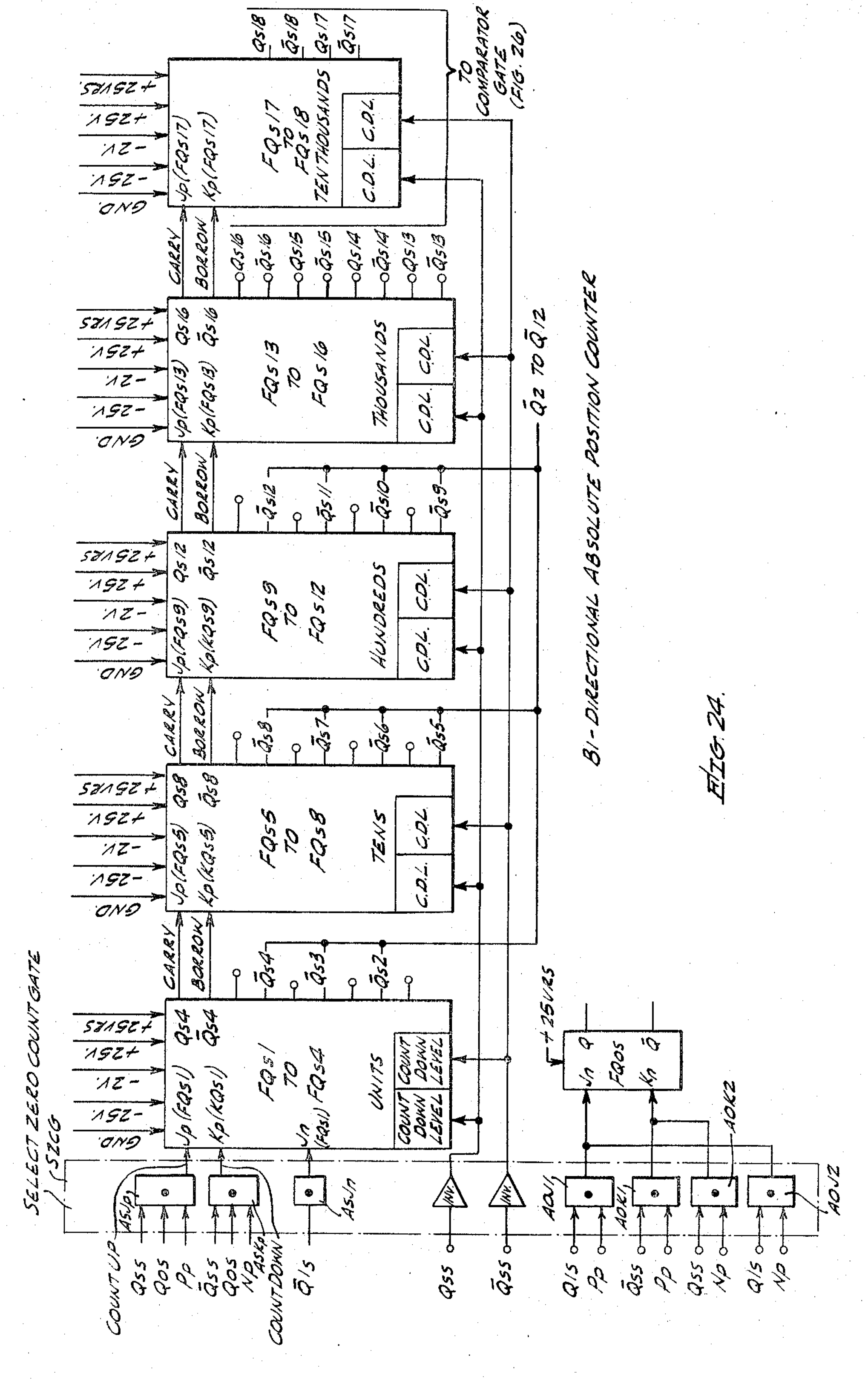
Figure 25:
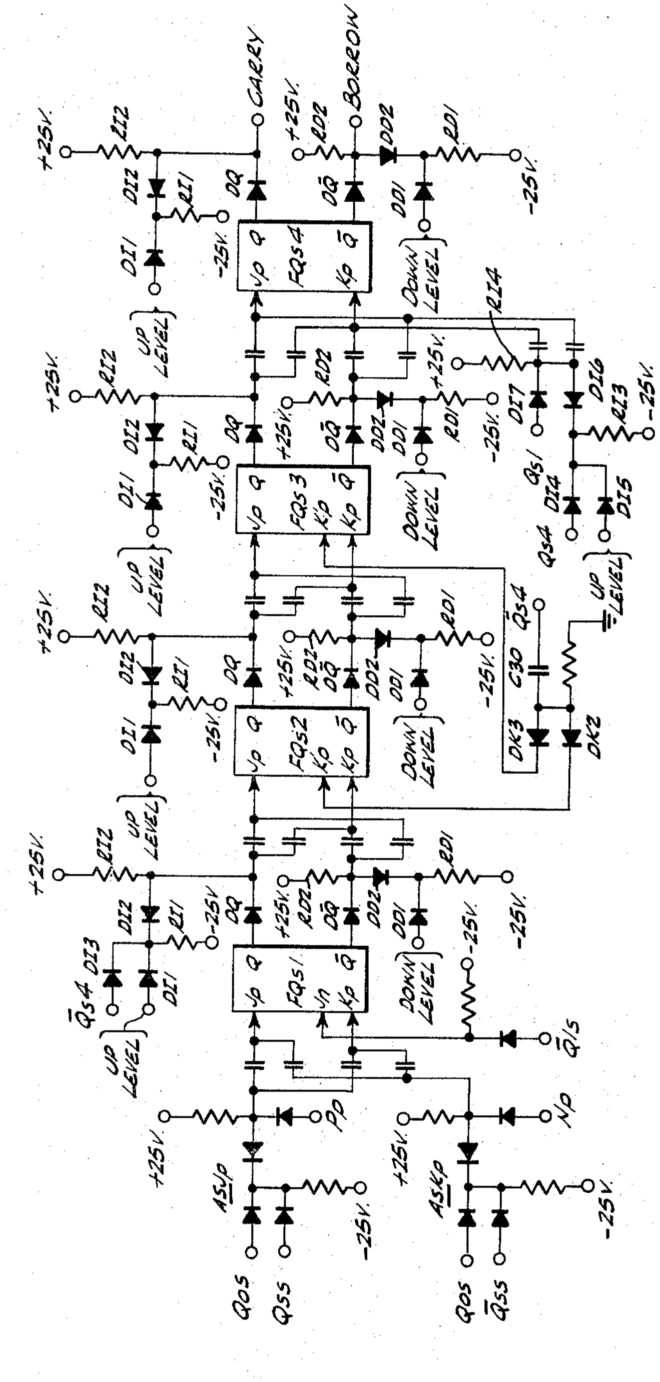

FIGS. 5*a* and 5*b* together, in greater detail than FIG. 4, illustrate a positioning system affording selective zero positioning operation in accordance with the principles of this invention;

FIG. 6 is a circuit diagram of a typical flip-flop employed in this invention;

FIG. 7 is a block diagram of a counter forming part of an electrical distributor employed herein;

FIG. 8 is a block diagram of a counter register used as a Z position counter herein in controlling positioning movement in a particular axis;

FIG. 9 illustrates certain details of a typical relay gate employed in this invention;

FIG. 10 illustrates the circuit details of a signal shaper circuit incorporated herein;

FIG. 11 illustrates the details of a typical flip-flop gate;

FIG. 12 is a signal timing diagram;

FIGS. 13 and 14 together form a count gate assembly used in controlling count-down operation of the Z position counter of FIG. 8;

FIG. 15 illustrates a circuit used to indicate when the contents of the counter of FIG. 8 are zero;

FIG. 16 illustrates the details of an amplifier arrangement for controlling movement of the movable member;

FIG. 17 diagrammatically illustrates a type of discrete signal comparator employed herein;

FIG. 18 illustrates certain details of an electrical circuit used in developing discrete signals or pulses under the control of the incremental position transducer and which are applied to count down the position counter of FIG. 8;

FIG. 19 is a fragmentary modification of the circuit of FIG. 18 illustrating a zero trigger circuit forming part of the selective zero control;

FIG. 19*a* is a timing diagram of signals associated with the circuit of FIG. 19;

FIG. 20 illustrates an enter gate used for setting the flip-flops of a buffer memory;

FIG. 21 illustrates the reset circuits for the buffer memory;

FIG. 22 illustrates another reset circuit for resetting flip-flops in the selective zero circuits;

FIG. 23 is a block diagram of a buffer memory and an active memory coupled by a transfer gate;

FIG. 24 is a block diagram of a bi-directional absolute position counter;

FIG. 25 is a block diagram of one decade of the absolute position counter; and

Figure 26:
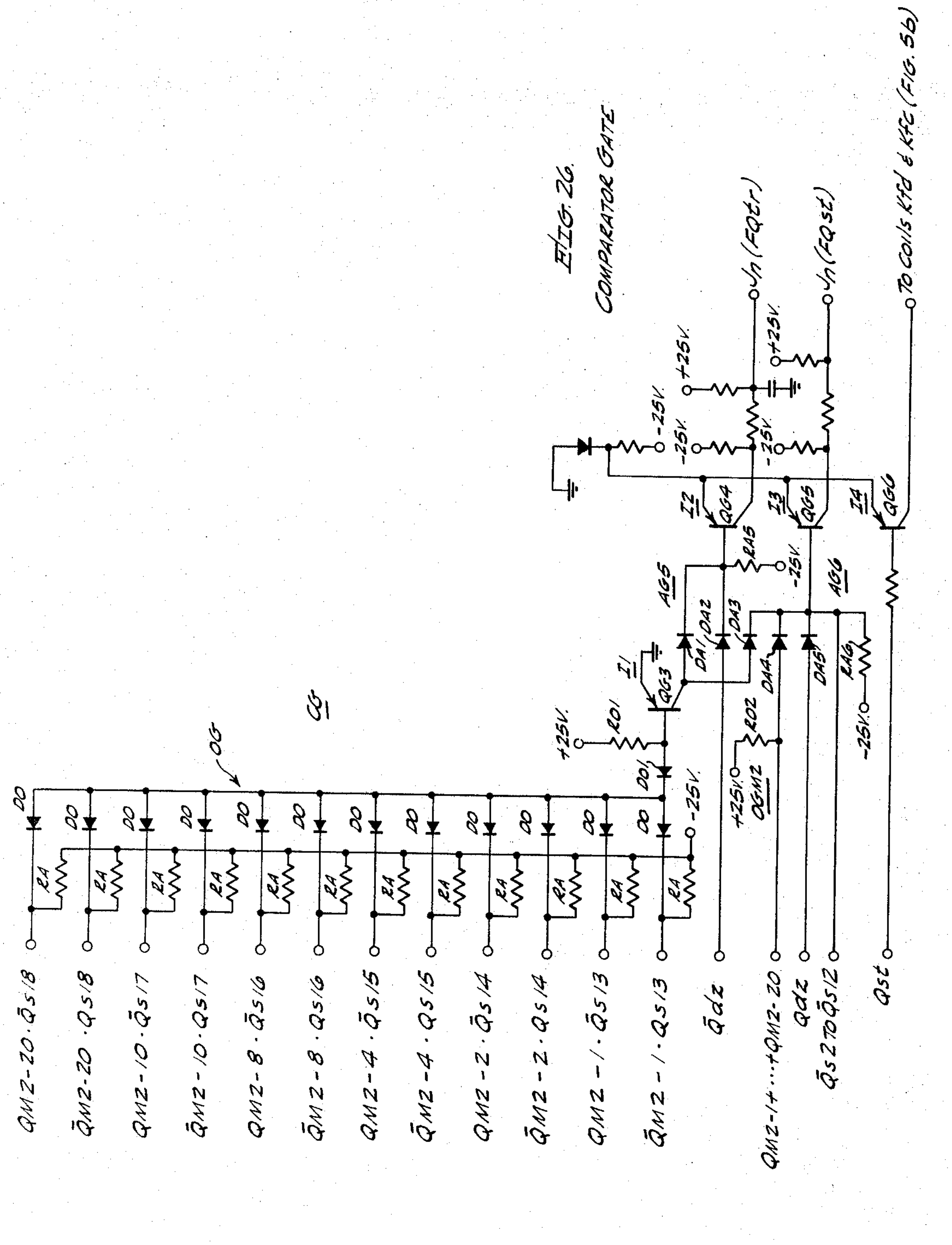

FIG. 26 is a circuit illustrating details of a comparator gate for comparing the outputs of the active memory and the absolute position counter.

Figure 1:
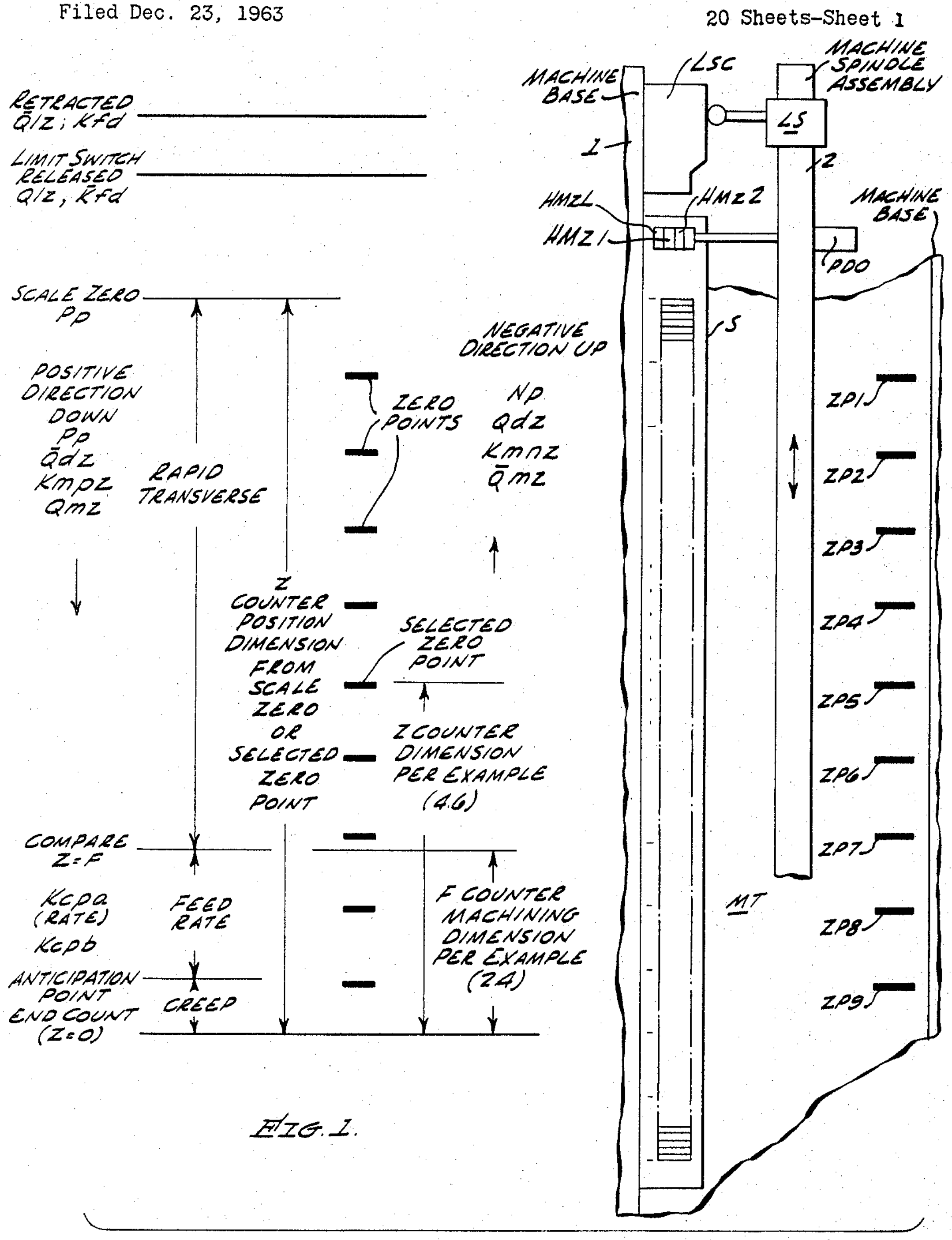

Referring to FIGS. 1, 2, 3 and 4, the arrangement illustrated therein is primarily directed to the control of a machine tool MT (FIG. 1) wherein provision is made for selecting any one of several specifically identified positions along the feed axis of a machine spindle assembly as the zero reference for positioning operations in that axis. Such a machine tool assembly may typically include a machine base 1, which is stationarily mounted, and a movable spindle assembly 2 which, as illustrated in FIG. 1, may move up and down with respect to the machine base.

For the purpose of determining the actual position of the movable spindle assembly along its axis of freedom, an incremental position transducer is provided which comprises a scale S having a plurality of grooves therein on equally spaced centers. In one typical embodiment of this invention such a scale includes grooves which are on four mil centers. The scale is of magnetic material. The scale is resolved by means of a pair of magnetic heads, here denoted HMz1 and HMz2, which are disposed in side by side relationship and each of which includes a resolving pole face which is capable of resolving the lands and grooves of the scale S. The resolving pole faces of the magnetic heads are displaced relative to one another in a direction axially of the scale in the amount of about one-fourth of a scale division, a scale division being defined as the distance between corresponding adjacent points along the scale. In this illustration, the magnetic heads are connected to the machine spindle assembly tool and move therewith, the assembly being such that the magnetic heads sweep the length of the scale from start to finish for full movement of the spindle assembly along its axis of freedom. Alternatively, the scale may be on the spindle and the heads on the base.

The details of such an incremental transducer system may be found in Patent No. 2,848,698, of T. T. Kumagai et al., issued Aug. 19, 1958, and assigned to the assignee of this invention. As the magnetic heads sweep the lands and grooves the reluctances of the magnetic circuits change. As described in the patent aforesaid, the output voltages of these magnetic heads, which may be ideally depicted as square waves displaced in phase relation by 90 electrical degrees, are used to produce scale counts on a 4 mil scale division, indicative of 1 mil increments of displacement.

Figure 3:
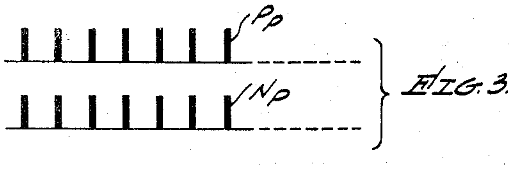

In accordance with the teachings of a copending application of R. C. Bell, Ser. No. 80,485, filed Jan. 3, 1961, entitled Condition Responsive Electrical System, now Patent No. 3,262,105, issued July 19, 1966, and assigned to the assignee of this invention, the electrical output signals of the magnetic heads after clipping and squaring are inverted. Both the signal and inverted signal are differentiated and the differentiated signals selectively combined with the signals and inverted signals, in a selected one of the two stable states of the signal and inverted signal, to provide an indication of increments of displacement and the direction in which displacement is taking place, in the production of respective pulse trains, $P_p$ or $N_p$, for either direction of movement. Typical pulse trains, $P_p$ and $N_p$, representing positive (down) and negative (up) directions of movement of the machine spindle assembly, respectively, are shown in FIG. 3 herein.

For the purpose of selecting points other than the zero position of the scale S as the zero reference from which positioning movement will take place, the machine control is provided with a suitable memory and bi-directional counter facility arranged to define spaced selective zero positions which are in axially spaced relation along the machine support, herein denoted by lines adjacent the spindle, and identified ZP1 through ZP9, providing 9 different zero reference points.

In one practical embodiment of this invention the electrical controls provide zero reference points on one inch centers along the spindle path of movement substantially spanning the range of displacement of the spindle. Spacing the selective zero points on one inch centers provides a convenient distribution of zero points for one particular application so that zero points in proximity to tool clearance points for varied workpiece configuration are available. At the same time the number of points is small enough that programming is minimal and system complexity in the memories and the controls and the circuits associated therewith is minimal. Other zero point spacings may be used as required.

In operation, provision is made for programming a selected one of points ZP1 through ZP9 on the tape, whence, as the tape is read, the selective zero reference is set into the memory. The bi-directional counter keeps track of the absolute position of the machine spindle so that the selected zero position is established whenever the count in the bi-directional counter equals the count in the memory. As will be described, the ensuing response of the system is effective to initiate counting down of a position counter containing the dimension for positioning of the machine spindle assembly in its axis of freedom with respect to the selected zero point.

The fully retracted position of the machine tool is indicated by means of a limit switch, here illustrated as being mounted on the machine spindle assembly. The limit switch is designated LS and is provided with an actuating arm which projects outwardly therefrom and engages the surface of a cam LSC which is mounted on the machine base 1. As the machine spindle assembly moves downwardly the limit switch actuating member is released from the cam and the limit switch occupies its out-of-limit position. In the position indicated the limit switch is in its in-limit position.

As indicated in the left of FIG. 1, the extreme upper limit of movement of the machine spindle assembly is identified as the retracted position. Beneath this retracted position is another line indicating the position at which the limit switch is released to indicate that the machine has moved out of its fully retracted position. The fixed scale zero mark is indicated adjacent the first groove on the scale S. In the system herein to be described, two position counters, or counting registers associated with the positioning of the machine spindle, are used. One of these is referred to as the Z position counter ZPC and defines the total distance that the machine spindle assembly is to move, either from scale zero or from some selected zero position, to the final machining position. The other position counter or counting register is referred to as the F position counter FPC and is set to define the distance over which the machine spindle is to move at feed rate.

The machine spindle assembly is initially operated at rapid traverse speed as it moves out of retracted position past the scale zero position and towards the position defined by the F counter, at which latter position the machine spindle is to be switched to feed rate. The position at which this change-over takes place is the position in which the remaining count in the Z counter is equal to the count which has been set into the F counter. This is accomplished by suitable comparator circuits. Thereafter, the machine spindle moves at feed rate until the Z counter is counted to zero. An anticipation point may be provided which may be some predetermined fixed count, say .039 thousandth, that is, 39 counts from zero, at which the system may be switched to creep mode.

FIG. 1 also illustrates the respective positions in which the Z count may be started under the control of the selective zero operation hereof and covers a positioning example to be described hereinafter.

TAPE FORMAT

Figure 2:
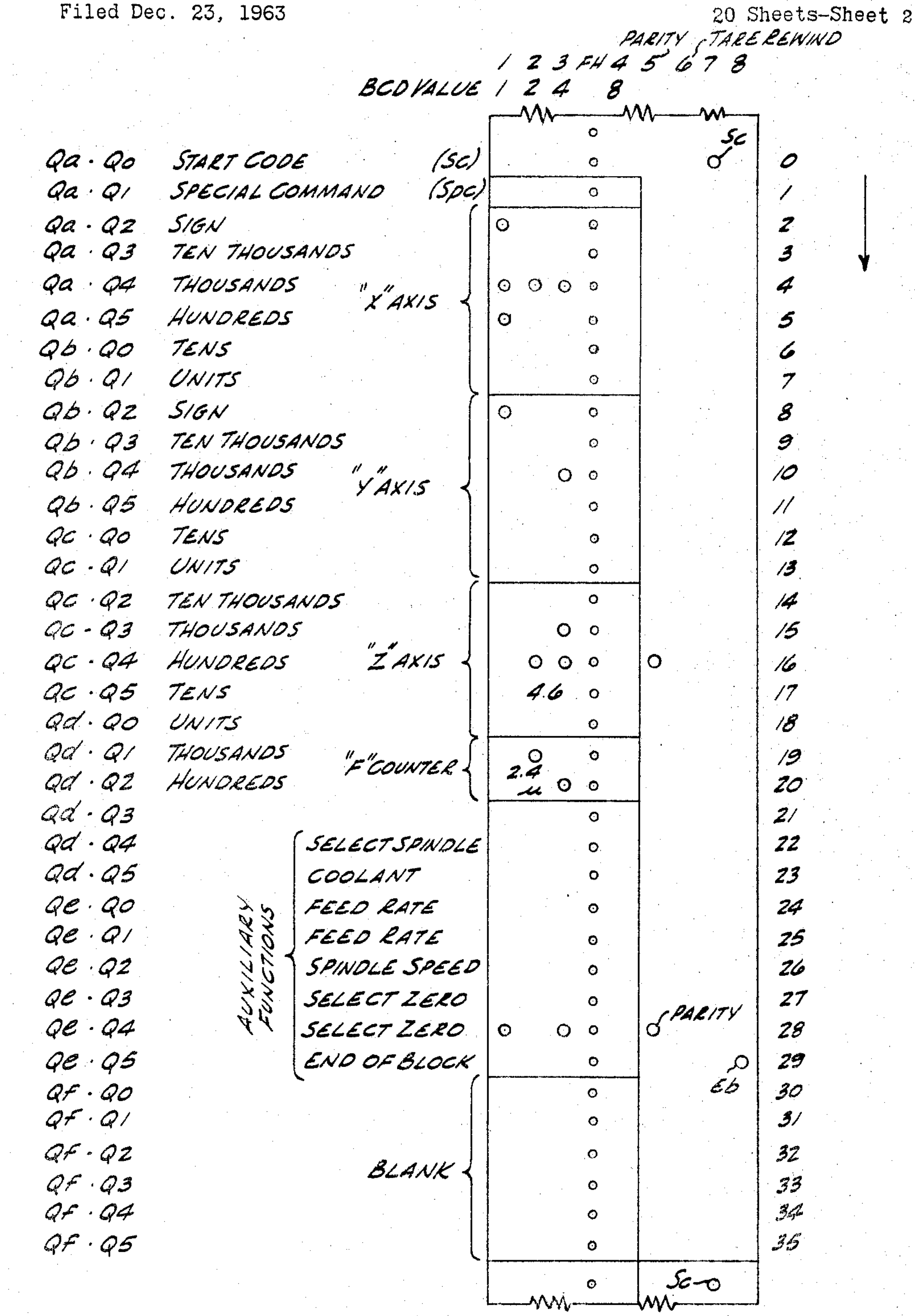

The invention will be better understood by reference to a typical tape format, see FIG. 2, which is used in programming the operation of a machine tool of the type herein described. In this illustration the tape is indicated as comprising eight columns of information, designated 1 through 8, and one feed hole column, designated FH. The tape is additionally divided into rows of information extending across the tape, each row including a feed hole. These rows of information are numbered 0 through 35 for a full tape block, for this specific example, and thereafter the row number sequence is repeated. An interblock space of 3 to 6 rows, herein marked "Blank," may be left between the blocks. Thirty-five rows do not have to be programmed. Only as many rows are programmed as are needed and then the end-of-block is marked. Columns 1, 2, 3 and 4 of the tape are utilized to record the dimensions for the movement of a machine axis and other items of information, such as tool selection (row 22) or certain special commands S*p*C (row 1) which deal with the sequencing of the control. Column 5 may be utilized for the purpose of a parity check. In the format indicated, the parity is odd. Column 7 is utilized to provide a start code signal S*c* and column 8 is utilized to provide an end of block signal E*b*. The start code marker, as indicated, is a hole positioned in column 7, row 0, of the tape.

The tape is read in the direction 0 through 35, as indicated by the arrow. Thus, the first signal produced by the tape as the tape is advanced through the tape reader is the start code signal S*c*. Row 1 of the tape, as one of several special commands, may include a provision for inhibiting setting of the position counters, for purposes not considered herein. Row 1 may also program a "delay" (not considered) in which one block of tape is read and further operation initiated by manual operation of a push button, for instance. Rows 2 through 7 of the tape include dimension information for positioning purposes.

In the tape format herein illustrated, positioning information is included for positioning a machine tool having 3 degrees of freedom, the respective axes being denoted the X, Y and Z axes. These axes are orthogonally related. The X and Y axes may be associated with the positioning of a machine table in two horizontal degrees of freedom, and the Z axis may represent the axis of freedom of a machine spindle, for instance. In this connection the rows 2 through 7 may include information concerning the sign (row 2) and the dimensional information for positioning a machine table in the X axis of freedom. Rows 8 through 13 may include the sign (row 8) and dimensional information for positioning the machine table along its Y axis of freedom. Rows 14 through 18 may include dimensional information, but not a sign marker, for positioning a machine tool spindle along the Z axis of freedom, which would be in the case herein assumed, down and up with respect to a machine table therebeneath. As noted hereinabove, a dimension is also included for movement in the Z axis over which the positioning movement is to take place at feed rate. This dimension is programmed in rows 19 and 20. Rows 21 through 28 provide space for programming pluralities of auxiliary functions of the type therein indicated, including selective zero. These and other auxiliary functions may be employed.

Adjacent each group of dimensional information on the tape, the rows of information are marked in accordance with the binary decimal code to provide the decimal weighting of tens of thousands, thousands, hundreds, tens and units. Since the counted scale increment is 0.001 in., the dimension magnitude indicated therefore represents total counts in terms of thousandths of an inch. The maximum dimension which may be indicated by an eighteen flip-flop counter, as used herein, is therefore 39,999 one thousandths of an inch.

By way of example, the perforations indicated on the tape in row 4 are made in columns 3, 2 and 1 which have the binary coded decimal value 4, 2 and 1, respectively, which in the thousands row represent 7,000. In row 4, which is the hundreds row, a single perforation in column 1, which is weighted 1 in the binary coded decimal system of notation, therefore represents 100. The combined decimal notation, adding these two together, is therefore 7,100, specifying a dimension of 7.1 inches of movement in a particular axis. This same notation as indicated in rows 15 and 16 for the Z axis, represents a programmed dimension of 7.1 inches in the Z axis. This will be assumed as a programmed dimension from a predetermined zero position, either scale zero or a selected zero point, as will be described hereinafter.

The F counter dimension is programmed in rows 19 and 20, there being one perforation in column 2 of row 19 and one perforation in column 3 of row 20. As indicated adjacent rows 19 and 20, the F counter contains the thousandths and hundreds sections. However, the F counter, unlike the X, Y and Z position counters, counts only in 10ths of an inch, as will be described. The dimension which is indicated by the perforations in rows 19 and 20 is therefore 2.4 inches.

As will be seen by reference to row 28, the selective reference position or point is programmed. As indicated, perforations are provided in columns 1 and 4 which, according to the binary decimal code, represents the decimal number "5," indicating that a position 5 inches below the upper limit has been selected for the zero point. Two select zero rows, 27 and 28, are provided. Row 27 represents 10's and row 28 represents 1's or units. Since the usable axis is 39.999 inches long, and since the selective zero unit of measurement is one inch, a two decade flip-flop memory comprising four flip-flops in the units stage and two flip-flops in the tens stage is sufficient to handle the maximum selective zero dimension.

Row 29, column 8, presents a perforation identified E*b*, which indicates the end of the block of information which has been read by the tape for the purpose of controlling the machine in each of its three axes. The number of interblock spaces "Blank" is arbitrary and the row positions of these blank spaces varies with the amount of information that is written, since they follow the end of block marker. The block sequence may be repeated beginning again with row 0 and the start code marker S*c*.

GENERAL SYSTEM

With particular reference to FIG. 4, the system therein illustrated includes an information input block TRS. The information input equipment may include any suitable type of discrete signal programmer, as already noted. For the purposes of this discussion, it will be assumed to include a suitable tape reader system having a perforated tape of the type indicated in FIG. 2, which may be read by suitable photoelectric types of electric transducers. Under such circumstances the photoelectric transducers, such as self-generating photoelectric devices which are employed, occupy one of two impedance or voltage states when dark and a second impedance or voltage state when illuminated with light. In the arrangement herein described, the self-generating photoelectric devices are in the higher of their two voltage states when dark and in the lower of their two voltage states when light.

The output of such information input equipment, in the form of serially presented parallel signal groups, as received from a tape of the type of FIG. 1, is distributed by a suitable electrical control ECC to respective Z and F counting registers or position counters, designated ZPC and FPC, respectively. The discrete tape signals preset the position counters, the Z position counter ZPC being set for 4.6 inches, as will be seen from FIG. 2, and the F position counter FPC for 2.4 inches, as also seen from FIG. 2.

The outputs of the Z and F counters ZPC and FPC are compared in a Z and F comparator circuit ZFC having an output when the counter contents are different, that is, the Z position counter contents are greater than the F position counter contents, which is applied to the electrical control circuit ECC. The electrical control circuit produces an output applied to a feed axis drive FD effecting movement in the feed axis or spindle axis 2, as indicated by the dotted connection between the two named blocks.

The output of the feed axis, that is, its mechanical movement, operates a suitable transducer TD, herein indicated as including the magnetic heads HMz1 and HMz2. The output of this transducer is applied to a pulse generator PG which generates the pulses $P_p$ or $N_p$ (see FIG. 3) which at scale zero or a selected zero point are applied to the Z counter ZPC via a zero position count gate ZPCG in such sense as to count down the Z counter from the number to which it has been preset by the tape through the electrical control ECC. At such time as the contents of the Z counter ZPC equal the contents of the F counter FPC, the control provided by the Z and F comparator ZFC switches the feed axis drive FD to feed rate from rapid traverse and the movable member, in this case the machine spindle assembly 2, moves at feed rate until the Z counter reaches zero, or a predetermined minimum count, at which the spindle is properly positioned.

In an arrangement of the type described, provision may be made to provide for dwell at the end of the positioning movement, or provision may be made for automatic retraction at the time the positioning movement has been completed. In either case, the retract cycle is initiated, either after a delay or immediately. As will be seen by reference to FIG. 4, there is a connection from the Z counter to the F counter which is marked "count down F counter." As noted in connection with the description of FIG. 2, the F counter counts in tenths of an inch, while the pulses which are applied to count down the Z counter represent positioning increments of 0.001 in. The count increments of the Z counter also represent thousandths of an inch. Thus, the units and tens sections of the Z counter, as will be described hereinafter, are combined to provide an output signal each 100 pulse counts, to provide a count control of the F counter during retraction wherein a count down pulse is applied for each one tenth of an inch of retraction.

A zero sensing circuit FZG is coupled to the F counter to sense a zero count therein and has an output circuit coupled to the electrical control ECC to produce a control signal. Thus, when the F counter contents are zero, the control signal may be utilized to switch the feed axis drive from feed rate, in which it yet exists, to rapid traverse to complete retraction to zero, or to the limit of retraction in which the limit switch LS is actuated.

The select zero control circuits are also actuated by the output of the electrical control. The select zero circuits include suitable storage devices such as a memory system M for instance, comprising a buffer memory ME1 and an active memory ME2, which is controlled by the information from the tape. Thus, at the time rows 27 and 28 on the tape are read, the output of the electrical control ECC operates selected flip-flops in the memory system (the buffer memory ME1 in this case) to establish a particular zero reference from which scale counting by the Z position counter will take place. As will be explained at a later point, when movement in the Z axis out of scale zero takes place the first count transfers the contents of the buffer memory ME1 to the active memory ME2 having its output coupled to one set of inputs of a comparator gate CG. The other set of inputs of comparator gate CG is coupled to those outputs of a bidirectional absolute position counter APC which are weighted the same as the outputs of the active memory ME2.

The pulses $P_p$ or $N_p$ of the pulse generator PG are coupled by a select zero count gate SZCG to the input circuits of the absolute position counter APC. A count enabling control circuit CEC enables the select zero count gate SZCG, gating the pulses $P_p$ or $N_p$ for count up or count down operation, respectively, of the absolute position counter APC. Upon the occurrence of coincidence between the contents of the absolute position counter APC and the contents of the active memory ME2, the count enabling controls CEC produce a signal enabling the Z position count gate ZPCG and pulses $P_p$ or $N_p$ are coupled to the Z position counter ZPC to count down the Z position counter.

Whenever the selective zero is zero the contents of the buffer memory ME1 is zero. The buffer memory is coupled to the count enabling controls CEC. When the selective zero setting is zero the signal ME1 exists which causes the count enabling controls CEC to enable the zero position count gate ZPCG. This latter gate therefore inhibits the pulses $P_p$ or $N_p$ until the scale zero or select zero position is reached.

SPECIFIC SYSTEM

The general organizational concept of the arrangement in FIG. 4 is embodied in FIGS. *5a* and *5b* which together illustrate the invention in greater detail. Here the tape reader system, generally designated TRS is illustrated as comprising a plurality of photodiode devices which are utilized in connection with suitable individual tape reader lamps, not shown, to scan the respective columns 1 through 8, including the row of feed holes, generally designated FH. The photodiodes which read the numbered columns of the tape are designated PD1 through PD8. The photodiode which reads the column of feed holes is designated PDFH. The photodiodes are coupled as inputs to respective amplifiers A1 through A8 and AFH. These may be conventional amplifiers having an output which is normally some predetermined negative value, in the absence of illumination by light from the associated diode, and having a higher value, say zero volts or ground potential, whenever the associated diode is illuminated with light.

The outputs of the respective amplifiers A1 through A4 are coupled input-wise to respective diodes D1 through D4 forming part of a signal shaping network for producing the signals, generally designated A1, A2, A3 and A4, which are responsive to perforations in the tape in the information columns 1 through 4. This signal shaping network additionally includes respective clamping diodes CD1 through CD4 which clamp the negative excursions of the respective "A" signals at −2 volts. Pull-down resistors R1 through R4, each of which has a terminal commonly connected to a voltage supply of −25 volts, has its remaining terminal connected to the common terminal of the pairs of diodes in the respective signal shaping circuits. The output signals A1 through A4 therefore swing between −2 volts and ground each time the associated tape reading diode is illuminated with light.

The output circuits of the respective "A" signal circuits are coupled into the respective inputs of a second signal shaping network by means of respective diodes D5, D6, D7 and D8. Respective resistors R5, R6, R7 and R8 are connected to the anodes of the aforementioned diodes and the remaining terminals of these resistors are commonly connected to a supply of positive voltage, here designated +25 volts. The output circuits of this second network are designated E1C, E2C, E3C, E4C and produce signals E1 through E4.

The "A" signals are employed in conjunction with tape distributor signals, yet to be described, as inputs to relay gating circuits RG and "enter gating circuits" EG. The "E" signals, together with certain tape distributor signals, are applied as inputs to suitable flip-flop gates. Alternatively the "E" signals may be coupled to the "enter gates" EG.

The relay gates the enter gates and the flip-flop gates form part of a circuit, here designated as a block marked "distributor gates" and bearing the legend "DG." The distributor gates are utilized to route the information groups, received on a row-by-row basis from the tape as it is moving through the tape reader, to selected points in the system as determined by the logical gating of the distributor gate arrangement.

Identification of individual rows of information from the tape is achieved by means of a tape row counter, designated TRC, which is stepped synchronously with the tape under the control of signals derived from the feed hold amplifier AFH, in turn controlled by the feed holes on the tape. As earlier noted, and with reference to FIG. 2 the feed holes are aligned with each row of information which is on the tape. Thus, at any time an output signal is produced by the feed hole amplifier this indicates that a row of tape information is in position to be read. At this time the "A" signals or the "E" signals associated with the particular row of information on the tape are available for application to the system.

The tape row counter TRC, by its particular electrical configuration, identifies the individual rows of the tape, and to this end, as will be described at a later point in connection with FIG. 7, includes flip flops arranged in a two-stage ring counter configuration, producing pairs of signals, each pair including one signal from each of its two stages, which are indicative of the particular row which is being read. The tape row counter is provided with a "Count" input connection and a "Reset" input connection. The "Count" input connection receives a tape feed hole signal, generally designated OFH and produced by a signal shaper circuit SSC, which is essentially an inverted rectangular wave which may swing between zero volts and some particular negative value of voltage selected for the system, say −2 volts. The positive going excursion of the trailing edge of the signal OFH is utilized to operate the counter, as will be described in connection with this counter and the flip-flops therein, in reference to FIGS. 6 and 7 hereinafter. The signal shaper circuit SSC may be any suitable type of circuit, a particular type of which is illustrated in FIG. 10, yet to be described, capable of receiving the output of the tape feed hole amplifier AFH, here represented as a signal AFS, and converting it to the inverted rectangular wave feed hole signal OFH indicated. While many forms of suitable signal shaping equipment are available, FIG. 10 illustrates a presently prefered form of circuit.

The tape row counter TRC is arranged to be normally reset and to be insensitive to feed hole signals OFH when in reset condition and in the presence of a reset bias, and to be responsive to the feed hole signals OFH at such time as the reset bias is removed and a normal bias is applied thereto. To this end a tape block memory circuit TBM is provided which is capable of switching the voltage at the reset terminal betwen a low or negative voltage level capable of resetting and holding the tape row counter TRC in reset condition and a second high or positive voltage applied to the reset terminal which permits normal counting operation of this counter.

The tape block memory circuit TBM is controlled by the outputs of amplifiers A7 and A8, amplifier A7 producing an output in response to the start code marker Sc in column 7, row 0, of the tape, and amplifier A8 producing an electrical output applied to the tape block memory TBM to switch it to its lower voltage state, say −150 volts, as indicated, in response to an end-of-block marker E*b* in column 8 of the tape.

It will be recalled the start code marker S*c* denotes the beginning of the block of information and the end-of-block marker E*b* denotes the end of a block of information. The tape row counter TRC has sufficient capability to provide a minimum row count of 36 for the specific block of tape indicated herein. The capability of the counter, however, may be varied to suit individual conditions. Whether or not the entire block of information is utilized, that is, all 36 rows, will determine whether or not the counter is reset, say, at the end of 7 or 8 counts or at the end of, say 29 counts, as shown by the end-of-block marker E*b* in FIG. 2. The end-of-block marker E*b* will be normally positioned on the tape at the end of the last row of information on the tape.

The output of the tape row counter TRC is represented in single signal circuits, here designated R*w*1 through R*w*35, each of which, as will be explained hereinafter, comprises two signals from the output of the tape row counter. Since each row of information on the tape has a particular destination in the system the signals R*w*1 throuhg R*w*35 may thus be combined with the "A" signals or the "E" signals in individual gates having outputs connected with specific system elements. Thus, for instance, a signal R*w*15 comprising signals Q*c* and Q3 (see FIG. 2) will be combined in respective gating circuits for signals E1, E2, E3 and E4 derived from columns 1, 2, 3 and 4, respectively, of row 15 of the tape and gated into the thousands level of the Z axis position counter ZPC of FIG. 5*a*. The four input circuits to the thousands level of this counter, as seen in FIG. 5*a*, denote the four input circuits over which the "E" signals are applied, as will be described in greater detail hereinafter in connection with FIG. 11. For additional details on the distribution of signals see the copending application of E. J. Toscano S.N. 184,204, filed Apr. 2, 1962, entitled Electrical System of Control, now Patent 3,252,147, issued May 17, 1966, and assigned to the assignee of this invention.

Both the Z and F positions counters are initially set so that all of the flip-flops therein are in their "1" representing electrical states. This is accomplished by means of normally open contacts on respective relays KSZ and KSF which connect the flip-flop setting terminals to −150 volts, as indicated, to thereby set the flip-flops to their "1" representing states. When row 1 of the tape is read the signals Q*a*, Q1 represented in the combined signal R*w*1, energize the relays KSZ and KSF momentarily switching the set terminal of the counters to −150 volts in each case to provide flip-flop setting potentials to the counters. When these relays are de-energized the operating potentials of +25 volts are applied. As the tape is read, the presence of a hole in the tape is instrumental in maintaining a particular flip-flop which is in its "1" representing state in the same electrical state. The absence of a hole is instrumental in turning a flip-flop off, that is, to its "0" representing electrical state. Thus, the information which is read from the tape is transfered to and stored in the flip-flops of the respective counters, whence the Z axis position information is transferred to the counter ZPC, and the dimension over which the machine spindle assembly is to be operated at feed rate is transferred from rows 19 and 20 of the tape to the thousands and hundreds sections of the F position counter FPC.

The zero output circuits of each of the Z axis position counter ZPC and feed position counter FPC are coupled into respective zero count indicating gates ZZG and FZG. Each of these gates produces a positive going output signal at such time as the counts in the associated counters are zero. The output of the Z zero gate ZZG is used to reset a move flip-flop FQ*mz*. The output of the F zero gate FZG or the gated output of flip-flop FQ*mz* terminates pulse counting and switches the system to rapid traverse during retracting of the machine spindle.

For the purpose of this portion of the discussion it may be mentioned that the flip-flops employed in the counter and in the electronic control portion of this system, such as the flip-flop FQ*mz*, are of similar character. These flip-flops in their true states, that is, their "1" representing electrical states, have a low voltage on their Q output terminals. In their false or "0" representing electrical states their $\overline{Q}$ electrical terminals are in the lower of the two voltage states. Additionally, it may be assumed that these voltages swing between −2 volts and 0 volts.

The move flip-flop FQ*mz* and a directional flip-flop FQ*dz* are set to their "1" representing electrical states by the relay KSZ. When relay KSZ is energized to set the Z counter ZPC, −150 volts is also coupled to the S terminal of each of these flip-flops. When the flip-flop FQ*mz* is in its "1" representing electrical state, that is, its Q output terminal is at the lower (−2 volts) of its two voltage states (Q*mz*), it indicates that movement in the feed axis under control may take place.

The convention adopted with respect to the directional flip-flop FQ*dz* is that movement negatively or upwardly in the feed axis, that is, upward movement of the machine spindle assembly, is indicated when the flip-flop is in its "1" representing (Q*dz*) electrical state, that is, the output terminal Q is in the lower of its two voltage states. Downward movement is indicated when the $\overline{Q}$ electrical output terminal of the directional flip-flop is in the lower of its two voltage states ($\overline{Q}dz$). The flip-flop FQ*dz* is switched to its "1" representing electrical state (Q*dz*) by the setting control of relay KSZ and also by the positive going excursion of the voltage on the Q output terminal of the move flip-flop FQ*mz* whenever the move flip-flop is switching from its "1" representing electrical state (Q*mz*) to its "0" representing electrical state ($\overline{Q}mz$).

An additional control on the directional flip-flop FQ*dz* is provided by the voltage output of a resistor network controlled by the normally closed contacts K*fd*B of a feed relay K*fd* controlled by the limit switch LS operated by the cam LSC on the machine spindle assembly or by the electronic selective zero control circuits. This resistor network comprising resistors R78 and R79 is coupled through the contacts K*fd*B from +25 volts to −25 volts and the relative resistance magnitudes of the resistors is such that their common terminal is at some negative voltage whenever the contacts K*fd*B are closed, and at some higher voltage, say at least ground potential, whenever the contacts K*fd*B are open. With reference to the machine tool schematically depicted in FIG. 5*b*, when the machine spindle assembly is in its limit of retraction, limit switch contacts LSB are open and the make contacts LSM are closed. In this circumstance the coil of the relay K*fd* is connected between ground and −25 volts, as indicated, providing an energizing circuit therefor. This opens the contacts K*fd*B to disconnect the resistor network from −25 volts. Under this condition a positive voltage is applied to a terminal $K_s$ of the flip-flop FQ*dz* which switches this flip-flop to its "0" representing electrical state ($\overline{Q}dz$), in which condition the $\overline{Q}$ output terminal is at the lower of its two voltage levels. Under this condition, which indicates positive or downward movement of the machine spindle assembly is to take place, the Z position count gates ZPCG are partially enabled preparatory to gating of pulses $P_p$ generated during downward movement of the machine spindle assembly.

The output of the resistor network is also coupled to the input terminal $K_s$ of a limit flip-flop FQ*lz* setting this flip-flop to its "0" representing electrical state in which the output signal $\overline{Q}lz$ is low indicating the spindle assembly is in its limit of retraction. Signal Q*lz* is coupled to the Z position count gate ZPCG. Since signal Q*lz* is now high the Z position count gate ZPCG is disabled and pulse gating is inhibited. Enabling of this Z position count gate ZPCG will be described following a description of the power means and controls therefor which provide movement of the spindle assembly.

Although any suitable type of power means may be employed to control the machine spindle assembly in its up and down movement, a hydraulic type of control has been herein illustrated for the purposes of convenience in discussion. Such a control may include a conventional rotary type of hydraulic motor, generally designated HM, which is mechanically coupled to the machine spindle assembly to effect up and down spindle movement under the control of hydraulic fluid pressure applied thereto. Porting of hydraulic fluid to such a motor may take place under the control of a hydraulic valve capable of switching the ports of the hydraulic motor between a fluid pressure line and a tank, sump or drain, which receives the returning hydraulic fluid. Such a valve is schematically represented in FIG. 5*b* and designated DV. It includes a pair of outlet ports A and B which may be selectively switched between the pressure port P and the tank or return line T. This is accomplished under the control of respective solenoid valves, designated US for the "up" solenoid and "DS" for the "down" solenoid. The arrows in the valve body adjacent the "up" solenoid and the "down" solenoid indicate the direction of coupling of the valve ports A and B with the pressure and tank ports, respectively. As the arrows indicate, when the "up" solenoid is energized pressure port P is coupled directly to outlet port A and the tank port T is coupled directly to the port B. When the solenoid DS is energized the ports A and B are crosscoupled to the ports T and P, respectively, whence the direction of flow of hydraulic fluid in the lines coupling ports A and B to the hydraulic motor is reversed. When both solenoids are de-energized there is no fluid coupling or communication across the valve and the hydraulic motor is de-energized.

Rate control of such a system may be obtained by the use of fixed orifices in the hydraulic circuit which may be shunted in any convenient manner under the control of a valve. Alternatively a servo operated valve may control rate from the programmed rate. A single stage of rate control has been illustrated herein in the interest of simplicity and is shown only as a block in the line T, designated RV, and representing a suitable type of rate valve. Operation of this valve is controlled by rate valve solenoid SRV which is switched by means of a rate relay K*cpb*. The normally open contacts K*cpb*1 of this relay couple a suitable source of alternating current to the coil of the rate valve solenoid. When the rate valve is de-energized, it provides fluid passage at a rate providing operation of the machine spindle at rapid traverse speed. When the rate valve is energized, fluid flow therethrough is restricted to some lower rate to provide machine spindle movement at a predetermined feed rate. Combinations of such valves having different flow resistances may be connected in parallel and operated individually or in combinations as programmed from the tape to provide pluralities of feed rates for different tools.

Up and down movement of the machine spindle assembly is controlled by means of directional control relays. The move positive or down relay is designated K*mpz* and controls downward movement of the machine spindle assembly. The move negative or up relay is designated K*mnz* and controls upward movement of the machine spindle assembly. The coil of relay K*mpz* is coupled to a supply of −25 volts energizing potential through normally closed contact K*mnz*1 of the "up" relay to provide interlocking, preventing operation of relay K*mpz* at any time that relay K*mnz* is energized. Relay K*mpz* is provided with a set of contacts K*mpz*1 which connect the "down" solenoid DS of the directional valve to a suitable supply of alternating current at such time as the relay K*mpz* is energized. Similarly, normally open contacts K*mnz*3 of the "up" relay connect the "up" solenoid US of the directional valve to a supply of alternating current when the "up" relay is energized.

The "up" relay is controlled along with other controls by the directional flip-flop FQ*dz*. The output ($\overline{Q}dz$) of this flip-flop is applied as input to one terminal of an AND gate AG3. The signal $\overline{Q}dz$ is in the lower of its two electrical states, namely, −2 volts at the input of this AND gate.

Movement of the spindle assembly is normally inhibited until such time as positioning of the workpiece by movement of the work table in the X and Y axes has taken place. To this end there is indicated in FIG. 5*a* a block identified XPC, representing X position counter and controls and a block identified YPC, representing Y position counter and controls, both of which receive inputs from the distributor gates. These two systems may be of the same sort as described herein for positioning movement in the Z axis and are capable of producing output signals designed $\overline{A}mx$, $\overline{A}my$, which in this case are negative voltages, indicating that positioning movement in both of X and Y axes has been completed.

Further and additional details of systems of the type for positioning in the X and Y axes may be had by reference to said copending Patent No. 3,252,147 of E. J. Toscano, entitled Electrical System of Control.

The output signals $\overline{A}mx$ and $\overline{A}my$ are coupled to the input of an AND gate AG1 along with the signal Q*mz* from the Q output terminal of the move flip-flop FQ*mz*. The signal Q*mz* indicates the flip-flop is in its "1" representing electrical state, that is, at the lower of its two voltage states. All three negative signals on AND gate AG1 enable this gate, the output of which is coupled to a conventional amplifier A9 which may be a conventional transistor type of amplifier receiving a negative input voltage and producing an output voltage, which swings between some negative voltage when the amplifier is off and some higher voltage, say ground, when the amplifier is conducting, under the influence of the output of the AND gate AG1. The output signal of this amplifier is designated A*mz*.

The signal A*mz* is one of at least two signals controlling downward movement of the machine spindle assembly. A second signal is derived from contacts K*fcm*. These contacts are closed when the spindle is fully retracted (limit switch contacts LSM closed) or at a selected zero position. This is a ground potential signal. This signal, along with signal A*mz* (and any auxiliary function signals such as spindle speed coolant, etc.), is applied as input to an AND gate AG2 having an output circuit coupled to and controlling an amplifier A10. When the gate AG2 is "true," that is, both input signals at ground potential, the output of the amplifier A10 is open circuited. When either or both of signals A*mz* or K*fcms* are absent or below gating potential, the output of amplifier A10 is grounded.

Amplifier A10 may be a conventional transistor amplifier which may be switched to conduction when an input below zero volts is applied thereto, and switched off whenever an input of zero volts or ground exits. The output of the amplifier A10 represented, for instance, in the collector circuit of such a transistor, may therefore switch between open circuit and ground potential, and in the present condition described will be open circuited.

A two input AND gate AG3 is controlled by signals G*mz* and $\overline{Q}dz$. Signal G*mz* when at ground potential inhibits gate AG3 and when absent permits gating of signal $\overline{Q}dz$, applying an input to amplifier A11, the output of which is designated A*mpz*, and is now switched to ground potential. This completes an energizing circuit for the coil of the move positive or down relay K*mpz*, which includes the now closed contacts K*mnz*1, to —25 volts. Relay K*mpz* now picks up, closing its contacts K*mpz*1 which energize the "down" solenoid DS to thereby initiate operation of the machine spindle downwardly. At this point the transducer assembly, including the scale S and the magnetic heads HMz1 and HMz2, begins to operate and with movement of the heads past the zero point on the scale, that is, the first groove on the scale, the magnetic heads produce electrical outputs which are applied to the pulse generator PG. The output of the pulse generator PG, now represented in pulses $P_p$, is applied as input to the Z position count gates ZPCG which at this time are partially enabled by the move positive or down signal $\overline{Q}dz$ from the directional flip-flop FQ*dz*. The other enabling signal on the count gate ZPCG is the signal Q*lz* produced by a flip-flop FQ*lz*. This flip-flop is reset in the upper limit of the spindle when contacts K*fcb* are open. Now the signal Q*lz* is in the higher of its two voltage states to inhibit the Z position count gate ZPCG. If no selective zero is programmed (signal $\overline{\text{ME1}}$ is low) the flip-flop FQ*lz* is switched to its "1" representing electrical state Q*lz* when the spindle assembly moves out of its upper limit. If a select zero position is programmed signal $\overline{\text{ME1}}$ is high which inhibits setting of the flip-flop FQ*lz* until coincidence occurs between the active memory ME2 and the absolute position counter APC at which time signal Q*tr* sets the flip-flop FQ*lz* to its "1" representing electrical state Q*lz*. Signal Q*lz* being low now enables the Z position count gate.

At this time it is assumed that a particular selective zero reference, say 5 inches, has been selected to establish the zero point on the machine spindle ax, the signal Q*lz*, indicated as input to the count gates, is in the upper of its two voltage states (having been so set when contacts K*fdb* opened in the upper limit of movement) and acts as an inhibiting signal on the Z position count gates ZPCG so that the pulses $P_p$ are not passed to the count input circuits of the Z position counter ZPC.

This count inhibiting action is provided by the count enabling control circuits CEC under the control of the memory system M and the absolute position counter APC. This control prevents Switching of the flip-flop FQ*lz* until the selected zero point is sensed as determined by coincidence between the outputs of the active memory MEZ and the absolute position counter APC.

FIGS. 5*a* and 5*b* in block diagram form illustrate the electronic equipment whereby the selective zero type of control is achieved. As earlier noted, the memory system M includes a buffer memory ME1 and an active memory ME2 which are coupled by means of a transfer gate gate TG. This portion of the system is illustrated in FIG. 23 and will be described at a later point. The input to the buffer memory which includes a 10's section comprises two flip-flops receiving inputs from the circuits coupled to line 27 of the tape. The unit section of the memory comprises four flip-flops and receives its input from the circuits coupled to line 28 of the tape. The two flip-flops in the 10's section receive input from columns 1 and 2 of the tape which are respectively weighted 1 and 2 in conventional binary notation. Thus, at the time the tape row counter TRC is in the configuration $Qe \cdot Q3$ the presence of a perforation will result in setting of the associated flip-flop to its "1" representing electrical state, and the absence of a perforation will result in setting of the flip-flop to its "0" representing electrical state. When the tape row counter TRC is in the configuration $Qe \cdot Q4$ the signals A1, A2, A3 result in setting of the flip-flops in the units section correspondingly. The select zero value in FIG. 2 is 5, there being perforations in row 28 ($Qe \cdot Q4$) in the binary weighted 4 and 1 positions, that is, A3 and A1. Thus, the output of the memory ME1 in binary notation represents the decimal number 5.

The output of the memory ME1 is coupled to the input circuits of a transfer gate TG having a corresponding plurality of output circuits coupled to the 10's and units sections of an active memory ME2 by the select zero limit flip-flop FQ*ls* and a Z move flip-flop FQ*mz*, as represented by the signals Q*ls* and $\overline{Q}mz$ coupled inputwise to the transfer gate as shown. The select zero limit flip-flop FQ*ls* is always set to its "0" representing electrical state $\overline{Q}ls$ in the select zero limit or the upper machine limit. Thus, the signal Q*ls* will be high in either of these upper limits. The Z move flip-flop FQ*mz* is always set to its "1" representing electrical state (Q*mz*) by the relay KSZ at the end of each positioning operation and prior to read in of additional information. Thus, the signal $\overline{Q}mz$ is initially high. As will be described in connection with FIG. 23, this inhibits the transfer gate.

At the time the machine moves out of its upper machine limit, or the select zero limit, whichever is the case, the select zero limit flip-flop FQ*ls* is switched to its "1" representing electrical state, at which time the signal Q*ls* switches to the lower of its two electrical states which triggers the transfer gate TG transferring the contents of the buffer memory ME1 to the active memory ME2.

During any machine operation the next block of tape may be read. This may result in the setting in of a new select zero dimension. Whenever the machine reaches its lower limit which is the position where the Z position counter ZPZ is counted down to zero, the Z zero gate ZZG produces an electrical output designated $\overline{Z}$ coupled to the $K_n$ input of the Z move flip-flop FQ*mz* which resets this flip-flop. The flip-flop is now in its "0" representing electrical state $\overline{Q}mz$. At this time the signal $\overline{Q}mz$ switches to the lower of its two electrical states and the transfer gate is again enabled to transfer the contents of the buffer memory ME1 to the active memory ME2. If during this last positioning movement a new selective zero had been set into the buffer memory the new selective zero will be transferred to the active memory.

The output of the active memory ME2 is coupled to the input of a comparator gate CG illustrated in detail in FIG. 26 and which will be discussed at a later point. The contents of the active memory are compared with the output of a bidirectional absolute position counter, generally designated APC, which counts in exactly the same increments as the Z position counter ZPC. The ten thousands and the thousands levels of the absolute position counter are coupled to a second set of inputs of the comparator gate to be compared with the contents of the active memory. It will be recalled that in the example herein chosen the select zero resolution is one inch. Since the resolution along the machine axis provided by the pulse generator of the pulses $P_p$ and $N_p$ is is in one thousandths of an inch it will be appreciated that the thousands and ten thousands levels of the absolute position counter correspond respectively to the 10's and units sections of the active memory.

The absolute position counter is controlled by a select zero count gate SZCG illustrated in FIG. 24 and described in detail hereinafter. This gate has outputs which are coupled input-wise to the "count up level," "count down level," "count up" and "count down" inputs of the absolute position counter for the purpose of controlling the direction of counting of the pulses $P_p$ and $N_p$ which are coupled to the count up and count down inputs through the select zero count gate SZCG. Count up and count down operation of the counter is controlled by means of a select zero sign flip-flop FQ*ss*. The pulses $P_p$ and $N_p$ are coupled to the $J_p$ and $K_p$ input terminals of the sign flip-flop through respective series connected diodes, the cathodes of which are also connected to respective pull down resistors coupled to −25 volts as indicated. In the absence of the positive going pulses either $P_p$ or $N_p$ the inputs to the $J_p$ and $K_p$ input terminals are at some slight negative voltage, say −2 volts, swinging positively to about ground potential to effect triggering of the flip-flop. The pulses $P_p$ set this flip-flop to its "1" representing electrical state Q*ss* which controls count up operation of the absolute position counter APC. The signal $\overline{Q}ss$ produced by the pulses $N_p$ control count down operation of the absolute position counter.

A select zero flip-flop FQ*os* which is controlled through the count gate by the select zero limit flip-flop FQ*ls* and the sign flip-flop FQ*ss* combines its output in the count gate with the outputs Q*ss* or $\overline{Q}ss$ of the sign flip-flop $\overline{F}Qss$ (see FIG. 24) to enable gating of pulses $P_p$ or $N_p$ to either the count down or count up input terminals of the absolute position counter APC.

The output of the comparator gate CG is coupled by an isolating diode to the input of an inverter 11, the output of which is coupled to respective "and" gates AG5 and AG6 to partially enable these "and" gates. The "and" gate AG5 has a second input which is coupled to the $\overline{Q}$ output terminal of the Z directional flip-flop FQ*dz* so that whenever downward movement in the Z axis, that is the spindle axis is specified, the signal $\overline{Q}dz$ is in the lower of its two electrical states. Thus, with the occurrence of the coincidence signal from the comparator gate CG and the signal $\overline{Q}dz$ the "and" gate AG5 is enabled and inverter I2 coupled the output of "and" gate AG5 to the $J_n$ input terminal of a trigger flip-flop FQ*tr* to set this flip-flop in its "1" representing electrical state. Prior to this the flip-flop FQ*tr* had been set to its "0" representing electrical state by the outputs +25VR*x* and +25VR*y* from the X and Y position counter and controls respectively, these signals being generated prior to the time that operations in the Z axis begin indicating that positioning operations in the X and Y axis are completed or are in progress, or, alternatively by a signal $\overline{\text{ML}}$ which is generated by a zero trigger circuit each 200 scale counts (one-fifth of an inch). Thus, at the time coincidence occurs when downward movement is indicated by the signal $\overline{Q}dz$ the flip-flop FQ*tr* is switched to its "1" representing electrical state, at which time the signal Q*tr* switches to the higher of its two electrical states. This positive going signal is coupled to the $J_n$ input terminal of the Z limit flip-flop FQ*lz*, switching this flip-flop to its "1" representing electrical state Q*lz* which enables the Z position counter gates ZPCG so that counting of the positive pulses $P_p$ may take place at the Z position counter ZPC. The next occurrence of the signal $\overline{\text{ML}}$ resets the flip-flop FQ*tr*. The signal $\overline{\text{ML}}$ usually exists at ground potential but each 200 scale counts (200 one thousandths of an inch), the head HMzL senses a reference mark on the scale. If the scale is a circular scale such as on a drum, or a disc, there need only be one reference mark which in effect indicates full revolutions. Thus, each revolution of the scale will result in the generation of one output of a head HMzL and the production of a signal $\overline{\text{ML}}$. If a linear scale is employed such as indicated in FIG. 5*b* and FIG. 1, then the reference marks may be spaced a distance equivalent to 200 scale counts producing the same effect along the length of the scale. Each time a reference mark is sensed the signal $\overline{\text{ML}}$ switches from ground potential to about −2 volts and thereafter switches back to ground potential. The positive going excursion on the trailing edge of the signal $\overline{\text{ML}}$ which as indicated is coupled to the $K_p$ input terminal of flip-flop FQ*tr*, thus resets the flip-flop.

An artificial zero is provided by the select zero circuits to stop the machine spindle in retraction at any selected zero point which is available. For this purpose a stop flip-flop FQ*st* is controlled by the outputs of the comparator gate CG, the retract signal Q*dz* of the Z directional flip-flop FQ*dz*, a signal from any one of the flip-flops of the active memory unit and all of the signals $\overline{Q}$2 through $\overline{Q}$12 of the absolute position counter APC. Considering these signals individually, the signal Q*dz* indicates that the spindle is to be retracted. Any one of the signals from the active memory (signals QM2–1 through QM–20) indicates that a select zero has been programmed. The output of the comparator gate of course denotes that there has been coincidence between the active memory and the absolute position counter and the signals $\overline{Q}s$2 through $\overline{Q}s$12 together indicate that all except the one-thousandths bit of the absolute position counter is zero. This assures during retract that if coincidence occurs between the ten thousands and thousands levels of the absolute position counter and the contents of the active memory ME2 that there may not be a count of 0.999 in the lower level decades of the absolute position counter. Thus, if the programmed selective zero is 5 and the counter is counting back from a count, say of 9.6, when the counter counts down from 6.00 to 5.99 coincidence will not be indicated.

The output of the "and" gate AG6 is coupled to the input of an inverter I3, the positive going output of which is coupled to the $J_n$ input terminal of the stop flip-flop FQ*st* to trigger this flip-flop to its "1" representing electrical state in which the output terminal Q switches to its lower electrical state at about −2 volts. The signal Q*st* is coupled to an amplifier inverter I4, the output of which now swings from open circuit to ground potential, for example, in the collector circuit of a p-n-p transistor, the emitter of which is coupled to ground and the base of which is driven by the negative going signal Q*st*. The circuits of the coils of both of the relays K*fd* and K*fc* are now coupled between −25 volts and ground and these relays are energized to establish the artificial zero, in the absence of closing of contacts LSM of the limit switch LS, at the selected zero point.

At any time that the machine spindle moves downwardly whether from a selected zero point or the mechanical zero or limit, the pulses $P_p$ count down the Z position counter. The hundreds, thousands and ten thousands levels of the Z position counter are counted down through a Z count gate AZC which is enabled by the down directional signal $\overline{Q}dz$ from the directional flip-flop FQ*dz*. Thus, with the occurrence of the positive going trailing edge of the zero output signal of the last flip-flop in the tens level of the Z position counter, a positive going signal is gated through the Z count gate AZC to the count input circuit for the hundreds, thousands and ten thousands level of the Z position counter. The count signal which is gated by the count gate AZC is designated $\overline{Q}z8$, representing the output of a flip-flop FQ*z*8 which is the highest order flip-flop in the tens level of the counter (FIG. 8). This technique of driving the higher levels of the counter is utilized to permit switching of the units and tens levels of the Z position counter as input to count down the F position counter FPZ whenever the spindle is being retracted. This latter control is effected through an F count gate AFC which is enabled by the "up" directional signal Q*dz* of the directional flip-flop FQ*dz*.

The thousands and hundreds levels of the Z position counter, having the same dimensional significance as the thousands and hundreds levels of the F position counter, are compared in a comparator circuit ZFC which is utilized to control a rate relay. At such time as the count remaining in the position counter equals the count which is programmed in the F position counter FPC, the Z–F comparator ZFC enables an energizing circuit for the latching coil L of a rate relay K*cpa*. This relay now picks up and latches, closing its normally open contacts K*cpa*1 to complete an energizing circuit from ground to −25 volts through the coil of a second rate relay K*cpb*, earlier referred to, which now energizes the coil of the solenoid SRV of the rate valve. This actuation of the rate valve switches the hydraulic motor HM from rapid transverse operation to feed rate and the machine spindle moves at feed rate until the Z position counter is counted to zero.

At the time the count in the Z position counter reaches zero, the input signals to the Z zero gate ZZG enable this gate. The resulting output signal, here designated $\overline{Z}$, swings from a negative potential, say −2 volts, to approximately ground or 0 volts. The signal $\overline{Z}$ is coupled to a $K_n$ input terminal of the move flip-flop FQ*mz*. This positive going signal on a K input terminal of this flip-flop triggers the flip-flop to its $\overline{Q}$ (zero) electrical state. The signal $\overline{Q}mz$ which had previously been at 0 volts now swings to about −2 volts. The negative signal $\overline{Q}mz$ is applied to an AND gate AGR having as its other input a ground potential signal applied by a set of normally closed contacts KR1 of a fast retract relay KR. If fast retract is programmed, relay KR is energized. The ground signal is removed from gate AGR. The negative output of gate AGR is gated by an OR gate OG1 to the input of a conventional amplifier A14. The output of the amplifier A14, which is normally at some negative voltage, now swings positive towards ground potential. This positive going excursion which is coupled to a $K_p$ terminal of the flip-flop FQ*lz* triggers this flip-flop to its $\overline{Q}$ (zero) electrical state removing the gate enabling signal Q*lz* from the Z position count gates and inhibiting counting at this time.

Switching of the flip-flop FQ*mz* to its $\overline{Q}$ (zero) electrical state also results in a positive going voltage excursion at its Q electrical terminal which is coupled to $J_p$ input terminal of the directional flip-flop FQ*dz*. This positive going signal now triggers the directional flip-flop FQ*dz* to its "1" representing electrical state in which the signal Q*dz* is at about −2 volts which is the gate enabling voltage for the F count gate AFC and also the count enabling voltage for the count gates for gating signals $N_p$.

The output of the amplifier A14 is also gated as input to an amplifier A15 which inverts the positive going signal used for triggering the flip-flop FQ*lz* producing a negative signal (or open circuit) at the input to an AND gate AG16, the output of which is coupled through the unlatching coil of rate relay K*cpa* to ground. The other input terminal of AND gate AG6 is yet connected to ground through normally closed contacts K*mnz*4 of the "up" relay, and gate AG16 is therefore presently disabled.

The Z and F position counters are now reset by means of a relay K*rz*. This relay is controlled by an amplifier A16 which in turn is controlled by the amplifier A15. This amplifier, when it is switched on, connects the coil of the reset relay K*rz* between −25 volts and ground. Relay K*rz* now closes its normally open contacts to couple −150 volts into the reset terminals of both the position counter FPC and the position counter ZPC which now both indicate zero.

With switching of the flip-flop FQ*mz* to its $\overline{Q}$ ("0") electrical state indicating that Z positioning movement is completed the signal Q*mz* is switched from −2 volts to 0 volts or ground. This disables the AND gate AG1 and the signal A*mz* which was at ground potential now swings to some negative voltage. This negative going voltage results in a drop in the output of the AND gate AG2 which drives the amplifier A10 to conduction. The output signal Q*mz* is now at ground potential. The signal $\overline{Q}dz$ is now also at ground potential. As a result the AND gate AG3 is disabled and the amplifier A11 cut off. At this time the "down" relay K*mpz* is de-energized.

Since the machine spindle assembly is at the bottom of its programmed stroke the feed relays K*fd* and K*fc* are deenergized. The signal Q*dz* which is now in the lower of its two voltage states is applied as input to one input terminal of an AND gate AG4. The other input terminal of the AND gate AG4 is coupled to the contacts K*fcm* of the feed relay K*fc*. These contacts when closed connect the associated input circuit of gate AG4 to ground. Inasmuch as the contacts K*fcm* are presently open this input circuit is open circuited and the signal Q*dz* controls the gate. Amplifier A13 is therefore energized and its output circuit is switched to ground. This completes an energizing circuit directly through the coil of the "up" relay K*mnz* to −25 volts energizing the "up" relay. Energization of the "up" relay opens contacts K*mnz*1, opening the interlock in the coil circuit for the "down" relay. Contacts K*mnz*3 connect the "up" solenoid US of the directional valve to the supply of alternating current indicated, porting hydraulic fluid to the hydraulic motor HM in a direction to retract the machine spindle assembly. Contacts K*mnz*4 disconnect the associated input of AND gate AG16 from ground which enables the gate AG16 completing an energizing circuit for the unlatching coil U of the relay K*cpa*. Deenergization of this rate relay deenergized the rate relay K*cpb* which in turn deenergizes the rate valve and the hydraulic system is transferred to rapid transverse operation for retraction of the machine spindle.

If selective zero has not been programmed, the machine tool continues in fast retract into its upper limit, at which time the limit switch LS is actuated. When contacts LSM thereof close, the relays K*fd* and K*fc* are energized. Energization of relay K*fc* grounds the input of the AND gate AG4 which in turn cuts off amplifier A13 deenergizing the relay K*mnz*. Contacts K*mnz*3 deenergize the "up" solenoid of the directional valve DV which stops upward movement of the machine spindle.

If a zero point other than the limit of retraction had been programmed selecting, say, a position 5 inches from scale zero or the upper mechanical limit, the stop flip-flop FQ*st* and inverter I4 would have been instrumental in grounding the coils of the relays K*fd* and K*fc* independently of limit switch position.

If it had been desired to retract at feed rate in either of the scale zero or select zero modes of operation, the relay K*r* would have been left deenergized. Thus its contacts K*rl* are now closed which grounds the connected input of the AND gate AGR disabling this AND gate which inhibits the signal $\overline{Q}mz$. Thus, at the time the Z position counter goes to zero and the Z zero gate ZZG generates the $\overline{Z}$ signal which triggers the flip-flop FQ*mz* to its $\overline{Q}$ ("0") electrical state, the signal $\overline{Q}mz$ is not gated by the AND gate AGR. Consequently, the flip-flop FQ*lz* is not switched and the count gate control signal Q*lz* remains. The rate relay K*cpa*, which was energized at the time the count in the Z position counter equalled the count in the F position counter, now remains energized, lacking a signal by amplifier A15 on its unlatching coil. Consequently, the rate valve RV remains energized and the system remains in the feed rate mode of operation.

The relay K*mnz* is energized as previously described when the flip-flop FQ*mz* is triggered, which triggers the directional flip-flop FQ*dz*. The directional valve DV now applies hydraulic fluid under pressure to the motor HM in such a way as to retract the spindle along the feed axis.

During this retract operation the pulse generator, as described herein and in greater detail in Patent No. 3,262,105, above identified, now produces the pulses $N_p$ which are gated by the enabled count gates ZPCG to the count input of the Z position counter ZPC. Since the signal $\overline{Q}dz$ is high at this time the Z count gate AZC is disabled. Since signal Q*dz* is low, the F count gate AFC is enabled.

With each positive going excursion of the signal $\overline{Q}z8$ from the tens section of the Z position counter, one pulse is applied to the count input of the F position counter FPC via the AND gate AFC. This count down operation continues until such time as the F zero gate FZG generates the $\overline{F}$ signal indicating that the contents of the F position counter are zero. This signal, which is gated by the OR gate OG1, operates amplifier A14 which triggers the flip-flop FQ*lz* to its "0" representing electrical state, disabling the count gates ZPCG. At the same time, the amplifier A15 via AND gate AG16 energizes the unlatching coil of rate relay K*cpa* to deenergize the rate relay and drop the rate valve RV. Retract operation continues in rapid traverse at this point until such time as selective zero is sensed if selective zero is programmed, or until such time as the limit switch LS is actuated in the limit of retraction, all as previously described.

A better understanding of this invention will be had by reference to circuits illustrating certain details of the system which are covered only in block form in FIGS. 5*a* and 5*b*.

FLIPS-FLOPS

To this end reference is made to FIG. 6 illustrating a typical flip-flop which may be employed herein. This flip-flop comprises a pair of PNP type transistors designated Q*f*1 and Q*f*2 connected in grounded emitter configuration. The base and collector circuits of these transistors are cross-coupled into respective voltage divider networks connected between +25 volts and —25 volts, as indicated.

The voltage divider network on the right side of the flip-flop as viewed includes resistors R3, R4 and R5 in series. The voltage divider on the left of the flip-flop comprises resistors R6, R7 and R8. Resistors R4 and R7 are shunted, respectively, by coupling capacitors C2 and C1. The collector circuits are coupled to —2 volts through clamping diodes CD1 and CD2. The respective output circuits, which are terminals coupled to the respective collector circuits, are conventionally designated Q and $\overline{Q}$. The "1" representing electrical state of the flip-flop exists when the transistor Q*f*1 is conducting and the transistor Q*f*2 is non-conducting. At this time the terminal $\overline{Q}$ is clamped to —2 volts and the terminal Q is coupled to ground through the conducting transistor Q*f*1. When the flip-flop is in its "0" representing electrical state, the potentials at the terminals Q and $\overline{Q}$ are reversed and transistor Q*f*2 is conducting and the terminal Q is coupled to ground potential. The clamping diode CD2 clamps the terminal $\overline{Q}$ to —2 volts. Steering is achieved by means of resistors R1 and R2 coupled between the collectors and bases of the respective transistors through respective diodes D1 and D2. The flip-flop is triggered by means of positive going voltage pulses usually voltages which are swinging in a positive direction from a potential of about —2 volts, although a more negative voltage may be used, toward ground or zero volts. These triggering voltages are coupled to the flip-flop through pairs of terminals such as $J_p$, $K_p$ and $J_n$ and $K_n$. Coupling capacitors C2*b*, C1*b* and C2*a*, C1*a* are included in series in each of these circuits, the coupling capacitors having common electrodes connected to the anodes of the respective coupling diodes, as indicated. Additional control inputs are provided to the base of the transistor on the K side of the flip-flop, that is, the transistor Q*f*1 through terminals T and $K_s$. The terminal T is a triggering terminal coupled through a polarizing diode D5 and a capacitor C4 to the base of the transistor Q*f*1. The terminal $K_s$ is coupled through a polarizing diode to the base of the transistor Q*f*1. An addition control terminal 8I*n* is coupled through a capacitor C3 and a diode D3 to the base of the transistor Q*f*1. Terminals S and R are normally at about +25 volts during operation of the flip-flop. However, these terminals may be used for setting and resetting the flip-flop under certain conditions. For instance, the relay K*rz* of FIG. 5*a*, when energized, couples —150 volts to the reset terminals of flip-flops of both the F and Z position counters. This connection is to terminal R of each of the flip-flops in these counters. The relays KSZ and KSF when deenergized couple —150 volts to the S input terminals of the flip-flops of the Z counter and the F counter, respectively. The arrangement is such that a negative voltage is coupled either to the base of the transistor Q*f*1 or Q*f*2 whenever the —150 volts is applied to one of the terminals S or R. This negative voltage is of sufficient magnitude to strongly drive that particular transistor to conducting condition if it is not already conducting, contrary to the positive going voltage applied to other terminals of the transistor for the purpose of cutting off the transistor. Thus, the application of the set voltages to the F and Z position counters FPC and ZPC is a negative voltage application to the terminals S of all of the flip-flops forcing transistor A*f*1 of the respective flip-flops to conduct, setting each flip-flop into its "1" representing electrical state with the terminal Q at —2 volts and the terminal $\overline{Q}$ at zero volts.

TAPE ROW COUNTER

As earlier mentioned herein, the tape row counter comprises two interconnected ring counters, each of which includes six flip-flops. The first ring counter includes flip-flops FQ0 through FQ5, and the second ring counter includes flip-flops FQ*a* through FQ5. These flip-flops individually may be the same as that described in FIG. 6. However, all of the terminals indicated on the flip-flop in FIG. 6 are not utilized in the circuit connections among the various flip-flops. As indicated in the figure the input terminal T is used to trigger the flip-flops in the tape row counter TRC. Further, as illustrated, the Q output terminal of each of the flip-flops is connected to the J input terminal of the next higher order flip-flop in the chain in both sections of the counter. Additionally, the Q output terminal, designated Q5 of the flip-flop FQ5 is connected through a coupling diode to the input terminals T of the flip-flops FQ*a* through FQ*f* and is connected directly to the J input terminal of the flip-flop FQ0. A voltage of +25 volts is connected to the R input terminal of each of the flip-flops FQ0 and FQ*a*, and to the S terminals of the remaining flip-flops of both counter sections. The S terminal of flip-flop FQ0 and the S terminal of flip-flop FQ*a* are connected in a circuit with the R terminals of the remaining flip-flops of both sections of the counter. This circuit is connected to −150 volts through the normally closed contacts K*h*B or a relay K*h*. This sets the flip-flops FQ0 and FQ*a* into their "1" representing electrical states and the remaining flip-flops in the counter to their "0" representing electrical states. The counter configuration using conventional Boolean notation may therefore be defined as $Q0 \cdot Qa$ denoting row zero (R*w*0) of the tape. Relay K*h* is similar to relay R*h* of FIG. 10 of Patent No. 3,252,147, above. Relay K*h* may also be a simple latching relay for the same purpose, having a latching coil energized by the start code signal S*c* and an unlatching coil energized by the end-of-block signal E*b*.

FIG. 12 shows the relationship of the flip-flop signals and the signal OFH. The counter is operated by the timing or feed hole signal OFH. This signal is applied to all of the T input terminals of the flip-flops FQ0 through FQ5, constituting the first section of the counter. The positive going portion of the signal OFH switches the flip-flop FQ0 from its "1" representing electrical state to its "1" representing electrical state to its '0" representing electrical state. As the flip-flop FQ0 switches to its "0" representing electrical state the positive going excursion of the Q0 voltage applied to the J input terminal of flip-flop FQ1 drives the flip-flop FQ1 to its "1" representing electrical state. The connection indicated on the J input terminal of the flip-flop here signifies a connection to either the terminals $J_p$ and $K_p$ or $J_n$ and $K_n$ in the flip-flops shown in FIG. 6. The steering provided within each flip-flop assures that the flip-flop will always trigger from its existing electrical state to its opposite electrical state with the simultaneous application of voltage to both of the J and K input terminals. With the next occurrence of a signal OFH the flip-flop FQ1 is triggered from its "1" representing electrical state to its "0" representing electrical state. Thus, the flip-flops are selectively switched from their "0" representing electrical states to their "1" representing electrical states and back to zero.

Each time the flip-flop FQ5 switches from its "1" representing electrical state to its "0" representing electrical state a trigger signal is coupled to the input terminals T of all of the flip-flops FQ*a* through FQ*f* to thereby step this section of the flip-flop one count for each six counts of the first section. The counter configurations for the respective rows of the tape are indicated adjacent the tape rows in FIG. 2 and reference may be had thereto to identify a particular row of tape. Row R*w*1, for instance, is represented by counter configuration $Qa \cdot Q1$. Row R*w*15, referred to hereinabove, is represented by the counter signals $Qc \cdot Q3$, which is the thousands row of the tape for the Z position counter. Similarly, row R*w*28 is identified by $Qe \cdot Q4$, to thereby provide signal combinations indicative of particular rows of the tape. When the counter is in the configuration $Qf \cdot Q5$ this represents the maximum count capability of the counter corresponding to row R*w*35 of the tape. The positive going excursion of the Q5 voltage triggers the flip-flop FQ0 to its "1" representing electrical state and, similarly, the positive going excursion of the voltage Q*f* triggers the flip-flop FQ*a* to its "1" representing electrical state, restoring the counter to its normal preset configuration.

POSITION COUNTER

The position counter is illustrated in FIG. 8 and, as in the case of FIG. 7, the flip-flops are here also designated as blocks. The respective terminals $J_n$, $J_p$, $K_n$, $K_p$, etc., are indicated inside of the several flip-flop blocks. This is a binary coded decimal counter and it comprises flip-flops FQ*z*1 through FQ*z*18. Through the thousandth level it is divided into groups of four flip-flops. The flip-flops FQ*z*1 through FQ*z*4 are the units flip-flops, the flip-flops FQ*z*5 through FQ*z*8 are the tens flip-flops, the flip-flops FQ*z*9 through FQ*z*12 are the hundreds flip-flops, the flip-flops FQ*z*13 through FQ*z*16 are the thousand flip-flops and the flip-flops FQ*z*17 and FQ*z*18 are the ten thousand flip-flops. This gives the counter a counting capability of 39.999 which, in the present instance, represents thousandths of an inch. In operation this counter is provided with connections whereby all of the flip-flops are initially set to their "1" representing electrical states prior to the time that information concerning a particular dimension is inserted therein. At any time a row of information is being read the absence of a hole at a particular point on the tape is effective to turn off the corresponding flip-flop.

The gating is such that each four bits of dimensional information in a single row is read simultaneously and inserted into the respective flip-flops. The lowest number flip-flop in each row of the counter corresponds to the first column of the tape and the highest number flip-flop in each row corresponds to the last information column of the tape, that is, column 4.

The counter is connected for count down operation and is operated as a binary coded decimal count down counter. In accomplishing this each $\overline{Q}$ terminal of a flip-flop is coupled into both the $J_p$ and $K_p$ input terminals of the next higher order flip-flop in the counter with the exception of flip-flop FQ*z*18. The $J_p$ and $K_p$ terminals of the flip-flop FQ*z*1 are coupled to the outputs of the count gate CG, the output pulses of which trigger this flip-flop in synchronism with pulse generation.

Binary coded decimal count down operation is achieved in each row by suitable interconnection of the circuits 8I*n* of the "2" weighted and "4" weighted flip-flops with the $\overline{Q}$ terminal of the "8" weighted flip-flop in each instance. With reference to the units row of the flip-flops the terminal $\overline{Q}$ of the "8" weighted flip-flop FQ*z*4 is coupled to the 8I*n* input terminals of both the "2" and "4" weighted flip-flops FQ*z*2 and FQ*z*3. When this row of flip-flops is in the 000 configuration, the next succeeding pulse NP or PP on the inputs of the flip-flop FQ*z*1 switches this flip-flop to its "1" representing electrical state. When flip-flop FQ*z*4 switches to its "1" representing electrical state the positive going voltage $\overline{Q}z4$ coupled to the 8I*n* terminals of the flip-flops FQ*z*2 and FQ*z*3 switches these flip-flops from their "1" representing electrical state to their "0" representing electrical states. The configuration of a units row is now 1001, or decimal number 9. Similar considerations apply to the tens, hundreds and thousands flip-flops.

POSITION COUNTER CONTROL

Setting of the Z and F position counters to their "1" representing electrical states is accomplished as generally indicated in FIG. 5*a*, by the closing of contacts of the KSZ and KSF relays to couple −150 volts to the set input terminals S (FIG. 6) of each of the flip-flops in the respective counters. As indicated, this setting operation is accomplished through relay gates which are connected to the coils of these relays. Since setting is to take place prior to the time that information is read from the tape which is to be stored in these flip-flops, the setting operation takes place on row 1 of the tape.

A typical gating circuit for this operation is illustrated in FIG. 9. The signal timing is shown in FIG. 12. Here, row 1 of the tape is identified by the signals Q*a* and Q1 which are coupled to a negative AND gate having a pull down resistor R35 connected to −25 volts. A diode D37 couples an amplifier feed hole signal OFHA into this gate. As indicated in FIGS. 9 and 12, the signals Q*a* and Q1 swing between zero volts and −2 volts, which is typical of the output voltages of flip-flops in this system, and in their negative voltage states represent the true states of the flip-flop. The signal OFHA is an interrupted ground potential signal which is synchronized with the feed hole signal OFH and, as shown in FIG. 52, is produced by the output of an amplifier AFH2 having an output transistor switched between conducting and nonconducting condition under the control of the feed hole signal OFH. The output of this AND gate is coupled through respective resistors R36, R39, R41, R43 and R45 to the bases of respective emitter follower transistors A20, A21, A22, A23 and A24. The emitter circuits of respective transistors A20 through A23 are coupled to the respective circuits producing the signals A1 through A4, as shown in FIG. 5*a*. The base circuits of the respective transistors are completed by resistor coupling to +25 volts through respective resistors R37, R40, R41, R44 and R46.

Any one of the named transistors is biased to conduct whenever the output of the gate circuit is low, say −2 volts. At any time the output of the gates is high, say ground or zero volts, the transistors are biased to cut off. Thus, at such time as signals typically represented as $Qa \cdot Q1$ are applied to the AND gate and the ground signal OFHA on the gate input terminal through diode D37 is interrupted or temporarily removed, the output of the gate will be low. Any transistor now having a grounded emitter will conduct. Ground potential on the emitter of transistor A24 is permanently coupled thereto. Thus, this transistor, unlike the rest, will conduct each time the output of the gate is low. The remaining transistors have the additional requirement that a signal A1, A2, A3 or A4, respectively, at ground potential, must be present when the gate output is low for operation to take place. Inasmuch as the transistors A20 and A23 are not employed in the operation of the KSZ and KSF relays no connections are shown therefor.

The collectors of transistors A21 and A22 are coupled through diodes D38 and D39 in parallel to one terminal of a pull down resistor R38 of an OR gate OG, the other terminal of the resistor being connected to −25 volts. Conduction of either of these transistors thus pulls up the terminal of the resistor R38 to approximately the potential of the signal on either of the circuits A2 or A3, in this instance indicated as ground potential. The output terminal of OR gate OG is directly connected to the base of a transistor A25, the collector of which is directly connected to −25 volts. The emitter of transistors A25 is connected through coils of the KSZ and the KSF relays in parallel with the collector of transistor A24.

Normally, the relays KSZ and KSF will be de-energized. In their de-energized conditions, as will be seen by reference to FIG. 5*a*, these relays apply +25 volts to the set terminals of the flip-flops of the respective counters. When these relays are energized they respectively couple −150 volts to the set terminals for switching the flip-flops to their "1" representing electrical states. In the absence of an output from OR gate OG the base of the transistor A25 is at a negative potential. At such time as the output of the gate is low the transistor A24 conducts. This couples the emitter of transistor A25, now operating as an emitter follower, approximately to ground potential and the transistor A25 by reason of its negative base bias conducts, which momentarily energizes both of the relays KSZ and KSF to set the two counters. Setting operation of the counters may be inhibited by programing a signal A2 or A3 in row 1, columns 2 or 3, of the tape. When this happens the output of the OR gate is high and at such time as the output of the AND gate goes low biasing transistor A24 to a conducting condition the emitter follower A25 is biased off so that the counter setting relays are not energized.

The signal OFHA is controlled by the signal OFH so that synchronous operation may be maintained. A typical circuit for accomplishing this is shown in FIG. 10 illustrating diagrammatically the details of the entire signal shaper circuit and amplifier AFH2 shown in block form in FIG. 5*a*. The signal shaper circuit includes a trigger comprising transistor A26 and A27 connected in common emitter configuration to ground through a resistor R50. Conducting bias is applied to the base of transistor A26 through a resistor R51 connected to −25 volts. The collector of transistor A27 is connected to −25 volts through a resistor R52. The collector of transistor A26 is connected to −25 volts through a resistor R55 forming a part of a voltage divider network between +25 volts and −25 volts and including additionally in series the resistors R53 and R54. The common terminal of resistor R53 and R54 is connected to the base of the transistor A27 and provides base bias therefor. The common terminal of resistors R54 and R55 represents the output of the trigger circuit and is connected by means of a capacitor C20 to the base of a transistor A28 forming part of a multi-vibrator circuit with a transistor A29. This circuit is connected as a one-shot multivibrator and is normally biased by a resistor R60 connecting the base of transistor A29 to −25 volts so that the transistor A29 conducts. Transistors A28 and A29 are connected in grounded emitter configuration. The collector of transistor A28 is coupled to the base of transistor A29 through a coupling capacitor C22. Similarly, the collector of transistor A29 is coupled to the base of transistor A28 through a coupling circuit including a resistor R57 and speed-up capacitor C21. A resistor R59 also couples the collector transistor A28 to −25 volts. The collector of transistor A28 is further connected to ground through a Zener diode ZD1. The biasing arrangement on this circuit in the absence of an input signal from the trigger normally maintains the transistor A29 conducting, in which case the output signal OFH is at approximately ground potential and is coupled out of the circuit through a diode D50. The collector circuit of transistor A28 is coupled by a diode D51 to a resistor R62 which in turn is coupled to the base of a transistor AFH2 which produces the output signal OFHA. The common terminal between the diode D51 and resistor R62 is coupled by a resistor R63 to −25 volts. The base of the transistor AFH2 is coupled through a resistor R61 to +25 volts.

With the biasing arrangement described at the base of the transistor AFH2 the voltage drops across the resistors R61, R62, and R63 are such as to maintain the transistor AFH2 normally conducting when the one-shot multivibrator is in its normal electrical state. At the time a feed hole signal AFS appears at the input to the trigger, the transistor A26, which is normally conducting, is now switched off. The potential on the collector circuit now falls from ground potential in a negative direction to the potential provided by the voltage divider network at the common terminal between the resistor R54 and R55. This negative going voltage is coupled to the base of transistor A28 of the one-shot multivibrator by the capacitor C20 and the negative going pulse biases the transistor A28 momentarily to conduction. This pulls the collector up to ground potential and at the same time via the coupling provided by capacitor C22 cuts off the transistor A29. The rising collector voltage which is coupled into the base of the transistor AFH2 by diode D51 and resistor R62 cuts off transistor AFH2 and momentarily opens the collector circuit thereof. Thus, the signal OFHA is an interrupted ground potential signal which is synchronized with the signal OFH as described.

The control for the two position counters also includes a plurality of flip-flop gates which form part of the distributor gate system. A typical flip-flop gate is illustrated in FIG. 11 which here shows the gate which gates the information from row 15 (R*w*15) of the tape into the thousands level flip-flops of the Z position counter ZPC. Here, again, a particular tape row is defined by a combination of two signals from the tape row counter TRC, row 15 being defined by the signal combination QC and Q3. These two signals are applied as AND circuit inputs on a pair of gating diodes D53 and D54, respectively, the outputs of which are commonly distributed through the gating network indicated. This distribution is effected by respective diodes D55, D57, D59 and D61 forming one of two diodes in respective AND gates including respective diodes D56, D58, D60 and D62. Each of the AND gates is provided with pull down resistors which are respectively designated R65, R66, R67 and R68 which are connected to −25 volts. The E voltage signal circuits E1C, E2C, E3C and E4C (FIG. 5*a*), utilized in setting the flip-flops, are respectively coupled to the AND gate diodes D56, D58, D60 and D62 to complete the inputs for this particular circuit. The corresponding gating signals are designated E1, E2, E3 and E4 and like the "A" signals previously described are two level voltages swinging between −2 volts and zero volts each time a hole in the tape is read. The outputs of the respective AND gates are indicated as applied to the $K_n$ input terminals of the respective flip-flops FQ*z*13 through FQ*z*16 of the thousands level of the Z position counter.

As earlier noted herein, the presence of a hole in the tape is ineffective to trigger a counter flip-flop which is set in the "1" representing electrical state prior to the introduction of the information from the tape. The absence of a hole in the tape, however, results in a positive going voltage pulse at the output of the associated AND gate to provide a triggering voltage on the K side of the flip-flop, switching the flip-flop from its "1" representing electrical state to its "0" representing electrical state. This operation takes place as follows, reference also being made to the the circuits associated with the "E" signal circuits E1C, E2C, E3C and E4C in FIG. 5*a*. Assuming, for instance, that row 15 of the tape is being read, the signals QC and Q3 will be in the lower of their two voltage states, the respective flip-flops FQ*c* and FQ3 being set in their "1" representing electrical states. Thus, the output of the gate including the diode D53 and D54 is low. This low voltage is coupled through the respective gating diodes D55, D57, D59 and D61. Thus, one terminal of each of the AND gates is at the lower of its two voltage states. If one of the "E" signals is present on an input terminal of one of the AND gates a triggering pulse is prevented from being formed at the associated $K_n$ terminal of the associated flip-flop. Assuming, for instance, as shown, a hole exists in column 3 of the tape in the row 15 position. This results in the generation of the signal E3 which swings from −2 volts to ground potential. This signal is coupled to the cathode of the diode D7. The anode of diode D7 now tends to rise to ground potential as a result of the connection provided by the resistor R7 to +25 volts (FIG. 5*a*). This rising voltage is coupled by the resistor R7 and capacitor C1*a* to the base of transistor Q*f*1. The resistor R7 limits the charging current and as a consequence results in a ramp type voltage rise which is coupled to the base of transistor Q*f*1 (see FIG. 6). This voltage ramp does not have the switching characteristic of the positive going pulse type of voltage which is required for triggering the conducting transistor Q*f*1 to nonconducting condition. As a consequence, the transistor remains conducting and the flip-flop remains in its "1" representing electrical state with transistor Q*f*1 conducting and transistor O*f*2 off and the output terminal Q in its "1" representing electrical state, that is, at −2 volts.

Assume now that no signal had been programmed. In this respect refer to column 4 where the 8 weighted bit is absent. A signal E4 is therefore not produced. In this situation no coupling through the circuit E4C into the gate takes place. The input to the gate remains low until such time as the flip-flop FQ3 of the tape row counter switches from its "1" representing electrical state to its "0" representing electrical state. The positive going trailing edge excursion of the signal Q3 is now coupled directly into the terminal $K_n$ of flip-flop FQ*z*16 and the sharp positive going pulse resulting therefrom is effective to cut off the conducting transistor Qf1 in order to switch the flip-flop from its "1" representing electrical state to its "0" electrical state. Thus, for the dimension programmed on the tape the presence of signal E3 results in the flip-flop FQ*z*15 remaining in its "1" representing electrical state whereas the absence of a hole in the tape and the lack of signals E1, E2 and E4 results in switching of the flip-flops FQ*z*13, FQ*z*14, and FQ*z*16. Thus, reading from least significant to most significant, left to right, the flip-flop configuration is 0010 and the actual decimal number represented thereby is 4. A gate of this type is provided for each row of information on the tape and is utilized for the purpose of setting flip-flops.

In the discussions hereinabove reference has been made to various types of voltages. FIG. 12 is a timing diagram of chart showing the relationships of these voltages and their general idealized configuration. In this illustration a rectangular voltage E7–0 is arbitrarily depicted in the upper left of the drawing. It is properly positioned in row 0 and represents the start code signal which is read in row 0, column 7, of the tape. This timing diagram begins with row 0 and then jumps to row 14, continuing consecutively with rows 14 through 20 which covers all of the rows of information for the Z counter and the F counter, and then jumps to row 28 which is the select zero row of the tape. The signal in row 15 of the tape is designated E3–15 and represents the signal of column 3. In row 16, the two signals are designated E2–16 and E3–16 representing the signals of columns 2 and 3. These are the signals that inhibit switching of flip-flops FQ*z*15, FQ*z*10 and FQ*z*11 causing the Z position counter ZPC to indicate a programmed distance of 4.6 inches. In row 19 of the tape the signal E2–19 is indicated. This is derived from the mark in column 2, row 19, of the tape. In row 20 the signal E–20 denotes the signal derived from the mark in column 3, row 20, of the tape. These signals inhibit switching of flip-flops in the F counter FPC resulting in an F counter setting representing 2.4 inches. The signals in rows 19 and 20, as indicated from the tape format, are coupled to the F counter FPC, via a gate of the type of FIG. 11, when the counter configuration is $Qd \cdot Q1$ for the row 19 and $Qd \cdot Q2$ for row 20.

Signals A1–28 and A3–28 denote the "A" signals for the example herein chosen, that are utilized to select the zero reference for the machine tool. These signals, as will be seen from the tape, denote the decimal number 5 and are applied to the enter gates of the general type illustrated in FIG. 20 yet to be described.

The feed hole signals OFH and OFHA are also depicted in FIG. 12, indicating the interruption of the signal OFHA at such times as the feed hole signal OFH is in the lower of its two voltage states. The voltage configurations of the flip-flops of the tape row counter for the tape rows shown are indicated in the lower portion of this figure. The relationship of the switching of the flip-flops Q0 through Q5 to the feed hole signals is shown in FIG. 12. For instance, with reference to the flip-flop Q0, it is switched from its "1" representing electrical state, which occurs just subsequent to the centerline of the row 17 position, to its "0" representing electrical state, by the positive going excursion of the feed hole signal at row 18. Likewise, this positive going excursion of the Q0 signal just subsequent to the centerline of the row 18 position, is instrumental in switching the flip-flop FQ1 to its "1" representing electrical state, as indicated. It will be seen also that the flip-flop FQ5 has a positive going excursion of its signal Q5 just beyond the centerline of row 17 which switches the flip-flop FQ0 to its "1" representing electrical state as indicated.

The final aspect of position counter control is under the control of the Z position count gates ZPCG which are shown in detail in FIGS. 13 and 14. The count gate of FIG. 13 is enabled by the signal Q*dz* when the machine spindle assembly is to be moved upwardly. The signal Q*lz* is applied along with the signal Q*dz* to the respective input diodes D10*a* and D10*b* of an AND gate, the cathodes of which are commonly coupled by a pull down resistor R10 to −25 volts. The output of this AND gate is coupled through a diode D11 to an output circuit, including a pull up resistor R11 connected to +25 volts, and a diode D12 to which the count pulses $N_p$ are applied. The output circuit of this gate is represented in the twin outputs $J_p$ and $K_p$ which, as indicated in FIG. 8, are the J and K input terminals of the least significant flip-flop FQz1 of the Z position counter. The gate illustrated in FIG. 14 is similar and gates the signals Q*dz* and Q*lz* by means of respective diodes D13*a* and D13*b* of an AND gate having a pull down resistor R13 commonly connecting the cathodes of the diodes to −25 volts. The output of this gate is connected to the cathode of a coupling diode D14, the anode of which constitutes the output circuit and is coupled to the cathode of an input diode D15 to which the pulses $P_p$ are applied during downward movement, and coupled to a pull up resistor R14 the other terminal of which is connected to a supply of +25 volts. The circuits are designated $K_n$ and $J_n$ and as seen in FIG. 8 are applied to the appropriate J and K input terminals of the least significant flip-flop FQz1 of the Z position counter. With reference to both of the gates in FIGS. 13 and 14, at any time that one of the two input signals is at the higher of its two potentials the output terminals of the gate will be correspondingly clamped. This clamping voltage is roughly ground potential. Consequently, the pulses $P_p$ and $N_p$ which swing from some negative voltage (−2 volts) towards ground potential, do not produce a positive going output pulse in the output of the gate. Thus, counting is inhibited at any time that one of the two input signals on either of the gates is at the higher (ground) of its two voltage levels.

Z ZERO GATE

The details of the Z zero gate ZZG are illustrated in FIG. 15. This is a conventional AND gate the output of which drives an inverter amplifier. The AND gate comprises a plurality of parallel connected gating diodes designated DZ1 through DZ18, the common cathodes of which are connected through a pull down resistor RZ16 to −25 volts. As indicated, the signals $\overline{Q}z1$ through $\overline{Q}z18$ are applied as inputs to the respective diodes. When all of the counter flip-flops are in their "0" representing electrical state all of the gate input signals will be low and the output of the gate will be in the lower of its two voltage levels, in this case approximately −2 volts. The output of the gate is coupled by a diode DZ19 to the base of a transistor QZ0. Base bias for this transistor is provided by means of a voltage divider including the series connected resistors RZ1 and RZ2 connected between +25 volts and −25 volts. These resistors are selected of such value that the base of the transistor is normally biased positive thereby and the transistor is normally nonconducting. The emitter of this transistor is connected to −25 volts through a resistor RZ4 and to ground through a silicon diode DZ21 employed to introduce a small forward voltage drop which pulls the emitter below the normal base bias so that the transistor may be cut off. The transistor collector and an output diode DZ20 are coupled to opposite sides of a resistor RZ5 forming part of a voltage divider network including resistors RZ3 and RZ6 in series between +25 volts and −25 volts. The values of the resistors are such that the output voltage at the cathode of diode DZ20 is normally at some negative voltage. At such time as the output of the AND gate is low, indicating a count of zero for the Z counter, the transistor QZ0 is biased to conduction. This coupled the bottom side of the resistor RZ5 of the voltage divider to approximately ground potential and correspondingly raises the upper end thereof which is connected to the diode DZ20. As a consequence, the output of the diode now swings from, say, −2 volts to some voltage above ground potential, depending upon the IR drop across the resistor RZ5, to provide a sharp positive going voltage at the $K_n$ input terminal of the flip-flop, FQ*mz*. It will be recalled the flip-flop FQ*mz* is initially set in its "1" representing electrical state by the setting control provided by the Z counter setting relay KSZ. The application of this positive going voltage to the $K_n$ input terminal thus switches the flip-flop FQ*mz* from its "1" representing electrical state, to indicate that the bottom or limit of the programmed movement in the Z or feed axis has been reached. The control functions resulting from this switching of the flip-flop have been previously described.

Z MOVE AMPLIFIER

FIG. 16 illustrates the details of the Z move amplifier which includes the amplifiers A9 and A10 and the control circuits associated therewith. The input to this circuit is represented in an AND gate AF1 and input diodes D35, D36 and D37, the common cathodes of which are coupled through a pull down resistor R35 to −25 volts. The output of this AND gate is coupled through a resistor R36 to the base of a grounded emitter transistor Q*a*9 forming part of amplifier A9. The collector of this transistor is coupled through a resistor R38 to −25 volts. The base circuit of the transistor Q*a*9 is coupled through a resistor R37 to +25 volts. The circuit from +25 volts to −25 volts, including the resistors R37, R36 and R35, in effect, is a voltage divider circuit controlling the base voltage of the transistor Q*a*9. The signals controlling the AND gate are the move flip-flop signal Q*mz* and two signals $\overline{A}mx$ and $\overline{A}my$, which last two signals as described indicate that movements in two other axes of the machine tool system have been completed. It will be appreciated that other "operations pending" signals may be incorporated in this gate for the purpose of inhibiting Z move amplifier operation until such time as the operations indicated thereby have been completed.

The output of the amplifier A9, represented in its collector circuit, is coupled to one input terminal T0 of the AND gate AG2 and produces a signal A*mz* which is at ground potential when the amplifier A9 is conducting, indicating in this, the higher of its two voltage levels, that movement in the Z or, in this case, the feed axis may take place. Amplifier A10 comprises a transistor Q*a*10 having a grounded emitter. The collector terminal is denoted G*mz* which, as seen in FIG. 5*b*, is coupled as an input to the gate AG3. The signal G*mz* is at ground potential when the transistor Q*a*10 is conducting and is used as an inhibiting signal to prevent movement in the Z axis until all auxiliary functions are performed in the system.

To this end the transistor Q*a*10 is controlled by the AND gate AG2 having a plurality of input terminals T0, T1 and T2 for controlling the gate. Terminal T0 is in one parallel branch of this gate from resistor R39 to −25 volts, including resistors R40 and R38. Terminal T1 is in a second branch including resistors R41 and R42 and terminal T3 is in a third branch including resistors R42 and R44. The division of voltages between +25 volts and −25 volts provided by resistor R39 and the other resistors of the parallel branches of the gate AG2, in the absence of input biases on any one of the terminals T0, T1 and T2, will normally be such as to drive the base negative and cause conduction which couples the collector of the transistor Q*a*10 to ground.

One auxiliary function signal is the down inhibit signal coupled to terminal T1. In the normal mode of operation this signal is at ground potential and operates as a gate enabling control. However, in the select zero mode, the down inhibit signal circuit is open circuited until a lamp selection is completed, at which time it is again grounded.

Other auxiliary function signals may include a signal indicating the tape row counter is still counting, a signal indicating a block of tape is being read, a signal indicating a parity error, etc., which may be coupled to a terminal T2, etc., by extending the gate. In the interest of simplicity facilities for producing such auxiliary function signals are not shown and the gate terminal T2 is grounded.

Whenever all input signals on gate AG2 are at ground potential, transistor Q*a*10 is cut off which open circuits its collector circuit removing the inhibiting signal G*mz* from the input to gate AG3. If the signal $\overline{Q}dz$ is in the lower of its two voltage states, removal of inhibiting signal G*mz* results in a drop in output of gate AG3 causing transistor Q*a*11 of amplifier A11 to conduct and grounding the collector circuit. As described, this completes the energizing circuit for relay K*mpz*.

COMPARATOR

A typical comparator circuit ZFC is illustrated in FIG. 17. Here, respective pairs of AND gates compare the Q and $\overline{Q}$ outputs of the F counter flip-flops with the $\overline{Q}$, Q outputs, respectively, of the Z counter flip-flops in the counter levels indicated. The diodes of AND gate AG23 couple the $\overline{Q}$ output of flip-flop FQ*z*16 and the Q output of the flip-flop FQ*f*8. The diodes of AND gate AG22 couple the Q output of flip-flop FQ*z*16 with the $\overline{Q}$ output of the flip-flop FQ*f*8. These gating circuits ranging from AND gate AG8 through AND gate AB23 correspondingly couple the outputs, as just described, of all of the flip-flops FQ*z*9 through FQ*z*16 of the hundreds and thousands level of the Z position counter with the flip-flops FQ*f*1 through FQ*f*8 of the F position counter. The outputs of all of these AND gates are coupled by respective diodes to an OR gate OG8, the output of which in turn is coupled through a diode to the base of a transistor Q*a*R forming part of an amplifier AR11. The emitter of this transistor is grounded and the collector is connected to —25 volts through a resistor R51. The base of this transistor is also coupled to +25 volts through a resistor R50. This transistor is biased so that it is normally conducting, in which case the collector circuit which is coupled to the latching coil L of rate relay K*cpa* is at ground potential. Since the other side of this coil is grounded (see FIG. 5*a*) the rate relay is normally deenergized. As long as at least one pair of the dissimilar pairs of signals on the input to one of the AND gates exit in the lower of its two voltage states, this indicates that there is not equality between the contents of the two counters and results in a low output of that particular AND gate which by the coupling afforded by the OR gate OG8 maintains the low base voltage required for conduction of transistor Q*a*R. At such time as none of the indicated signal relationships exists, which indicates equality of count between the two counters, all of the OR gate terminals are at the higher of their two potentials, that is, approximately at ground potential. As a consequence, the base voltage of the transistor Q*a*R is raised and conduction is cut off. This decouples the collector circuit from ground and the circuit for the latching coil of the rate relay is now completed from —25 volts through the collector circuit resistor R51 through the coil L of the latching relay to ground.

PULSE GENERATOR

The pulse generator referred to in describing FIGS. 5*a* and 5*b*, as noted, is described in a copending Patent No. 3,265,105 of R. C. Bell, identified hereinabove. Only such portions of this equipment as are essential to an understanding of this invention will be referred to particularly herein. For additional details reference may be made to the aforesaid copending application.

The pulse generator circuit includes signal forming circuits of the type typically represented in FIG. 18. One such circuit is included for each transducer which is utilized. In the present system there are three transducers.

One is the transducer head HM*z*1, a second is the transducer head HM*z*2 and the third is the zero head HM*z*L. Each magnetic head HM*z*1 and HM*z*2 utilizes a circuit of the type indicated in FIG. 18. The zero head HM*z*L utilizes a modification thereof, as indicated in FIG. 19.

The circuit of FIG. 18 comprises a two-stage amplifier including transistor Q*p*1 and Q*p*2 connected in cascade which are utilized to drive a trigger circuit comprising transistors Q*t*1 and Q*t*2. The output of this trigger circuit directly produces a signal M1 which is differentiated to produce a signal $d$(M1). An inverter amplifier Q*p*3 which is driven by signal M1 produces an inverted signal $\overline{M1}$ which in turn, is differentiated to produce a signal $d(\overline{M1})$.

In detail this circuit includes an input device in a transducer system TD1 including the magnetic head H*mz*1. Patent Nos. 2,897,462, 2,903,765 and 2,918,662 show various transducer circuits employing magnetic heads and having output circuits which may be coupled into the circuit of FIG. 18. For the purpose of this discussion it will be assumed that in circuit TD1 the magnetic head HM*z*1 modulates a one megacycle signal which is filtered, clipped and squared and coupled between a tap of a potentiometer P1 and ground in a circuit including a calibrating resistor CR1. The potentiometer P1 is coupled between +25 volts and ground. The terminal of resistor CR1 which is connected to the transducer TD1 is also coupled to the base of an NPN transistor Q*p*1. When the magnetic head is not over a groove on the scale it is in the higher of its two impedance states and the output voltage is at the higher of its two levels. The resulting base bias drives the transistor Q*p*1 to conduction. This coupled the collector circuit of this transistor to ground. The base circuit of the transistor Q*p*2 is coupled to the collector circuit of the transistor Q*p*1 through a resistor R16 and is also coupled to —25 volts through a resistor R17. The voltage division with resistor R16 coupled to ground, results in the application of negative potential to the base of transistor Q*p*2 driving this transistor to conduction. The collector of transistor Q*p*2 is connected directly to —2 volts, as indicated, and the emitter circuit is coupled through a diode D16 to the base of transistor Q*t*1 applying approximately —2 volts thereto and causing conduction.

The transistors of the transistor trigger circuit are connected in common emitter configuration. A resistor R20 of low ohmic value connects the common emitter circuit to ground. A resistor R19 connects this emitter circuit to +25 volts. The base of transistor Q*t*2 is connected in a voltage divider circuit including resistors R21, R22 and R23 in series between +25 volts and —25 volts. The base bias of transistor Q*t*2 provided by this circuit is such as to cause this transistor to conduct, in the absence of the application of approximately ground potential between resistors R22 and R23 by the collector of transistor Q*t*1 when it is conducting. The collector of transistor Q*t*2 is coupled to —25 volts through a resistor R26 and through a diode D17 and resistor R25 to +25 volts. Resistor R18 connects the anode of diode D16 to +25 volts and resistor R24 connects the cathode of diode D16 to —25 volts. The resistor R24 is the larger of the two providing a normally positive bias on the base of transistor Q*t*1 in the absence of conduction of transistor Q*p*2. The collector circuit of the transistor Q*t*2 is further connected to —2 volts through a clamping diode D18.

The circuit condition described to this point denotes operation of the circuit when the head H*mz*1 is in the higher of its two impedance states and consequently at the higher of its two voltage levels, that is, in a position over a land on the scale S. When the head moves over a groove and the magnetic circuit reluctance drops the head voltage drops correspondingly and the base of the transistor Q*p*1 is moved towards ground potential which cuts off the transistor. This action cuts off transistor Q*p*2 which in turn cuts off transistor Q*t*1 of the trigger. The triggering action switches on transistor $Qt2$ so that the collector circuit switches from −2 volts toward ground.

The collector circuit of transistor $Qt2$ is coupled to a differentiating circuit, including a capacitor C10, through a diode D19, the output of this circuit being the signal $d$(M1), as earlier described. A clamping diode connects the output of the differentiating circuit to ground. A resistor R28 connects the collector circuit of transistor $Qt2$ to the base of a transistor $Qp3$ which functions as an inverter amplifier. The emitter of this latter transistor is grounded and the collector circuit is clamped to −2 volts by means of a diode D23 in a circuit including resistor R29 which is connected to −25 volts. The output of the collector circuit is the signal $\overline{\mathbf{M1}}$. This collector circuit is coupled to a differentiating circuit, including a capacitor C11, by means of a diode D21. The output of the differentiating circuit is grounded through a ground clamp diode D22. The output signal is $d(\overline{\mathbf{M1}})$.

As noted earlier herein, two such circuits are employed, one for each magnetic head. Since the head voltages are out of phase with one another the respective transistor voltages and differentiated transistor voltages will also be out of phase. As described in the copending application of R. C. Bell, S.N. 80,485, aforesaid, these are combined in a particular logical relationship to produce a series of pulses $P_p$ representing relative movement in one direction between the head and scale and, $N_p$, representing relative movement between the head and scale in the opposite direction.

This same circuit, modified as shown in FIG. 19 and substituting the head HMzL for the head HMz1 in FIG. 18, is utilized to produce the signal $\overline{\text{ML}}$ described in connection with FIGS. *5a* and *5b*. The signal ML is the same as signal M1 of FIG. 18 and is inverted by the transistor $Qp3$, as described in connection with FIG. 18 to produce the signal $\overline{\text{ML}}$. When the head HMzL is not over a reference groove the signal $\overline{\text{ML}}$ is at the higher of its two voltage levels, in this case ground potential, and when the head is over a groove, the signal $\overline{\text{ML}}$ is at the lower of its two voltage levels.

The zero trigger output signal $\overline{\text{ML}}$ (see FIGS. *5a* and *5b*) is coupled to the $K_p$ input terminal of the flip-flop FQ*tr* and switches this flip-flop to its "0" representing electrical state $\overline{Qtr}$. Signal $\overline{\text{ML}}$ also is coupled to AND gate AG5 by diode D23 and in the absence of the signal K*fdm*, is coupled to the J side of flip-flop FQ*ls*, switching this flip-flop to its "1" representing electrical state whenever the signal $\overline{\text{ML}}$ switches from the lower of its two voltage states to the higher. This is the positive going trailing edge of the signal $\overline{\text{ML}}$. To prevent unwanted triggering of the flip-flop FQ*ls*, a gating circuit has been added which is controlled by the contacts K*fdm* of the relay K*fd*. The contacts K*fdm* when closed connect the input resistor R30 of this gating circuit to −25 volts as seen in FIG. *5b*, thereby pulling down the input to the gate. The gating circuit includes a clamping diode D30 which is connected to −2 volts. The cathode of this diode is connected to the output side of the resistor R30. The output side of the resistor R30 is also connected to the cathode of a coupling diode D32 and to ground through a low ohmic resistor R31. The anode of the diode D32 is connected through a coupling resistor R32 to +25 volts. The anode of diode D32 is also connected to the input terminal $J_p$ of the flip-flop FQ*ls*. The signal $\overline{\text{ML}}$ is coupled through a diode D33 to the terminal $J_p$ of the limit flip-flop FQ*lz*. When contacts K*fdm* are open the resistors R31 and R32 maintain the terminal $J_p$ (FQ*ls*) at about ground potential.

When the contacts K*fdm* are closed, the terminal $J_p$ of the limit flip-flop FQ*lz* is maintained at substantially −2 volts. Thus, during the period of time that the contacts K59B are closed, the occurrence of the $\overline{\text{ML}}$ signal is effective to trigger the flip-flop FQ*ls*.

FIG. *19a* shows the relationship of the signals $\overline{\text{ML}}$, K*fcm*, $J_p$ (FQ*ls*) and Q*ls*.

ENTER GATE

The enter gate is illustrated in FIG. 20. This gating network, like other gating networks illustrated hereinabove, comprises individual sections EG–20, EG–10, EG–8, EG–4, EG–2 and EG–1, each of which has resistor networks including resistors RE1, RE2 and RE3 connected between +25 volts and −25 volts, respectively. Each section includes a pair of gating diodes DE1 and DE2 for coupling the input signals into the resistor network. In the absence of input signals which enable a gating circuit, the output circuit, for instance, as represented in the output terminal $J_n$ (FQM1–20) will be in the lower of its two voltage states. When the proper input signal combination exists on all the gating diodes for a particular section, then the output terminal of this particular section will rise to the upper of its two voltage states, in this case about ground potential. The signals Q*e* and Q3, Q*e* and Q4 denote rows 27 and 28, respectively, on the tape (see FIG. 2). The signal combination Q*e* and Q3 is coupled by diodes DE3 and DE4 to the inputs of both of the gating sections EG–20 and EG–10 coupled to the 20 level and the 10 level flip-flops, respectively, of the buffer memory ME1. The signal combination Q*e* and Q4 representing row 28 is coupled by diodes DE5 and DE6 to all of the gates EG–8, EG–4, EG–2 and EG–1 for the flip-flops weighted 8, 4, 2, 1 in the buffer memory. The signals A2 and A1 are coupled to the diodes DE2 of the gates for the 20 level and 10 level flip-flops of this memory and the signals A4, A3, A2 and A1 are coupled by the diodes DE2 to the inputs of the gates controlling the 8, 4, 2 and 1 weighted flip-flops of the memory. Note that all of the output terminals of the gates are coupled to the $J_n$ input terminals of the respective flip-flops of the buffer memory. In this connection refer to FIG. 23.

RESET CIRCUIT

The reset circuit for the buffer memory is illustrated in FIG. 21. This circuit comprises respective transistors QR1 and QR2. The collector circuit of transistor QR1 is coupled to the output of a tens "and" gate circuit TG including a pair of diodes DT1 and DT2 receiving the signals A1 and A2 and including a pull down resistor RT connected to −25 volts. The emitter of transistor QR1 is diode coupled to the output of amplifier A6 which amplifies the signal from row 6 of the tape. The base of transistor QR1 is connected to a resistor network including three resistors RT1, RT2 and RT3 coupled between +25 volts and −25 volts as shown. The signals Q*e* and Q3 representing row 27 of the tape, along with the signal OFHA (see FIG. 12), are coupled by diodes DT1, DT2 and DT3 to this resistor network and form a gating network along with resistor RT3 which is pulled down to −25 volts as shown. The collector circuit of the transistor QR1 is additionally coupled by resistors RM–20 and RM–10 to the $K_p$ terminals of the flip-flops FQM1–20 and FQM1–10, respectively (see also FIG. 23).

The lower section of this reset circuit includes the transistor QR2 and is the same as the upper section just described excepting that the units gate UG in the collector circuit of the transistor QR2 includes sufficient coupling diodes DU1 through DU4 to couple the tape signals A1 through A4. Resistor RU is the gate pull down resistor. The collector circuit of this transistor is the reset circuit for the flip-flops FQM–1 through FQM–8. As will be seen by reference to FIG. 23, this reset circuit is coupled through resistors RM–1, RM–2, RM–4 and RM–8 to the respective input terminals of the indicated flip-flops of the buffer memory. These resistors correspond to the resistors RM–10 and RM20 of the upper section of this reset circuit. Diodes DU1, DU2 and DU3 form an "and" gate with pull down resistor RU3 and couple the signals OFHA, Q$e$ and Q4, respectively, to the output circuit. Each section of this reset circuit operates as an "or" gate to set or reset the connecting flip-flops as required for the purpose of programming a desired selective zero including zero.

For an understanding of the operation of this circuit reference is made to the flip-flop of FIG. 6 for the following modification, namely, the deletion of the capacitor C2$a$ from the $J_n$ input circuit of the flip-flop. Each of the flip-flops of the buffer memory are so modified. The capacitor C1$b$ is retained in the $K_p$ input circuits of each of the flip-flops. Thus, all of the signals produced by the outputs of the individual gating sections of the enter gate of FIG. 20 are coupled directly to the input diode D2 on the J side of the flip-flop, whereas, all of the signals of the reset circuit of FIG. 2 which are coupled through a capacitor C1$b$ to the input diode D1 in the base circuit of the transistor Q$f$1.

If no selective zero is programmed (zero selective zero) there will be no holes punched in the tape in columns 1 through 4 in either of rows 27 or 28, but holes will be punched in column 6, rows 27 and 28. The end of block signal E$b$ will be positioned in row 29 as shown. As rows 27 and 28 of the tape are read there will be no signals A1 through A4 generated; consequently, there will be no outputs from the enter gates of FIG. 20. In FIG. 21 there will be no positive going signals on any one of the terminals A1 through A4 of the gates TG and UG in the collector circuits of the two transistors QR1 and QR2. Thus, at the time the signals Q$e$, Q3, OFHA and A6 exist simultaneously, the base of the transistor QR1 is pulled down causing conduction, it being recalled that terminal A6 is grounded whenever that feed hole amplifier conducts. Thus, the collector circuit is momentarily coupled approximately to ground during the period of duration of the signal OFHA (see FIG. 12) which couples a positive going voltage into the $K_p$ input terminals of the 20 level and 10 level flip-flops of the buffer memory. Similar considerations apply to the transistor QR2 at such time as the signal configuration Q$e$ and Q4 exists along with the signals OFHA and A6, which couples the collector circuit of the transistor QR2 momentarily to ground. Thus, positive going reset signals are coupled to the $K_p$ input terminals of all of these flip-flops, resetting them.

If a selective zero number is programmed in either or both of rows 27 and 28, the corresponding $J_n$ terminals of the enter gate EG will be switched to ground potential. At the same time the corresponding $K_p$ terminals of the reset circuit will be switched to ground potential. Recalling that the $J_n$ terminals are coupled (see FIG. 6) through the diode D2 directly to the base of transistor QF2 of each of the flip-flops and that all of the $K_p$ terminals of the reset gate are coupled through a capacitor, it will be seen that the setting signal on the flip-flop will exist through the period of duration of any one of the signals A1 through A4 but that the resetting signals on the $K_p$ terminals will exist only for a few microseconds, depending upon the time constant of the circuits including the capacitor C1$b$. The DC coupling thus overcomes the capacitor coupling and those flip-flops not already in their "1" representing electrical states are set thereto in the presence of the DC signals and those lacking the DC signal if not already in their "0" representing electrical states are switched thereto. If the end of block signal is moved ahead of line 27 the selective zero function is eliminated.

FLIP-FLOP RESET CIRCUIT

The circuit for producing the signal +25 VRS is illustrated in FIG. 22. Here, a p-n-p transistor QR3 has its emitter coupled to +25 volts and its base coupled to ground through a resistor PR1 providing a conductive bias so that the transistor normally conducts, connecting the collector circuit to +25 volts and producing the signal +25 VRS. This base circuit is coupled through a capacitor C25 and a diode DR1 to the contact LSM of the limit switch LS (see FIG. 5$b$). Additional resistors in the base circuit include the grounded resistor RR2 coupled to the cathode of the diode DR1 and the resistor RR3 coupled between the anode of the diode and −25 volts. At such time as the machine moves into its upper limit closing the limit switch LS, the contacts LSM are grounded. This positive going voltage in the base circuit cuts off transistor QR3 momentarily decoupling +25 volts from the collector circuit. The positive going voltage resulting from grounding of the contacts LSM is coupled through a capacitor C26 and a resistor RR4 to the control terminal of a control rectifier CR2 which now becomes conducting. The voltage division provided by resistors RR5 and RR6 which have their common terminal coupled through a diode DR2 to that side of a capacitor C27 removed from ground, couple 117 VAC to the capacitor charging the capacitor to somewhere between 60 and 80 volts negative. When controlled rectifier CR2 conducts this couples the collector circuit of the transistor QR3 to this rectified negative voltage. This negative voltage, as indicated throughout the circuits is utilized to set or reset the flip-flops connected thereto as described hereinabove at such time as the spindle assembly moves into its upper limit of retraction.

Provision may also be made for manually producing this negative signal. Such a circuit comprises a transistor QR4 having a grounded emitter and a collector circuit coupled through a capacitor C28 to the capacitors C25 and C26. This capacitor circuit, like that for the capacitor C25, is coupled between ground and −25 volts by a resistor divider network including resistors RR7 and RR8, the common terminal of which is connected to one side of the capacitor C28 as indicated. A voltage divider comprising two resistors RR9 and RR10 in series, the common terminal of which is connected to the base of the transistor QR4, is connected between +25 volts and −25 VR as indicated. The voltage division in the base circuit of transistor QR4 provides a base bias causing this transistor to normally conduct such that the collector circuit thereof is grounded. At such time as the negative voltage is to be produced manually a switch, not shown, may be provided to interrupt −25 VR thereby momentarily cutting off transistor Q4 and the collector circuit voltage drops. When −25 VR is next applied, transistor QR4 again conducts. The positive going excursion of collector voltage is now coupled by the capacitor C28 into the base circuit of the transistor QR3 to cause cut-off and into the control terminal of the control rectifier CR2 to cause conduction coupling −60 to −80 volts to the output terminal of this circuit.

BUFFER MEMORY AND ACTIVE MEMORY CIRCUITS

The buffer memory and active memory circuits are illustrated in FIG. 23, the flip-flops being shown only in block form. The modifications of the flip-flops of the buffer memory have been discussed hereinabove describing the removal of the input capacitor from the $J_n$ side of each. The flip-flops of the active memory ME2 may be the same as those indicated in FIG. 6. As illustrated the output terminals of the respective flip-flops of the buffer memory are resistor coupled by resistors R$\overline{Q}$ and RQ to corresponding input terminals $K_p$ and $J_n$, respectively, of the respective flip-flops of the active memory. The transfer of signal information from the buffer memory to the active memory is controlled by the transfer gate TG comprising respective p-n-p transistors QG1 and QG2 having collector circuits coupled to the common output circuit of the transfer gate which is coupled through a pull down resistor RG1 to −25 volts and having their emitter circuits grounded. The bases of each of these transistors are coupled through a resistor RG2 and a capacitor CG1 in series to the respective output circuits of the flip-flops FQ$ls$ and FQ$mz$ to receive the output signals of Q$ls$ and $\overline{Q}mz$, as indicated (see the transfer gate in FIG. 5*a*). Each base circuit is additionally biased by a series connected resistor RG3 and diode DG1 network coupled between +25 volts and ground, as indicated. The base bias is such that both of the transistors QG1 and QG2 are normally cut off. The output circuit of the transfer gate is commonly coupled through diodes DJ and DK to the respective input circuits of all of the flip-flops of the active memory ME2. Thus, at any time the output terminals of one of the flip-flops of the active memory exists in its "1" representing electrical state, which is the lower of its two voltages (about −2 volts) the occurrence of a positive going gating signal resulting from the conduction of one or the other of the two transfer gate transistors QG1 or QG2 couples a switching signal into the associated terminal of the flip-flop receiving the low voltage signal from the buffer memory flip-flop which switches the active memory flip-flop to the state indicated by the low voltage buffer flip-flop signal.

The circuit for generating the signal $\overline{\text{ME1}}$ is illustrated comprising respective diodes D$\overline{\text{Q}}$1 having their anodes coupled to the $\overline{\text{Q}}$ output circuits of the flip-flops of the buffer memory and their cathodes commonly coupled to the common diode circuit producing the signal $\overline{\text{ME1}}s$. As will be recalled, the signal $\overline{\text{ME1}}s$ is used to set the Z limit flip-flop FQ*lz* to its "1" representing electrical state at the time zero selective zero is programmed, or if no selective zero is programmed, at which time the signal +25 VRS has reset these flip-flops. The "or" gate producing the output signal *QM*2–1+ . . . +*QM*2–20 comprises the diodes DQ coupling the Q output terminals of the flip-flops of the active memory to the common output circuit as shown. The Q and $\overline{\text{Q}}$ output terminals of all of the flip-flops of the active memory are coupled input-wise by diodes DQ2 and D$\overline{\text{Q}}$2, respectively, to the comparator gate illustrated in FIG. 26 and yet to be described. The comparator gate is shown in block form in FIG. 5*a* and its function has been described in connection with the circuits of FIGS. 5*a* and 5*b*. It will be described in detail in the description relating to FIG. 26 hereinafter.

BI-DIRECTIONAL ABSOLUTE POSITION COUNTER

FIGS. 24 and 25, respectively, show a block diagram of the absolute position counter and a circuit illustrating the details of the units decade of this absolute position counter. As will be seen by reference to FIG. 25, each decade comprises four flip-flops. These flip-flops are identified on the decade blocks in FIG. 24. The flip-flops may be the same as that described in connection with FIG. 6; however, all of the input capacitors C1*a*, C2*a*, C1*b*, C2*b* in the $J_n$, $K_n$, $J_p$ and $K_p$ input terminals are omitted. The capacitors coupling the stages are now indicated externally of the flip-flops in FIG. 25. Each decade is provided with increase count, or up level gates conventionally including at least one input diode DI1, a pull down resistor RI1 coupled to −25 volts, an output diode DI2, and a pull up resistor RI2 coupled to +25 volts. The anode of the output diode in each case is coupled to the cathode of a coupling diode DQ connected in series with the Q output terminal of each of the flip-flops as shown. There are four such up level gates and the first such gate, in addition to the up level signal indicated, is provided with a second diode DI3, the anode of which receives the signal $\overline{\text{Q}}s$4 requiring that the last flip-flop, that is, the highest order decade of the flip-flop, shall be in its "0" representing electrical state; otherwise, up level counting is inhibited. When the up level signal is high the output of the associated gate is high. This inhibits coupling of a positive going Q output signal from the flip-flop connected with the gate having the high output; thus, coupling to the next higher order flip-flop is prevented.

In a similar manner, each flip-flop is provided with a count decrease or down level gate each of which includes a gate input diode DD1 having a cathode coupled to a pull down resistor RD1 which is connected to −25 volts in each case. A coupling diode DD2 which is coupled between the cathode of the gate diode, a diode D$\overline{\text{Q}}$ connected in series in the $\overline{\text{Q}}$ output circuit of the associated flip-flop and a pull up resistor RD2 connected to +25 volts, couples the gate output to the associated flip-flop output circuit so that when the gate output is high coupling of the $\overline{\text{Q}}$ outputs of the flip-flops to the $K_p$ input terminal of the next higher order flip-flop in each case is inhibited.

As will be recalled from the discussion concerning the sign flip-flop FQ*ss* in the description of the general system in FIGS. 5*a* and 5*b* the sign flip-flop determines count up and count down operation in the development of the up level and down level voltage biases. In this connection reference is made to FIG. 24 showing the signal Q*ss* and the signal $\overline{\text{Q}}ss$ coupled input-wise to respective inverter circuits in turn having their outputs coupled to the count down level and the count up level circuits, respectively, of each of the counter decades illustrated. Thus, the presence of signal Q*ss* in its true state (−2 volts) results in approximately zero voltage or ground potential at the output of the inverter connected thereto which moves the output voltage of each of the down level count gates to the higher of its two voltage states inhibiting the coupling of the $\overline{\text{Q}}$ circuits of the flip-flops to the $K_p$ input circuits of the next higher order flip-flops in each case. The $\overline{\text{Q}}ss$ signal is now high so that the output of the connected inverter is low and the count up level gates enable the Q output circuits of each of the flip-flops so that coupling into the input circuits of the next higher order flip-flops in each case is achieved. Each decade of the absolute position counter is arranged to count to the binary equivalent of decimal number 9 and then reset. This procedure is the same as that provided in the Z position counters ZPC wherein in the unit section, for instance, the signal $\overline{\text{Q}}z$4 is coupled into the terminal 8I*n* of each of the flip-flops FQ*z*2 and FQ*z*3 to force these flip-flops from their "1" representing electrical state into their "0" presenting electrical states at such time as the signal $\overline{\text{Q}}$ goes from its "0" representing electrical state (−2 volts) to ground potential. The equivalent circuit, comprising the input terminal $\overline{\text{Q}}s$4 in FIG. 25, and including a capacitor C30 coupled to the common anodes of two diodes DK'2 and DK'3, having their cathodes respectively coupled to the $K'_p$ input terminals of the flip-flops FQ*s*2 and FQ*s*3 accomplishes this same function each time the signal $\overline{\text{Q}}s$4 switches from its lower to its higher electrical state, indicating the highest order flip-flop of that decade is switching from its "1" to its "0" representing electrical state. The terminal $K'_p$ is indicated in FIG. 6.

A zero setting circuit for each decade when in the up level mode of counting is represented in the gate receiving the input signals Q*s*1 and Q*s*4. The signal Q*s*4 is combined in "and" circuit relationship with the up level signal by the diodes DI4 and DI5, the cathodes of which are commonly coupled to one end of a pull down resistor RI, the other end of which is coupled to −25 volts. The output of this "and" gate is coupled to the cathode of a diode DI6 having its anode coupled to a pull up resistor RI4, the other end of which is coupled to +25 volts. The signal Q*s*1 is coupled to the anode of a diode DI7 having its cathode coupled to the pull up resistor RI4 and further coupled to the $K_p$ input circuit of the flip-flop FQ*s*4. When the decade is counting up and is in its 1001 electrical state configuration, reading from left to right, and having the binary weights 1, 2, 4 and 8, respectively, the switching of the signal Q*s*1 from its "1" representing electrical state (−2 volts) to its "0" representing electrical state now couples a positive going pulse into the $K_p$ input terminal of the flip-flop FQ*s*1 switching this flip-flop to its "0" representing electrical state at effectively the same time that the flip-flop FQ*s*1 is switched to its "0" representing electrical state, at which time the flip-flop decade is in its 0000 electrical state configuration for the beginning of a new count in that decade. All of the decades of the absolute position counter APC are similarly connected.

The inputs to the absolute position counter APC are controlled additionally by the select zero flip-flop FQ*os* and the select zero limit flip-flop FQ*ls*, as described in connection with FIGS. 5*a* and 5*b*. The gating circuits for controlling the select zero flip-flop FQ*os* and for controlling the inputs to the flip-flop FQ*s*1 of the first decade of the counter are shown at the left of FIG. 4. Here, an "and" gate AOJ1 combines the signals Q*ls* and count pulses $P_p$ in the $J_n$ input circuit of the flip-flop FQ*os*. Similarly, an "and" gate AOJ2 combines the signal Q*ls* and the count pulses $N_p$ in the input circuit to the $J_n$ input terminal of this flip-flop. Thus, whenever the select zero limit flip-flop FQ*ls* is turned on (its "1" representing electrical state) by the $\overline{\text{ML}}$, K*fdm* and A*mpz'* signals through "and" gate A1J (see FIG. 5*b*), provision is made for setting the flip-flop FQ*os* to its "1" representing electrical state. The flip-flop FQ*os* is turned off, that is, switched to its "0" representing electrical state by the occurrence of signals $\overline{\text{Q}}$*ss* and $P_p$ of Q*ss* and $N_p$ which pairs are combined in respective "and" gates AIK1 and AOK2 in the $K_n$ input circuit of the flip-flop FQ*os*. These signal combinations should not occur and therefore indicate operation must not take place, thus switching off the flip-flop FQ*os*.

The $J_p$ input circuit of the flip-flop FQ*s*1, which is the least significant flip-flop of the absolute position counter APC, is coupled to the output circuit of an "and" gate $ASJ_p$ having as its inputs the signals Q*ss*, Q*os* and $P_p$. This is the count up input circuit and requires the presence of the signal Q*ss* in the input of the count down level circuits to inhibit count down operation. Likewise, the $K_p$ input circuit of the flip-flop FQ*s*1 is coupled to the output of an "and" gate $ASK_p$ having as its inputs the signals $\overline{\text{Q}}$*ss*, Q*os* and $N_p$. This is the count down input. The details of these last two gating circuits are illustrated in FIG. 25 at the respective inputs of the flip-flop FQ*s*1. An additional "1" setting circuit is provided for setting the flip-flop FQ*s*1 to its "1" representing electrical state to pick up the first count as the spindle moves out of its upper limit or out of a select zero position. This is represented in the signal $\overline{\text{Q}}$*ls* which is coupled through an "and" gate $ASJ_n$ to the $J_n$ input terminal of the flip-flop FQ*s*1. This circuit is shown in detail in FIG. 25 in which the signal $\overline{\text{Q}}$*ls* is diode coupled to the $J_n$ input terminal of this least significant flip-flop of the absolute position counter.

COMPARATOR GATE

The comparator gate which compares the corresponding outputs of the active memory ME2 and the absolute position counter APC is illustrated in FIG. 26. The logic here is similar to that discussed in connection with FIG. 17 showing the comparator for the F and Z position counters. As indicated, the Q and $\overline{\text{Q}}$ outputs of the flip-flops of the active memory ME2 are compared with the $\overline{\text{Q}}$ and Q outputs of the corresponding by weighted flip-flops of the absolute position counter. The gates whereby these "and" circuit relationships are accomplished are shown in FIG. 17 and only the comparator "or" gate OGC, similar to the "or" gate OG8 of FIG. 17, is shown herein. The input circuits of the "or" gate are coupled to the outputs of respective "and" gates having output circuits comprising respective pull down resistors RA coupled between each of the input circuits and −25 volts as shown. The diodes DO have their anodes coupled commonly into the "or" gate output circuit and coupled additionally to a diode DO1 coupled to the "or" gate pull up resistor RO1 coupled to +25 volts.

A gating transistor QG3 having a grounded emitter has its base coupled to the anode of this last named diode DO1. The collector circuit of transistor QG3 is coupled to a diode DA1 and constitutes one input of the "and" gate AG5, the other input of which is represented in the input signal $\overline{\text{Q}}$*dz* coupled to diode DA2 which, as earlier described, indicates the spindle is to move downwardly. The pull down resistor is RA5. When all of the input signals are in disagreement, indicating that coincidence exists, the outputs of all of the "and" gates are high and the output of the "or" gate section OG of the comparator gate CG is high. Normally, the fixed bias on the base of the transistor QG3 causes conduction which couples the collector circuit to ground inhibiting the "and" gate AG5. However, at coincidence, the transistor QG3 is cut off so that this input of the "and" gate AG5 is effectively open-circuited. If the signal $\overline{\text{Q}}$*dz* is then low, the "and" gate is enabled and its output goes low. This switches transistor QG4 to conduction, its collector circuit coming up approximately to ground potential providing a positive going input on the $J_p$ terminal of the flip-flop FQ*tr* driving this flip-flop to its "1" representing electrical state, as described in FIGS. 5*a* and 5*b*, to produce a flip-flop switching output signal at its $\overline{\text{Q}}$ output terminal for switching the flip-flop FQ*lz* to its "1" representing electrical state so that Z position counting may take place. A second "and" gate AG6 has four input circuits including diodes DA3, DA4 and DA5 in three branches. One of these input circuits includes the diode DA3 which is coupled to the collector circuit of the transistor QG3, indicating coincidence between the active memory and the absolute position counter. A second includes the diode DA4 and is coupled to the output circuit of an "or" gate OGMZ having a pull up resistor connected to +25 volts and including diodes DQ (FIG. 23) which receive the inputs *QM*2–1+ . . . +*QM*2–20 from the Q outputs of the active memory flip-flops as seen in FIG. 23. A third input circuit includes the diode DA5 and receives the signal Q*dz* from the directional flip-flop FQ*dz* indicating the direction of motion is up, and a fourth input circuit receives the signals $\overline{\text{Q}}$*s*2 through $\overline{\text{Q}}$*s*12 (see FIGS. 24 and 25) (see also the absolute position counter of FIG. 5*b*), indicating in the lower of their two voltage states (−2 volts) that all of these flip-flops are in their "0" representing electrical states. The "and" gate AG6 comprises a pull down resistor RA6 coupled to −25 volts. The output of this "and" gate AG6 is coupled to the base circuit of a transistor QG5, the emitter circuit of which is grounded and the collector circuit of which is resistor connected to the $J_n$ input circuit of the flip-flop FQ*st*. The output circuit Q*st* of this flip-flop is resistor coupled to the base circuit of a transistor QG6, the emitter circuit of which is grounded and the collector circuit of which, as shown in FIG. 5*b*, is coupled to the coils of the relays K*fd* and K*fc*. The respective gating transistors QG3 through QG6 comprise the inverters I1 through I4 described in the gating networks in FIGS. 5*a* and 5*b*.

Although but one embodiment of this invention has been illustrated and described, it will be appreciated by those skilled in the art that numerous changes may be made herein without departing from the spirit and scope of this invention. In this connection reference may be made to the various logic circuits, the flip-flop circuits, signal shaper circuits, transducer and pulse generator circuits, all of which are of a particular specific configuration in accordance with present engineering preferences. Such circuits, it will be appreciated, may be changed in accordance with specific requirements of particular systems while maintaining the general inventive concept which has been described.

Similarly, mechanical or magnetic tape readers may be substituted for the photoelectric or photodiode type which has been described. Card readers or magnetic drums also represent acceptable discrete signal program devices. Stepping switches may be substituted for the electrical distributors. Other types of amplifiers and inverter circuits employing other components may be incorporated. Electric drives may replace hydraulic drives and other transducers may be employed in place of the magnetic type referred to herein for the purposes of scale reading.

This invention may also be practiced on an axis of a machine other than the spindle axis and may be practiced advantageously on any machine other than a machine tool where positioning requirements indicate need for movement from positions other than a fixed limit.

Accordingly, it is intended that the foregoing disclosure and the showings made in the drawings are to be considered only as illustrative and not construed in a limiting sense.

What is claimed is:

1. A machine control, comprising:
a pair of relatively movable members;
servo means coupled to said members to relatively move said members;
a discrete signal program device;
incremental position transducer means coupled to and operated by said members;
count pulse producing means coupled to said position transducer means and controlled thereby;
memory means coupled to and controlled by said signal program device for receiving zero reference signals;
an absolute position counter coupled to and controlled by said count pulse producing means;
comparator means coupled to said memory means and to said absolute position counter and controlled thereby;
count control means coupled to said count pulse producing means to receive count pulses;
control means coupled to and controlled by said comparator means and having an output coupled to said count control means for disabling said count control means until a predetermined relationship occurs between said memory means and said absolute position counter;
and circuit means including a position counter coupled to said program device and said count control means and responsive thereto and having output circuit means coupled to said servo means for stopping said servo means.

2. A machine tool, comprising:
a pair of relatively movable members;
servo means coupled to said members to relatively move said members;
a discrete signal program device;
incremental position transducer means coupled to and operated by said members;
count pulse producing means coupled to said position transducer means and controlled thereby;
memory means, comprising a buffer memory and an active memory, coupled to and controlled by said signal program device for receiving zero reference signals;
transfer means coupling said buffer memory to said active memory for transferring the contents of said buffer memory to said active memory when said transfer means is operated;
means coupled to said members and controlled by relative movement in one sense and having an output coupled to and controlling said transfer means for operating said transfer means;
an absolute position counter coupled to and controlled by said count pulse producing means;
comparator means coupled to said active memory and to said absolute position counter and controlled thereby;
count control means coupled to said count pulse producing means to receive count pulses;
control means coupled to and controlled by said comparator means and having an output coupled to said count control means for disabling said count control means until coincidence occurs between said active memory and said absolute position counter;
and circuit means including a position counter coupled to said program device and said count control means and responsive thereto and having output circuit means coupled to said circuit servo means for stopping said servo means.

3. A machine tool control, comprising:
a pair of relatively movable members;
servo means coupled to said members to relatively move said members;
a discrete signal program device;
incremental position transducer means coupled to and operated by said members;
count pulse producing means coupled to said position transducer means and controlled thereby and having a pair of pulse output circuits selectively producing pulses in dependence upon the direction of relative movement;
memory means coupled to and controlled by said signal program device for receiving zero reference signals;
a bi-directional counter;
circuit means coupling said output circuits of said count pulse producing means to said bi-directional counter to operate said counter;
means coupled to said output circuits of said count pulse producing means and responsive to said count pulses and having output circuits coupled to said bi-directional counter for controlling up and down counting operation;
comparator means coupled to said memory means and to said bi-directional counter and controlled thereby;
count control means coupled to said output circuits of said count pulse producing means to receive count pulses;
control means coupled to and controlled by said comparator means and having an output coupled to said count control means for inhibiting count pulse production until coincidence occurs between said memory means and said bi-directional counter;
and circuit means coupled to said program device and said count control means and responsive thereto and having output circuit means coupled to said servo means.

4. A machine control, comprising:
a pair of relatively movable members;
power means coupled to said members to relatively move said members;
power control means coupled to said power means to control said power means;
a discrete signal program device;
incremental position transducer means coupled to and operated by said members;
a position count generator coupled to and responsive to said position transducer means and having respective output circuits for producing discrete count signals representative of increments of relative movement between said members in one direction and the reverse;
storage means coupled to said discrete program for receiving and retaining signals indicative of a selected zero position;
a bi-directional counter;
circuit means coupling said bi-directional counter to said output circuits of said position count generator to be operated thereby;
means coupled to and controlled by said output circuits of said position count generator and having output circuits coupled to said bi-directional counter to control up and down counting;
count control means coupled to said output circuits of said position count generator to receive count pulses;

a comparator coupled to and controlled by said storage means and said bi-directional counter;

control means coupled to and controlled by said comparator and having an output coupled to said count control means for inhibiting count pulse production until coincidence occurs between said storage means and said bi-directional counter;

a desired position counter coupled to said program device and preset with signals representing a desired position relative to said selected zero position;

means coupling said count control means to said desired position counter to count down said desired position counter;

and means coupled to and controlled by said desired position counter and having output means coupled to and controlling said power control means.

5. Apparatus as set forth in claim 4 in which said storage means comprises a buffer section and an active section;

transfer means coupling said buffer section to said active section for transferring the contents of said buffer section to said active section when said transfer means is operated;

and means coupled to and controlled by said desired position counter and having an output coupled to said transfer means for operating said transfer means.

6. Apparatus as set forth in claim 4 in which said storage means comprises a buffer section and an active section;

transfer means coupling said buffer section to said active section for transferring the contents of said buffer section to said active section when said transfer means is operated;

means coupled to said members and controlled by relative movement in one sense and having an output coupled to said transfer means for operating said transfer means;

and means coupled to and controlled by said desired position counter and having an output coupled to said transfer means for operating said transfer means.

7. A positioning system comprising:

incremental position transducer means having relatively movable members;

servo means coupled to said position transducer means for relatively moving said members;

pulse generator means coupled to said position transducer means and producing first pulses indicative of relative movement in one sense or second pulses indicative of movement in an opposite sense;

a desired position counter;

memory means;

a discrete signal program device coupled to said memory means for entering a zero position setting, and coupled to said desired position counter for entering a desired position setting relative to said zero position setting;

normally disabled count control means having an input circuit coupled to said pulse generator means and having an output circuit coupled to said desired position counter, said count control means when disabled preventing the application of said first pulses or said second pulses to said desired position counter;

bi-directional counter means coupled to said pulse generator means and selectively counting up and counting down in response to said first and second pulses respectively;

comparator means coupled to said memory means and said bi-directional counter for comparing the contents of each and having an output coupled to said count control means to enable said count control means upon the occurrence of coincidence between said memory means and said bi-directional counter, said count control means when enabled applying said first pulses or said second pulses to said desired position counter;

and means coupled to and controlled by said desired position counter and coupled to and controlling said servo means as long as there is at least a predetermined count in said desired position counter.

8. Apparatus as set forth in claim 7 in which said memory means comprises a buffer memory coupled to said program device and an active memory coupled to said comparator means;

transfer means coupling said buffer memory to said active memory;

and means coupled to said position transducer means and operable upon relative movement of said members from a given relative position in a given sense to control said transfer means.

9. Apparatus as set forth in claim 7 in which said memory means comprises a buffer memory coupled to said program device and an active memory coupled to said comparator means;

transfer means coupling said buffer memory to said active memory;

and means coupled to and controlled by said desired position counter and having an output coupled to and controlling said transfer means.

10. Apparatus as set forth in claim 7 in which said memory means comprises a buffer memory coupled to said program device and an active memory coupled to said comparator;

transfer means coupling said buffer memory to said active memory;

means coupled to said position transducer means and operable upon relative movement of said members in a given sense from a given position to control said transfer means;

and means coupled to and controlled by said desired position counter and having an output coupled to and controlling said transfer means.

11. A positioning system for positioning one member relative to another, comprising:

servo means coupled to said members to relatively move said members;

a discrete signal program device;

incremental position transducer means coupled to said members to be operated therewith;

a discrete signal desired position circuit coupled to said program device for receiving desired position signals;

a discrete signal zero position circuit coupled to said program device for receiving zero position signals;

an actual position circuit coupled to said incremental position transducer means to be controlled thereby;

means coupled to said program device for initiating operation of said servo means;

and means coupled to said actual position circuit and said zero position circuit and responsive thereto for coupling said incremental transducer means to said discrete signal desired position circuit whenever a predetermined relationship exists between the discrete signals of said actual position circuit and the discrete signal of said zero position circuit.

References Cited

UNITED STATES PATENTS

| | | | |
|---|---|---|---|
| 3,183,421 | 5/1965 | Herchenroeder | 318—28 |
| 3,209,221 | 9/1965 | Pugsley et al. | 318—28 |
| 3,209,222 | 9/1965 | Holy | 318—28 |
| 3,218,532 | 11/1965 | Toscano | 318—28 |

BENJAMIN DOBECK, *Primary Examiner.*